(12) United States Patent
Kaner et al.

(10) Patent No.: US 10,364,358 B2
(45) Date of Patent: Jul. 30, 2019

(54) CELLULAR GRAPHENE FILMS

(71) Applicant: The Regents of the University of California, Oakland, CA (US)

(72) Inventors: Richard Barry Kaner, Pacific Palisades, CA (US); Yuanlong Shao, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/382,871

(22) Filed: Dec. 19, 2016

(65) Prior Publication Data

US 2017/0178824 A1 Jun. 22, 2017

Related U.S. Application Data

(60) Provisional application No. 62/271,115, filed on Dec. 22, 2015, provisional application No. 62/428,608, filed on Dec. 1, 2016.

(51) Int. Cl.
*C09D 5/24* (2006.01)
*H01G 11/60* (2013.01)
(Continued)

(52) U.S. Cl.
CPC .............. *C09D 5/24* (2013.01); *C01B 32/192* (2017.08); *C01B 32/198* (2017.08); *C01B 32/23* (2017.08);
(Continued)

(58) Field of Classification Search
CPC ........ H01G 11/32; H01G 11/60; H01G 11/52; H01G 11/86; H01G 11/26; C01B 32/198;
(Continued)

(56) References Cited

U.S. PATENT DOCUMENTS 3,652,902 A 3/1972 Hart et al.
5,442,197 A 8/1995 Andrieu et al.
(Continued)

FOREIGN PATENT DOCUMENTS

CN 101723310 A 6/2010
CN 101894679 A 11/2010
(Continued)

OTHER PUBLICATIONS

Invitation to Pay Additional Fees for International Patent Application No. PCT/US2017/048883, dated Sep. 29, 2017, 2 pages.
(Continued)

*Primary Examiner* — Daniel C. McCracken
(74) *Attorney, Agent, or Firm* — Withrow & Terranova, P.L.L.C.

(57) ABSTRACT

The present disclosure provides supercapacitors that may avoid the shortcomings of current energy storage technology. Provided herein are electrochemical systems, comprising three dimensional porous reduced graphene oxide film electrodes. Prototype supercapacitors disclosed herein may exhibit improved performance compared to commercial supercapacitors. Additionally, the present disclosure provides a simple, yet versatile technique for the fabrication of supercapacitors through the direct preparation of three dimensional porous reduced graphene oxide films by filtration and freeze casting.

9 Claims, 28 Drawing Sheets

(51) Int. Cl.

| | | |
|---|---|---|
| *H01G 11/86* | (2013.01) | |
| *H01G 11/26* | (2013.01) | |
| *C01B 32/23* | (2017.01) | |
| *C01B 32/192* | (2017.01) | |
| *C01B 32/198* | (2017.01) | |
| *H01G 11/24* | (2013.01) | |
| *H01G 11/36* | (2013.01) | |
| *H01G 11/64* | (2013.01) | |
| *H01G 11/52* | (2013.01) | |

(52) U.S. Cl.
CPC .............. *H01G 11/24* (2013.01); *H01G 11/26* (2013.01); *H01G 11/36* (2013.01); *H01G 11/60* (2013.01); *H01G 11/64* (2013.01); *H01G 11/86* (2013.01); *C01P 2006/10* (2013.01); *C01P 2006/12* (2013.01); *C01P 2006/40* (2013.01); *H01G 11/52* (2013.01); *Y02E 60/13* (2013.01); *Y02T 10/7022* (2013.01)

(58) Field of Classification Search
CPC ....... C01B 32/23; C01B 32/192; C01B 31/04; C01B 31/0407; C01B 31/0415; C01B 31/0423; C01B 31/043; C01B 31/0438; C01B 31/0446; C01B 31/0453; C01B 31/0461; C01B 31/0469; C01B 31/0476; C01B 31/0484; C01B 31/0492; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32; C09D 5/24; C01P 2006/10; C01P 2006/12; C01P 2006/40
See application file for complete search history.

(56) References Cited

U.S. PATENT DOCUMENTS

| | | | |
|---|---|---|---|
| 6,043,630 | A | 3/2000 | Koenck et al. |
| 6,117,585 | A | 9/2000 | Anani et al. |
| 6,451,074 | B2 | 9/2002 | Bluvstein et al. |
| 6,510,043 | B1 | 1/2003 | Shiue et al. |
| 6,522,522 | B2 | 2/2003 | Yu et al. |
| 6,982,517 | B2 | 1/2006 | Reineke et al. |
| 7,623,340 | B1 | 11/2009 | Song et al. |
| 7,875,219 | B2 | 1/2011 | Zhamu et al. |
| 8,315,039 | B2 | 11/2012 | Zhamu et al. |
| 8,503,161 | B1 | 8/2013 | Chang et al. |
| 8,753,772 | B2 | 6/2014 | Liu et al. |
| 8,828,608 | B2 | 9/2014 | Sun et al. |
| 8,951,675 | B2 | 2/2015 | Bhardwaj et al. |
| 9,118,078 | B2 | 8/2015 | Huang et al. |
| 9,295,537 | B2 | 3/2016 | Cao |
| 2002/0136881 | A1 | 9/2002 | Yanagisawa et al. |
| 2003/0169560 | A1 | 9/2003 | Welsch et al. |
| 2004/0090736 | A1 | 5/2004 | Bendale et al. |
| 2005/0153130 | A1 | 7/2005 | Long et al. |
| 2006/0121342 | A1 | 6/2006 | Sano et al. |
| 2006/0201801 | A1 | 9/2006 | Bartlett et al. |
| 2006/0269834 | A1 | 11/2006 | West et al. |
| 2007/0172739 | A1 | 7/2007 | Visco et al. |
| 2007/0204447 | A1 | 9/2007 | Bernstein et al. |
| 2008/0090141 | A1 | 4/2008 | Meitav et al. |
| 2008/0180883 | A1 | 7/2008 | Palusinski et al. |
| 2008/0199737 | A1 | 8/2008 | Kazaryan et al. |
| 2008/0220293 | A1 | 9/2008 | Marmaropoulos et al. |
| 2009/0059474 | A1 | 3/2009 | Zhamu et al. |
| 2009/0117467 | A1 | 5/2009 | Zhamu et al. |
| 2009/0289328 | A1 | 11/2009 | Tanioku |
| 2010/0159346 | A1 | 6/2010 | Hinago et al. |
| 2010/0159366 | A1 | 6/2010 | Shao-Horn et al. |
| 2010/0195269 | A1 | 8/2010 | Kim et al. |
| 2010/0203362 | A1 | 8/2010 | Lam et al. |
| 2010/0221508 | A1 | 9/2010 | Huang et al. |
| 2010/0226066 | A1 | 9/2010 | Sweeney et al. |
| 2010/0237296 | A1 | 9/2010 | Gilje |
| 2010/0266964 | A1 | 10/2010 | Gilje |
| 2010/0317790 | A1 | 12/2010 | Jang et al. |
| 2011/0026189 | A1 | 2/2011 | Wei et al. |
| 2011/0111299 | A1 | 5/2011 | Liu et al. |
| 2011/0143101 | A1 | 6/2011 | Sandhu |
| 2011/0159372 | A1 | 6/2011 | Zhamu et al. |
| 2011/0163274 | A1 | 7/2011 | Plee et al. |
| 2011/0163699 | A1 | 7/2011 | Elder et al. |
| 2011/0256454 | A1 | 10/2011 | Nicolas et al. |
| 2011/0318257 | A1 | 12/2011 | Sokolov et al. |
| 2012/0111730 | A1 | 5/2012 | Choi et al. |
| 2012/0129736 | A1 | 5/2012 | Tour et al. |
| 2012/0134072 | A1 | 5/2012 | Bae et al. |
| 2012/0145234 | A1 | 6/2012 | Roy-Mayhew et al. |
| 2012/0313591 | A1 | 12/2012 | Brambilla et al. |
| 2013/0026409 | A1 | 1/2013 | Baker et al. |
| 2013/0048949 | A1 | 2/2013 | Xia et al. |
| 2013/0056346 | A1 | 3/2013 | Sundara et al. |
| 2013/0056703 | A1 | 3/2013 | Elian et al. |
| 2013/0161570 | A1 | 6/2013 | Hwang et al. |
| 2013/0168611 | A1 | 7/2013 | Zhou et al. |
| 2013/0182373 | A1 | 7/2013 | Yu et al. |
| 2013/0217289 | A1 | 8/2013 | Nayfeh et al. |
| 2013/0264041 | A1 | 10/2013 | Zhamu et al. |
| 2013/0280601 | A1 | 10/2013 | Geramita et al. |
| 2013/0330617 | A1 | 12/2013 | Yoshimura et al. |
| 2014/0029161 | A1 | 1/2014 | Beidaghi et al. |
| 2014/0045058 | A1 | 2/2014 | Zhao et al. |
| 2014/0065447 | A1 | 3/2014 | Liu et al. |
| 2014/0120453 | A1 | 5/2014 | Ajayan et al. |
| 2014/0154164 | A1 | 6/2014 | Chen et al. |
| 2014/0178763 | A1 | 6/2014 | Mettan |
| 2014/0255776 | A1 | 9/2014 | Song et al. |
| 2014/0287308 | A1 | 9/2014 | Okada et al. |
| 2014/0313636 | A1 | 10/2014 | Tour et al. |
| 2014/0323596 | A1 | 10/2014 | Jeong et al. |
| 2015/0098167 | A1 | 4/2015 | El-Kady et al. |
| 2015/0103469 | A1 | 4/2015 | Lee et al. |
| 2015/0111449 | A1 | 4/2015 | Cruz-Silva et al. |
| 2015/0218002 | A1 | 8/2015 | Plomb et al. |
| 2015/0235776 | A1 | 8/2015 | Miller |
| 2015/0259212 | A1* | 9/2015 | Li .................... B82Y 40/00 428/221 |
| 2015/0332868 | A1 | 11/2015 | Jung et al. |
| 2015/0364738 | A1 | 12/2015 | Pope et al. |
| 2015/0364755 | A1 | 12/2015 | Liu et al. |
| 2016/0035498 | A1 | 2/2016 | Honma et al. |
| 2016/0077074 | A1 | 3/2016 | Strong et al. |
| 2016/0099116 | A1 | 4/2016 | Yang |
| 2016/0148759 | A1 | 5/2016 | El-Kady et al. |
| 2017/0338472 | A1 | 11/2017 | Zhamu et al. |

FOREIGN PATENT DOCUMENTS

| | | |
|---|---|---|
| CN | 102543483 A | 7/2012 |
| CN | 103723715 A | 4/2014 |
| CN | 203631326 U | 6/2014 |
| CN | 203839212 U | 9/2014 |
| JP | S61010855 A | 1/1986 |
| JP | S62287568 A | 12/1987 |
| JP | 2002063894 A | 2/2002 |
| JP | 2003217575 A | 7/2003 |
| JP | 2004039491 A | 2/2004 |
| JP | 2004055541 A | 2/2004 |
| JP | 2005317902 A | 11/2005 |
| JP | 2006252902 A | 9/2006 |
| JP | 2009525247 A | 7/2009 |
| JP | 2010222245 A | 10/2010 |
| JP | 2011026153 A | 2/2011 |
| JP | 2011165680 A | 8/2011 |
| JP | 2012169576 A | 9/2012 |
| JP | 2013534686 A | 9/2013 |
| JP | 2014053209 A | 3/2014 |
| KR | 20070083691 A | 8/2007 |
| KR | 10-2009-0107498 A | 10/2009 |

(56) References Cited

FOREIGN PATENT DOCUMENTS

| | | |
|---|---|---|
| KR | 10201001148 B1 | 4/2017 |
| WO | 9632618 A1 | 10/1996 |
| WO | 2011019431 A1 | 2/2011 |
| WO | 2011072213 A2 | 6/2011 |
| WO | 2012006657 A | 1/2012 |
| WO | 2012138302 A1 | 10/2012 |
| WO | 2013066474 A2 | 5/2013 |
| WO | 2013070989 A1 | 5/2013 |
| WO | 2013128082 A1 | 9/2013 |
| WO | 2013155276 A1 | 10/2013 |
| WO | 2014062133 A1 | 4/2014 |
| WO | 2014072877 A2 | 5/2014 |
| WO | 2014134663 A1 | 9/2014 |
| WO | WO 2014/134663 * 9/2014 ............ C01B 31/00 |
| WO | 2015153895 A1 | 10/2015 |
| WO | 2015195700 A1 | 12/2015 |

OTHER PUBLICATIONS

Non-Final Office Action for U.S. Appl. No. 13/725,073, dated Aug. 28, 2017, 41 pages.

Second Office Action for Chinese Patent Application No. 201380023699.7, dated Aug. 9, 2017, 8 pages.

International Search Report and Written Opinion for International Patent Application No. PCT/US2017/038992, dated Sep. 21, 2017, 12 pages.

Kaewsongpol, Tanon et al., "High-performance supercapacitor of electrodeposited porous 3Dpolyaniline nanorods on functionalized carbon fiber paper: Effects of hydrophobic and hydrophilic surfaces of conductive carbon paper substrates," Materials Today Communications, vol. 4, Aug. 19, 2015, Elsevier Ltd., pp. 176-185.

Yan, Jun et al., "Preparation of graphene nanosheet/carbon nanotube/polyaniline composite as electrode material for supercapacitors," Journal of Power Sources, vol. 195, Issue 9, Nov. 11, 2009, Elsevier B.V., pp. 3041-3045.

Examination Report for European Patent Application No. 12874989.2, dated Jul. 24, 2017, 5 pages.

Communication pursuant to Article 94(3) EPC for European Patent Application No. 13757195.6, dated Jul. 6, 2017, 3 pages.

International Search Report and Written Opinion for International Patent Application No. PCT/US2017/024716, dated Jun. 20, 2017, 13 pages.

Gao, Yu et al., "High power supercapcitor electrodes based on flexible TiC-CDC nano-felts," Journal of Power Sources, vol. 201, Issue 1, Mar. 2012, Elsevier B.V., pp. 368-375.

Gao, Lijun et al., "Power Enhancement of an Actively Controlled Battery/Ultracapacitor Hybrid," IEEE Transactions on Power Electronics, vol. 20, Issue 1, Jan. 2005, IEEE, pp. 236-243.

Ghasemi, S. et al., "Enhancement of electron transfer kinetics on a polyaniline-modified electrode in the presence of anionic dopants," Journal of Solid State Electrochemistry, vol. 12, Issue 3, Jul. 28, 2007, Springer-Verlag, pp. 259-268.

Ghidiu, Michael et al., "Conductive two-dimensional titanium carbide 'clay' with high volumetric capacitance," Nature, vol. 516, Dec. 4, 2014, Macmillan Publishers Limited, pp. 78-81.

Gilje, Scott et al., "A Chemical Route to Graphene for Device Applications," Nano Letters, vol. 7, Issue 11, Oct. 18, 2007, American Chemical Society, pp. 3394-3398.

Gilje, Scott et al., "Photothermal Deoxygenation of Graphene Oxide for Patterning and Distributed Ignition Applications," Advanced Materials, vol. 22, Issue 3, Oct. 26, 2009, Wiley-VCH Verlag GmbH & Co. KGaA, Weinheim, Germany, pp. 419-423.

Glavin, M.E. et al, "A Stand-alone Photovoltaic Supercapacitor Battery Hybrid Energy Storage System," Proceedings of the 13th International Power Electronics and Motion Control Conference (EPE-PEMC), Sep. 1-3, 2008, Poznań, Poland, IEEE, pp. 1688-1695.

Gogotsi, Y. et al., "True Performance Metrics in Electrochemical Energy Storage," Science Magazine, vol. 334, Issue 6058, Nov. 18, 2011, 4 pages.

Gracia, J. et al., "Corrugated layered heptazine-based carbon nitride: the lowest energy modifications of $C_3N_4$ ground state," Journal of Materials Chemistry, vol. 19, 2009, pp. 3013-3019.

Griffiths, Katie et al., "Laser-scribed graphene presents an opportunity to print a new generation of disposable electrochemical sensors," Nanoscale, vol. 6, Sep. 22, 2014, The Royal Society of Chemistry, pp. 13613-13622.

Guardia, L. et al., "UV light exposure of aqueous graphene oxide suspensions to promote their direct reduction, formation of graphene-metal nanoparticle hybrids and dye degradation," Carbon, vol. 50, Issue 3, Oct. 12, 2011, Elsevier Ltd., pp. 1014-1024.

Guerrero-Contreras, Jesus et al., "Graphene oxide powders with different oxidation degree, prepared by synthesis variations of the Hummers method," Materials Chemistry and Physics, vol. 153, Mar. 1, 2015, Elsevier B.V., pp. 1-12.

Günes, Fethullah et al., "Layer-by-Layer Doping of Few-Layer Graphene Film," ACS Nano, vol. 4, Issue 8, Jul. 27, 2010, American Chemical Society, pp. 4595-4600.

He, Xinping et al., "A new nanocomposite: Carbon cloth based polyaniline for an electrochemical supercapacitor," Electrochimica Acta, vol. 111, Aug. 17, 2013, Elsevier Ltd., pp. 210-215.

Hu, Liangbing et al., "Symmetrical $MnO_2$-Carbon Nanotube-Textile Nanostructures for Wearable Pseudocapacitors with High Mass Loading," ACS Nano, vol. 5, Issue 11, Sep. 16, 2011, American Chemical Society, pp. 8904-8913.

Huang, Yi et al., "An Overview of the Applications of Graphene-Based Materials in Supercapacitors," Small, vol. 8, Issue 12, Jun. 25, 2012, Wiley-VCH Verlag GmbH & Co. KGaA, Weinheim, pp. 1-30.

Huang, Ming et al., "Self-Assembly of Mesoporous Nanotubes Assembled from Interwoven Ultrathin Birnessite-type $MnO_2$, Nanosheets for Asymmetric Supercapacitors," Scientific Reports, vol. 4, Issue 3878, Jan. 27, 2014, ww.nature.com/scientificreports, pp. 1-8.

Hwang, Jee Y. et al., "Direct preparation and processing of graphene/$RuO2$ nanocomposite electrodes for high-performance capacitive energy storage," Nano Energy, vol. 18, Sep. 25, 2015, Elsevier B.V., pp. 57-70.

Jana, Milan et al., "Non-covalent functionalization of reduced graphene oxide using sulfanilic acid azocromotrop and its application as a supercapacitor electrode material," Journal of Materials Chemistry A, vol. 3, Issue 14, Feb. 24, 2015, The Royal Society of Chemistry, pp. 7323-7331.

Ji, Junyi et al., "Nanoporous $Ni(OH)_2$ Thin Film on 3D Ultrathin-Graphite Foam for Asymmetric Supercapacitor," ACS Nano, vol. 7, Issue 7, Jun. 11, 2013, American Chemical Society, pp. 6237-6243.

Jimbo, "Transistors," Sparkfun, https://learn.sparkfun.com/tutorials/transistors/extending-the-water-analogy, accessed Dec. 14, 2015, SparkFun Electronics, 3 pages.

Jin, H. Y. et al., "Controllable functionalized carbon fabric for high-performance all-carbon-based supercapacitors," RSC Advances, vol. 4, Issue 62, Jul. 15, 2014, The Royal Society of Chemistry, pp. 33022-33028.

Kang, Yu Jin et al., "All-solid-state flexible supercapacitors based on papers coated with carbon nanotubes and ionic-liquid-based gel electrolytes," Nanotechnology, vol. 23, Issue 6, Jan. 17, 2012, IOP Publishing Ltd, pp. 1-6.

Khaligh, Alireza et al., "Battery, Ultracapacitor, Fuel Cell, and Hybrid Energy Storage Systems for Electric, Hybrid Electric, Fuel Cell, and Plug-In Hybrid Electric Vehicles: State of the Art," IEEE Transactions on Vehicular Technology, vol. 59, Issue 6, Jul. 2010, IEEE, pp. 2806-2814.

Khomenko, V. et al., "Optimisation of an asymmetric manganese oxide/activated carbon capacitor working at 2 V in aqueous medium," Journal of Power Sources, vol. 153, Issue 1, Mar. 14, 2005, Elsevier B.V., pp. 183-190.

Kiani, Mohammad Ali et al., "Fabrication of High Power LiNi0.5Mn1.5O4 Battery Cathodes by Nanostructuring of Electrode Materials," RSC Advances, vol. 5, Issue 62, May 26, 2015, The Royal Society of Chemistry, pp. 1-6.

Kiani, M.A. et al., "Size effect investigation on battery performance: Comparison between micro- and nano-particles of $\beta$-$Ni(OH)_2$ as

(56) References Cited

OTHER PUBLICATIONS nickel battery cathode material," Journal of Power Sources, vol. 195, Issue 17, Apr. 2, 2010, Elsevier B.V., pp. 5794-5800.
Kani, M.A.. et al., "Synthesis of Nano- and Micro-Particles of $LiMn_2O_4$: Electrochemical Investigation and Assessment as a Cathode in Li Battery," International Journal of Electrochemical Science, vol. 6, Issue 7, Jul. 1, 2011, ESG, pp. 2581-2595.
Kovtyukhova, Nina, I. et al., "Layer-by-Layer Assembly of Ultrathin Composite Films from Micron-Sized Graphite Oxide Sheets and Polycations," Kovtyukhova, et al, Chemistry of Materials, vol. 11, Issue 3, Jan. 28, 1999, American Chemical Society, pp. 771-778.
Lam, L. T. et al., "Development of ultra-battery for hybrid-electric vehicle applications," Journal of Power Sources, vol. 158, Issue 2, May 2, 2006, Elsevier B.V., pp. 1140-1148.
Lang, Xingyou et al., "Nanoporous metal/oxide hybrid electrodes for electrochemical supercapacitors," Nature Nanotechnology, vol. 6, Apr. 2011, Macmillan Publishers Limited, pp. 232-236.
Lee, Kyu Hyung et al., "Large scale production of highly conductive reduced graphene oxide sheets by a solvent-free low temperature reduction," Carbon, vol. 69, Dec. 16, 2013, Elsevier Ltd., pp. 327-335.
Lee, Kyoung, G. et al, "Sonochemical-assisted synthesis of 3D graphene/nanoparticle foams and their application in supercapacitor," Ultrasonics Sonochemistry, vol. 22, May 2, 2014, Elsevier B.V., pp. 422-428.
Lee, Seung Woo et al., "Carbon Nanotube/Manganese Oxide Ultrathin Film Electrodes for Electrochemical Capacitors," ACS Nano, vol. 4, Issue 7, Jun. 16, 2010, American Chemical Society, pp. 3889-3896.
Lei, Zhibin et al., "Platelet CMK-5 as an Excellent Mesoporous Carbon to Enhance the Pseudocapacitance of Polyaniline," ACS Applied Materials & Interfaces, vol. 5, Issue 15, Jul. 12, 2013, American Chemical Society, pp. 7501-7508.
Li, Dan et al., "Processable aqueous dispersions of graphene nanosheets," Nature Nanotechnology, vol. 3, Feb. 2008, Nature Publishing Group, pp. 101-105.
Li, Lei et al., "Nanocomposite of Polyaniline Nanorods Grown on Graphene Nanoribbons for Highly Capacitive Pseudocapacitors," ACS Applied Materials and Interfaces, vol. 5, Issue 14, Jun. 21, 2013, American Chemical Society, 6 pages.
Li, Peixu et al., "Core-Double-Shell, Carbon Nanotube@Polypyrrole@$MnO_2$ Sponge as Freestanding, Compressible Supercapacitor Electrode," ACS Applied Materials and Interfaces, vol. 6, Issue 7, Mar. 12, 2014, American Chemical Society, pp. 5228-5234.
Li, Qi et al., "Design and Synthesis of $MnO_2$/Mn/$MnO_2$ Sandwich-Structured Nanotube Arrays with High Supercapacitive Performance for Electrochemical Energy Storage," Nano Letters, vol. 12, Issue 7, Jun. 25, 2012, American Chemical Society, pp. 3803-3807.
Li, Yingzhi et al., "Oriented Arrays of Polyaniline Nanorods Grown on Graphite Nanosheets for an Electrochemical Supercapacitor," Langmuir, vol. 29, Issue 1, Dec. 3, 2012, American Chemical Society, 8 pages.
Li, Zhe-Fei et al., "Fabrication of high-surface-area graphene/polyaniline nanocomposites and their application in supercapacitors," ACS Applied Materials & Interfaces, vol. 5, Issue 7, Mar. 12, 2013, American Chemical Society, pp. 1-25.
Lin, Jian et al., "3-Dimensional Graphene Carbon Nanotube Carpet-Based Microsupercapacitors with High Electrochemical Performance," Nano Letters, vol. 13, Issue 1, Dec. 13, 2012, American Chemical Society, pp. 72-78.
Linden, David et al., "Handbook of Batteries," McGraw-Hill Handbooks, Third Edition, 2010, New York, The McGraw-Hill Companies, Inc., 1,454 pages.
Liu, Wenwen et al., "Novel and high-performance asymmetric micro-supercapacitors based on graphene quantum dots and polyaniline nanofibers," Nanoscale, vol. 5, Apr. 24, 2013, The Royal Society of Chemistry, pp. 6053-6062.
Liu, Wen-Wen et al., "Superior Micro-Supercapacitors Based on Graphene Quantum Dots," Advanced Functional Materials, vol. 23, Issue 33, Mar. 26, 2013, Wiley-VCH Verlag GmbH & Co. KGaA, Weinheim, pp. 4111-4122.
Liu, Yongfeng et al., "Advanced hydrogen storage alloys for Ni/MH rechargeable batteries," Journal of Materials Chemistry, vol. 21, Issue 11, Dec. 15, 2010, The Royal Society of Chemistry, pp. 4743-4755.
Long, Jeffrey W. et al., "Asymmetric electrochemical capacitors—Stretching the limits of aqueous electrolytes," MRS Bulletin, vol. 36, Jul. 2011, Materials Research Society, pp. 513-522.
Lu, Xihong et al., "Stabilized TiN Nanowire Arrays for High-Performance and Flexible Supercapacitors," Nano Letters, vol. 12, Issue 10, Sep. 4, 2012, American Chemical Society, 6 pages.
Lukatskaya, Maria R. et al., "Cation Intercalation and High Volumetric Capacitance of Two-Dimensional Titanium Carbide," Science, vol. 341, Issue 6153, Sep. 27, 2013, American Association for the Advancement of Science, pp. 1502-1505.
Lukic, Srdjam, M. et al., "Power Management of an Ultracapacitor/Battery Hybrid Energy Storage System in an HEV," IEEE Vehicle Power and Propulsion Conference (VPPC), Sep. 6-8, 2006, IEEE, 6 pages.
Fourth Office Action for Chinese Patent Application No. 201280070343.4, dated Apr. 26, 2017, 22 pages.
Notice of Reason for Rejection for Japanese Patent Application No. 2014-548972, dated May 23, 2017, 4 pages.
International Preliminary Report on Patentability for International Patent Application No. PCT/US2015/061400, dated Jun. 1, 2017, 16 pages.
International Search Report and Written Opinion for International Patent Application No. PCT/US2016/067468, dated Apr. 21, 2017, 10 pages.
International Search Report and Written Opinion for International Patent Application No. PCT/US2017/014126, dated Apr. 20, 2017, 13 pages.
International Search Report and Written Opinion for International Patent Application No. PCT/US2017/023632, dated May 31, 2017, 11 pages.
U.S. Appl. No. 13/725,073, filed Dec. 21, 2012.
U.S. Appl. No. 15/427,210, filed Feb. 8, 2017.
U.S. Appl. No. 14/382,463, filed Sep. 2, 2014.
U.S. Appl. No. 15/319,286, filed Dec. 15, 2016.
U.S. Appl. No. 14/945,232, filed Nov. 18, 2015.
U.S. Appl. No. 15/410,404, filed Jan. 19, 2017.
U.S. Appl. No. 15/472,409, filed Mar. 29, 2017.
U.S. Appl. No. 15/466,425, filed Mar. 22, 2017.
Final Office Action for U.S. Appl. No. 13/725,073, dated Apr. 6, 2018, 37 pages.
Notice of Allowance for U.S. Appl. No. 15/612,405, dated May 16, 2018, 8 pages.
Third Office Action and Search Report for Chinese Patent Application No. 201380023699.7, dated Mar. 9, 2018, 16 pages.
Acerce, Muharrem et al., "Metallic 1T phase $MoS_2$ nanosheets as supercapacitor electrode materials," Nature Nanotechnology, vol. 10, Mar. 23, 2015, Macmillan Publishers Limited, pp. 1-6.
Allen, Matthew J. et al., "Honeycomb Carbon: A Review of Graphene," Chemical Reviews, vol. 110, Issue 1, Jul. 17, 2009, American Chemical Society, pp. 132-145.
Augustyn, Veronica et al., "High-rate electrochemical energy storage through $Li^+$ intercalation pseudocapacitance," Nature Materials, vol. 12, Jun. 2013, www.nature.com/naturematerials, Macmillan Publishers Limited, pp. 518-522.
Author Unknown, "125 Volt Transportation Module," Maxwell Technologies, retrieved Apr. 13, 2016, website last modified Mar. 14, 2013, www.maxwell.com/products/ultracapacitors/125v-tranmodules, Maxwell Technologies, Inc., 2 pages.
Author Unknown, "ELTON: Super Capactiors," www.elton-cap.com/, Retrieved Apr. 15, 2016, ELTON, 1 page.
Author Unknown, "ELTON: Products and Technology," https://web.archive.org/web/20160306044847/http:/www.elton-cap.com/products/, dated Mar. 6, 2016, retrieved Mar. 15, 2017, ELTON, 2 pages.

(56) References Cited

OTHER PUBLICATIONS

Author Unknown, "Monthly battery sales statistics," Battery Association of Japan (BAJ), retrieved Apr. 13, 2016, website last modified Dec. 2010, web.archive.org/web/20110311224259/http://www.baj.or.jp/e/statistics/02.php, Battery Association of Japan, 1 page.
Author Unknown, "Turnigy Graphene Batteries," Batteries & Accessories, https://hobbyking.com/en_us/batteries-accessories/turnigy-graphene-2.html, retrieved Apr. 3, 2017, HobbyKing, 39 pages.
Arthur, Timothy, S. et al., "Three-dimensional electrodes and battery architectures," MRS Bulletin, vol. 36, Jul. 2011, Materials Research Society, pp. 523-531.
Bai, Ming-Hua et al., "Electrodeposition of vanadium oxide-polyaniline composite nanowire electrodes for high energy density supercapacitors," Journal of Materials Chemistry A, vol. 2, Issue 28, Jan. 29, 2014, The Royal Society of Chemistry, pp. 10882-10888.
Beidaghi, Majid, et al., "Capacitive energy storage in micro-scale devices: recent advances in design and fabrication of micro-supercapacitors," Energy and Environmental Science, vol. 7, Issue 3, Jan. 2, 2014, Royal Society of Chemistry, pp. 867-884.
Beidaghi, Majid et al., "Micro-Supercapacitors Based on Interdigital Electrodes of Reduced Graphene Oxide and Carbon Nanotube Composites with Ultra high Power Handling Performance," Advanced Functional Materials, vol. 22, Issue 21, Nov. 2, 2012, Wiley-VCH Verlag GmbH & Co. KGaA, Weinheim, pp. 4501-4510.
Beidaghi, Majid et al., "Micro-supercapacitors based on three dimensional interdigital polypyrrole/C-MEMS electrodes," Electrochimica Acta, vol. 56, Issue 25, Oct. 30, 2011, Elsevier Ltd., pp. 9508-9514.
Bélanger, Daniel et al., "Manganese Oxides: Battery Materials Make the Leap to Electrochemical Capacitors," Electrochemical Society Interface, vol. 17, Issue 1, Spring 2008, The Electrochemical Society, pp. 49-52.
Bian, Li-Jun et al., "Self-doped polyaniline on functionalized carbon cloth as electroactive materials for supercapacitor," Electrochimica Acta, vol. 64, Dec. 29, 2011, Elsevier Ltd., pp. 17-22.
Bouville, Florian et al., "Strong, tough and stiff bioinspired ceramics from brittle constituents," Nature Materials, vol. 13, Issue 5, Mar. 23, 2014, Macmillan Publishers Limited, pp. 1-7.
Brain, Marshall et al., "How Batteries Work," Battery Arrangement and Power—HowStuffWorks, http://electronics.howstuffworks.com/everyday-tech/battery6.htm/printable, accessed Dec. 14, 2015, HowStuffWorks, 4 pages.
Brodie, B.C., "Ueber das Atomgewicht des Graphits," Justus Liebigs Annalen der Chemie, vol. 114, Issue 1, 1860, Wiley-VCH Verlag GmbH & Co. KGaA, Weinheim, pp. 6-24.
Bruke, Andrew, "R&D considerations for the performance and application of electrochemical capacitors," Electrochimica Acta, vol. 53, Jan. 26, 2007, Elsevier Ltd., pp. 1083-1091.
Cao, Liujun et al., "Direct Laser-Patterned Micro-Supercapacitors from Paintable $MoS_2$ Films," Small, vol. 9, Issue 17, Apr. 16, 2013, Wiley-VCH Verlag GmbH & Co. KGaA, Weinheim, pp. 2905-2910.
Chan, Candace K. et al, "High-performance lithium battery anodes using silicon nanowires," Nature Nanotechnology, vol. 3, Issue 1, Jan. 2008, Nature Publishing Group, pp. 31-35.
Chen, Cheng-Meng et al., "Macroporous 'bubble' graphene film via template-directed ordered-assembly for high rate supercapacitors," Chemical Communications, vol. 48, Issue 57, May 15, 2012, The Royal Society of Chemistry, pp. 1-3.
Chen, Ji et al., "High-yield preparation of graphene oxide from small graphite flakes via an improved Hummers method with a simple purification process," Carbon, vol. 81, Jan. 2015, Elsevier Ltd., pp. 1-9.
Chen, L. Y. et al., "Toward the Theoretical Capacitance of $RuO_2$ Reinforced by Highly Conductive Nanoporous Gold," Advanced Energy Materials, vol. 3, Issue 7, Jul. 2014, Wiley-VCH Verlag GmbH & Co. KGaA, Weinheim, pp. 851-856.
Chen, Wei et al., "High-Performance Nanostructured Supercapacitors on a Sponge," Nano Letters, vol. 11, Issue 12, Sep. 16, 2011, American Chemical Society, 22 pages.

Chen, Zongping et al, "Three-dimensional flexible and conductive interconnected graphene networks grown by chemical vapour deposition," Nature Materials, vol. 10, Issue 6, Jun. 2011, Macmillan Publishers Limited, pp. 424-428.
Cheng, Yingwen et al., "Synergistic Effects from Graphene and Carbon Nanotubes EnableFlexible and Robust Electrodes for High-PerformanceSupercapacitors," Nano Letters, vol. 12, Issue 8, Jul. 23, 2012, American Chemical Society, pp. 4206-4211.
Chi, Kai et al., "Freestanding Graphene Paper Supported Three-Dimensional Porous Graphene-Polyaniline Nanocomposite Synthesized by Inkjet Printing and in Flexible All-Solid-State Supercapacitor," ACS Applied Materials & Interfaces, vol. 6, Issue 18, Sep. 10, 2014, American Chemical Society, 8 pages.
Chmiola, John et al., "Monolithic Carbide-Derived Carbon Films for Micro-Supercapacitors," Science, vol. 328, Issue 5977, Apr. 2010, American Association for the Advancement of Science, 4 pages.
Choi, Bong Gill et al., "3D Macroporous Graphene Frameworks for Supercapacitors with High Energy and Power Densities," ACS Nano, vol. 6, Issue 5, Apr. 23, 2012, American Chemical Society, pp. 4020-4028.
Cooper, A. et al., "The UltraBattery—A new battery design for a new beginning in hybrid electric vehicle energy storage," Journal of Power Sources, vol. 188, Issue 2, Dec. 6, 2008, Elsevier B.V. pp. 642-649.
Deville, Sylvain, "Freeze-Casting of Porous Ceramics: A Review of Current Achievements and Issues," Advanced Engineering Materials, vol. 10, Issue 3, Mar. 20, 2008, Wiley-VCH Verlag GmbH & Co., pp. 155-169.
Deville, Sylvain, "Metastable and unstable cellular solidification of colloidal suspensions," Nature Materials, vol. 8, Dec. 2009, Macmillan Publishers Limited, pp. 966-972.
De Volder, Michaël et al., "Corrugated Carbon Nanotube Microstructures with Geometrically Tunable compliance," ACS Nano, vol. 5, Issue 9, Aug. 1, 2011, pp. 7310-7317.
Dunn, Bruce et al., "Electrical Energy Storage for the Grid: A Battery of Choices," Science, vol. 334, Issue 928, Nov. 18, 2011, American Association for the Advancement of Science, pp. 928-935.
Eda, Goki et al., "Chemically Derived Graphene Oxide: Towards Large-Area Thin-Film Electronics and Optoelectronics," Advanced Materials, vol. 22, Issue 22, Apr. 28, 2010, Wiley-VCH Verlag GmbH & Co., pp. 2392-2415.
El-Kady, Maher F. et al., "Engineering Three-Dimensional Hybrid Supercapacitors and Micro-Supercapacitors for High-Performance Integrated Energy Storage," Proceedings of the National Academy of Sciences of the United States of America, vol. 112, Issue 14, Apr. 7, 2015, National Academy of Sciences, pp. 4233-4238.
El-Kady, Maher F. et al., "Laser Scribing of High-Performance and Flexible Graphene-Based Electrochemical Capacitors," Science Magazine, Mar. 16, 2012, vol. 335, No. 6074, 6 pages.
El-Kady, Maher F. et al., "Laser Scribing of High-Performance and Flexibile Graphene-Based Electrochemical Capacitors," Science, vol. 335, Issue 6074, Mar. 16, 2012, www.sciencemag.org/cgi/content/full/335/6074/1326/DC1, American Association for the Advancement of Science, 25 pages.
El-Kady, Maher F. et al., "Scalable Fabrication of High-Power Graphene Micro-Supercapacitors for Flexible and On-Chip Energy Storage," Nature Communications, vol. 4, Issue 1475, Feb. 12, 2013, Macmillan Publishers Limited, pp. 1-9.
El-Kady, Maher F. et al., "Supplementary Information: Scalable Fabrication of High-Power Graphene Micro-Supercapacitors for Flexible and On-Chip Energy Storage", Nature Communications, Submitted for Publication: Oct. 1, 2012, 23 pages.
Fan, Zhuangjun et al., "Asymmetric Supercapacitors Based on Graphene/$MnO_2$ and Activated Carbon Nanofiber Electrodes with High Power and Energy Density," Advanced Functional Materials, vol. 21, Issue 12, Jun. 21, 2011, Wiley-VCH Verlag GmbH & Co. KGaA, Weinheim, pp. 2366-2375.
Feng, Jun et al., "Metallic Few-Layered $VS_2$ Ultrathin Nanosheets: High Two-Dimensional Conductivity for In-Plane Supercapacitors," Journal of the American Chemical Society, vol. 133, Issue 44, Sep. 27, 2011, American Chemical Society, pp. 17832-17838.

(56) References Cited

OTHER PUBLICATIONS

Fischer, Anne E. et al., "Incorporation of Homogeneous, Nanoscale $MnO_2$ within Ultraporous Carbon Structures via Self-Limiting Electroless Deposition: Implications for Electrochemical Capacitors," Nano Letters, vol. 7, Issue 2, Jan. 13, 2007, American Chemical Society, pp. 281-286.

Foo, Ce Yao et al., "Flexible and Highly Scalable $V_2O_5$—rGO Electrodes in an Organic Electrolyte for Supercapacitor Devices," Advanced Energy Materials, vol. 4, Issue 12, Aug. 26, 2014, Wiley-VCH Verlag GmbH & Co. KGaA, Weinheim, pp. 1-7.

Gan, Shiyu et al., "Spontaneous and Fast Growth of Large-Area Graphene Nanofilms Facilitated by Oil/Water Interfaces," Advanced Materials, vol. 24, Issue 29, Jun. 12, 2012, Wiley-VCH Verlag GmbH & Co, pp. 3958-3964.

Gao, Wei et al., "Direct laser writing of micro-supercapacitors on hydrated graphite oxide films," Nature Nanotechnology, vol. 6, Issue 8, Jul. 2011, Macmillan Publishers Limited, p. 496-500.

Gao, Wei et al., "Direct laser writing of micro-supercapacitors on hydrated graphite oxide films," Supplementary Information, Nature Nanotechnology, vol. 6, Issue 8, Jul. 2011, Macmillan Publishers Limited, 15 pages.

Gao, Hongcai et al., "Flexible All-Solid-State Asymmetric Supercapacitors Based on Free-Standing Carbon Nanotube/Graphene and $Mn_3O_4$ Nanoparticle/Graphene Paper Electrodes," Applied Materials & Interfaces, vol. 4, Issue 12, Nov. 20, 2012, American Chemical Society, pp. 7020-7026.

Gao, Hongcai et al., "High-Performance Asymmetric Supercapacitor Based on Graphene Hydrogel and Nanostructured $MnO_2$," ACS Applied Materials and Interfaces, vol. 4, Issue 5, Apr. 30, 2012, American Chemical Society, pp. 2801-2810.

Wang, Xu et al., "Manganese Oxide Micro-Supercapacitors with Ultra-high Areal Capacitance," Electronic Supplementary Material (ESI) for Nanoscale, vol. 5, Mar. 21, 2013, The Royal Society of Chemistry, 6 pages.

Wang, Xuebin et al., "Three-dimensional strutted graphene grown by substrate-free sugar blowing for high-power-density supercapacitors," Nature Communications, vol. 4, Issue 2905, Dec. 16, 2013, Macmillan Publishers Limited, pp. 1-8.

Wassei, Jonathan K. et al., "Oh the Places You'll Go with Graphene", Accounts of Chemical Research, Dec. 20, 2012, Vers. 9, 11 pages.

Weng, Zhe et al., "Graphene-Cellulose Paper Flexible Supercapacitors," Advanced Energy Materials, vol. 1, Issue 5, Aug. 10, 2011, Wiley-VCH Verlag GmbH & Co., pp. 917-922.

Wu, Zhong-Shuai et al., "Graphene Anchored with $Co_3O_4$ Nanoparticles as Anode of Lithium Ion Batteries with Enhanced Reversible Capacity and Cyclic Performance," ACS Nano, vol. 4, Issue 6, May 10, 2010, American Chemical Society, pp. 3187-3194.

Xie, Guoxin, "Direct Electrochemical Synthesis of Reduced Graphene Oxide (rGO)/Copper Composite Films and Their Electrical/Electroactive Properties," Applied Materials & Interfaces, vol. 6, Issue 10, May 1, 2014, American Chemical Society, pp. 7444-7455.

Xu, Bin et al., "Sustainable nitrogen-doped porous carbon with high surface areas prepared from gelatin for supercapacitors," Journal of Materials Chemistry, vol. 22, Issue 36, Jul. 25, 2012, The Royal Society of Chemistry, pp. 19088-19093.

Xu, Jing et al., "Flexible Asymmetric Supercapacitors Based upon $Co_9S_8$ Nanorod//$Co_3O_4$@$RuO_2$ Nanosheet Arrays on Carbon Cloth," ACS Nano, vol. 7, Issue 6, May 6, 2013, American Chemical Society, pp. 5453-5462.

Xu, Yuxi et al., "Flexible Solid-State Supercapacitors Based on Three-Dimensional Graphene Hydrogel Films," ACS Nano, vol. 7, Issue 5, Apr. 4, 2013, American Chemical Society, 8 pages.

Xu, Zhanwei et al., "Electrochemical Supercapacitor Electrodes from Sponge-like Graphene Nanoarchitectures with Ultrahigh Power Density," The Journal of Physical Chemistry Letters, vol. 3, Issue 20, Sep. 25, 2012, American Chemical Society, pp. 2928-2933.

Yan, Jun et al., "Fast and reversible surface redox reaction of graphene-MnO2 composites as supercapacitor electrodes," Carbon, vol. 48, Issue 13, Jun. 25, 2010, Elsevier Ltd., pp. 3825-3833.

Yan, Jun et al., "Recent Advances in Design and Fabrication of Electrochemical Supercapacitors with High Energy Densities," Advanced Energy Materials, vol. 4, Issue 4, 1300816, Dec. 23, 2013, Wiley-VCH Verlag GmbH & Co., pp. 1-43.

Yang, Xiaowei et al, "Bioinspired Effective Prevention of Restacking in Multilayered Graphene Films: Towards the Next Generation of High-Performance Supercapacitors," Advanced Materials, vol. 23, Issue 25, May 10, 2011, Wiley-VCH Verlag GmbH & Co., pp. 2833-2838.

Yang, Peihua et al., "Low-Cost High-Performance Solid-State Asymmetric Supercapacitors Based on $MnO_2$ Nanowires and $Fe_2O_3$ Nanotubes," Nano Letters, vol. 14, Issue 2, Jan. 1, 2014, American Chemical Society, pp. 731-736.

Yang, Xiaowei et al, "Liquid-Mediated Dense Integration of Graphene Materials for Compact Capacitive Energy Storage," Science, vol. 341, Issue 6145, Aug. 2, 2013, American Association for the Advancement of Science, 5 pages.

Yoo, Eunjoo et al., "Large Reversible Li Storage of Graphene Nanosheet Families for Use in Rechargeable Lithium Ion Batteries," Nano Letters, vol. 8, Issue 8, Jul. 24, 2008, American Chemical Society, pp. 2277-2282.

Yoo, Jung Joon et al., "Ultrathin Planar Graphene Supercapacitors," Nano Letters, vol. 11, Issue 4, Mar. 7, 2011, American Chemical Society, pp. 1423-1427.

Yu, Dingshan et al., "Scalable synthesis of hierarchically structured carbon nanotube—graphene fibres for capacitive energy storage," Nature Nanotechnology, vol. 9, Issue 7, May 11, 2014, Macmillan Publishers Limited, pp. 1-8.

Yu, Guihua et al., "Solution-Processed Graphene/$MnO_2$ Nanostructured Textiles for High-Performance Electrochemical Capacitors," Nano Letters, vol. 11, Issue 7, Jun. 13, 2011, American Chemical Society, pp. 2905-2911.

Yu, Pingping et al., "Graphene-Wrapped Polyaniline Nanowire Arrays on Nitrogen-Doped Carbon Fabric as Novel Flexible Hybrid Electrode Materials for High-Performance Supercapacitor," Langmuir, vol. 30, Issue 18, Apr. 24, 2014, American Chemical Society, pp. 5306-5313.

Yu, Pingping et al., "Polyaniline Nanowire Arrays Aligned on Nitrogen-Doped Carbon Fabric for High-Performance Flexible Supercapacitors," Langmuir, vol. 29, Issue 38, Aug. 28, 2013, American Chemical Society, 8 pages.

Yu, Zenan et al., "Supercapacitor electrode materials: nanostructures from 0 to 3 dimensions," Energy & Environmental Science, vol. 8, Issue 3, Dec. 3, 2014, The Royal Society of Chemistry, pp. 702-730.

Zhang, Jintao et al., "A high-performance asymmetric supercapacitor fabricated with graphene-based electrodes," Energy & Environmental Science, vol. 4, Issue 10, Aug. 2, 2011, The Royal Society of Chemistry, pp. 4009-4015.

Zhang, Li et al., "High Voltage Super-capacitors for Energy Storage Devices Applications," 14th Symposium on Electromagnetic Launch Technology, Jun. 10-13, 2008, IEEE, pp. 1-4.

Zhang, Long et al., "Porous 3D graphene-based bulk materials with exceptional high surface area and excellent conductivity for supercapacitors," Scientific Reports, vol. 3, Issue 1408, Mar. 11, 2013, Nature Publishing Group, pp. 1-9.

Zhang, Yonglai et al., "Direct imprinting of microcircuits on graphene oxides film by femtosecond laser reduction," Nano Today, vol. 5, Issue 1, Jan. 19, 2010, Elsevier Ltd., pp. 15-20.

Zhang, Zheye et al., "Facile Synthesis of 3D $MnO_2$-Graphene and Carbon Nanotube-Graphene Composite Networks for High-Performance, Flexible, All-Solid-State Asymmetric Supercapacitors," Advanced Energy Materials, vol. 4, Issue 10, Jul. 15, 2014, Wiley-VCH Verlag GmbH & Co. KGaA, Weinheim, pp. 1-9.

Zhang, Zhongshen et al., "A New-Type Ordered Mesoporous Carbon/Polyaniline Composites Prepared by a Two-step Nanocasting Method for High Performance Supercapacitor Applications," Journal of Materials Chemistry A, vol. 2, Issue 39, Aug. 13, 2014, Royal Society of Chemistry, pp. 1-25.

Zhao, Xin et al., "Incorporation of Manganese Dioxide within Ultraporous Activated Graphene for High-Performance Electrochemical Capacitors," ACS Nano, vol. 6, Issue 6, May 3, 2012, American Chemical Society, pp. 5404-5412.

(56) References Cited

OTHER PUBLICATIONS

Zhi, Mingjia et al, "Nanostructured carbon-metal oxide composite electrodes for supercapacitors: a review," Nanoscale, vol. 5, Issue 1, Oct. 23, 2012,The Royal Society of Chemistry, pp. 72-88.
Zhou, Chuanqiang et al., "Synthesis of Polyaniline Hierarchical Structures in a Dilute SDS/HCl Solution: Nanostructure-Covered Rectangular Tubes," Macromolecules, vol. 42, Issue 4, Jan. 27, 2009, American Chemical Society, pp. 1252-1257.
Zhou, Guangmin et al., "Graphene-Wrapped $Fe_3O_4$ Anode Material with Improved Reversible Capacity and Cyclic Stability for Lithium Ion Batteries," Chemistry of Materials, vol. 22, Issue 18, Aug. 26, 2010, American Chemical Society, pp. 5306-5313.
Zhu, Xianjun et al., "Nanostructured Reduced Graphene Oxide/ $Fe_2O_3$ Composite As a High-Performance Anode Material for Lithium Ion Batteries," ACS Nano, vol. 5, Issue 4, Mar. 28, 2011, American Chemical Society, pp. 3333-3338.
Zhu, Yanwu et al., "Carbon-Based Supercapacitors Produced by Activation of Graphene," Science, vol. 332, May 12, 2011, www.sciencemag.org, pp. 1537-1541.
Zoski, Cynthia G., "Handbook of Electrochemistry," First Edition, 2007, Las Cruces, New Mexico, USA, Elsevier B. V., 935 pages.
Non-Final Office Action for U.S. Appl. No. 13/725,073, dated Apr. 15, 2016, 32 pages.
Final Office Action for U.S. Appl. No. 13/725,073, dated Oct. 4, 2016, 38 pages.
First Examination Report for Australian Patent Application No. 2012378149, dated Jul. 28, 2016, 3 pages.
First Office Action for Chinese Patent Application No. 201280070343.4, dated Jul. 23, 2015, 29 pages.
Second Office Action for Chinese Patent Application No. 201280070343.4, dated Apr. 6, 2016, 8 pages.
Third Office Action for Chinese Patent Application No. 201280070343.4, dated Sep. 7, 2016, 25 pages.
Extended European Search Report for European Patent Application No. 12874989.2, dated Jun. 17, 2015, 6 pages.
Notice of Reason for Rejection for Japanese Patent Application No. 2014-548972, dated Feb. 7, 2017, 5 pages.
International Search Report and Written Opinion for PCT/US2012/071407, dated Nov. 12, 2013, 9 pages.
International Preliminary Report on Patentability for PCT/US2012/071407 dated Jul. 3, 2014, 6 pages.
Non-Final Office Action for U.S. Appl. No. 14/382,463, dated Jan. 6, 2017, 23 pages.
Notice of Allowance for U.S. Appl. No. 14/382,463, dated Apr. 6, 2017, 7 pages.
First Examination Report for Australian Patent Application No. 2013230195, dated May 27, 2016, 4 pages.
First Office Action and Search Report for Chinese Patent Application No. 201380023699.7, dated Nov. 21, 2016, 21 pages.
Extended European Search Report for European Patent Application No. 13757195.6, dated Jul. 1, 2015, 9 pages.
Luo, Zhi-Jia et al., "A timesaving, low-cost, high-yield method for the synthesis of ultrasmall uniform graphene oxide nanosheets and their application in surfactants," Nanotechnology, vol. 27, Issue 5, Dec. 16, 2015, IOP Publishing Ltd, pp. 1-8.
Maiti, Sandipan et al., "Interconnected Network of $MnO_2$ Nanowires with a "Cocoonlike" Morphology: Redox Couple-Mediated Performance Enhancement in Symmetric Aqueous Supercapacitor," ACS Applied Materials & Interfaces, vol. 6, Issue 13, Jun. 16, 2014, American Chemical Society, pp. 10754-10762.
Maiti, Uday Narayan et al., "Three-Dimensional Shape Engineered, Interfacial Gelation of Reduced Graphene Oxide for High Rate, Large Capacity Supercapacitors," vol. 26, Issue 4, Jan. 29, 2014, Wiley-VCH Verlag GmbH & Co., pp. 615-619.
Mao, Lu et al., "Surfactant-stabilized graphene/polyaniline nanofiber composites for high performance supercapacitor electrode," Journal of Materials Chemistry, vol. 22, Issue 1, Oct. 12, 2011, The Royal Society of Chemistry, pp. 80-85.

Marcano, Daniela C. et al., "Improved Synthesis of Graphene Oxide," ACS Nano, vol. 4, Issue 8, Jul. 22, 2010, American Chemical Society, pp. 4806-4814.
Miller, John R. et al., "Electrochemical Capacitors for Energy Management," Materials Science, vol. 321, Aug. 1, 2008, AAAS, pp. 651-652.
Moosavifard, Seyyed E. et al., "Designing 3D highly ordered nanoporous CuO electrodes for high-performance asymmetric supercapacitors," ACS Applied Materials & Interfaces, vol. 7, Issue 8, American Chemical Society, 13 pages.
Moussa, Mahmoud et al, "Free-Standing Composite Hydrogel Film for Superior Volumetric Capacitance," Journal of Materials Chemistry A, vol. 3, Issue 30, Jun. 19, 2015, The Royal Society of Chemistry, pp. 1-8.
Naoi, Katsuhiko et al., "Second generation 'nanohybrid supercapacitor': Evolution of capacitive energy storage devices," Energy & Environmental Science, vol. 5, Issue 11, Sep. 14, 2012, The Royal Society of Chemistry, pp. 9363-9373.
Nathan, Arokia et al., "Flexible Electronics: The Next Ubiquitous Platform," Proceedings of the IEEE, vol. 100, Special Centennial Issue, May 13, 2012, IEEE, pp. 1486-1517.
Niu, Zhiqiang et al., "A Leavening Strategy to Prepare Reduced Graphene Oxide Foams," Advanced Materials, vol. 24, Issue 30, Aug. 8, 2012, Wiley-VCH Verlag GmbH & Co., pp. 1-7.
Oudenhoven, Jos F. M. et al., "All-Solid-State Lithium-Ion Microbatteries: A Review of Various Three-Dimensional Concepts," Advanced Energy Matterials, vol. 1, Issue 1, Wiley-VCH Verlag GmbH & Co. KGaA, Weinheim, pp. 10-33.
Paravannoor, Anjali et al., "High voltage supercapacitors based on carbon-grafted NiO nanowires interfaced with an aprotic ionic liquid," Chemical Communications, vol. 51, Issue 28, Feb. 26, 2015, The Royal Society of Chemistry, pp. 1-4.
Patel, Mehul N. et al., "Hybrid $MnO_2$-disordered mesoporous carbon nanocomposites: synthesis and characterization as electrochemical pseudocapacitor electrodes," Journal of Materials Chemistry, vol. 20, Issue 2, Nov. 11, 2009, The Royal Society of Chemistry, pp. 390-398.
Pech, David et al, "Ultrahigh-power micrometre-sized supercapacitors based on onion-like carbon," Nature Nanotechnology, vol. 5, Sep. 2010, Macmillan Publishers Limited, 10 pages.
Pendashteh, Afshin et al., "Fabrication of anchored copper oxide nanoparticles on graphene oxide nanosheets via an electrostatic coprecipitation and its application as supercapacitor," Electrochimica Acta, vol. 88, Oct. 29, 2012, Elsevier Ltd., pp. 347-357.
Pendashteh, Afshin et al., "Facile synthesis of nanostructured $CuCo_2O_4$ as a novel electrode material for high-rate supercapacitors," vol. 50, Issue 16, Dec. 17, 2013, The Royal Society of Chemistry, 4 pages.
Pendashteh, Afshin et al., "Highly Ordered Mesoporous $CuCo_2O_4$ Nanowires, a Promising Solution for High-Performance Supercapacitors," Chemistry of Materials, vol. 27, Issue 11, Apr. 20, 2015, American Chemical Society, pp. 1-11.
Qing, Xutang et al., "P/N/O co-doped carbonaceous materials based supercapacitor with voltage up to 1.9 V in the aqueous electrolyte," RSC Advances, vol. 4, Issue 99, Oct. 21, 2014, Royal Society of Chemistry, pp. 1-22.
Qiu, Ling et al., "Controllable Corrugation of Chemically Converted Graphene Sheets in Water and Potential Application for Nanofiltration," Chemical Communications, vol. 47, 2011, pp. 5810-5812.
Qu, Qunting et al., "Core-Shell Structure of Polypyrrole Grown on $V_2O_5$ Nanoribbon as High Performance Anode Material for Supercapacitors," Advanced Energy Materials, vol. 2, Issue 8, 2012, Wiley-VCH Verlag GmbH & Co., pp. 1-6.
Raccichini, Rinaldo et al., "The role of graphene for electrochemical energy storage," Nature Materials, vol. 14, Issue 3, Dec. 22, 2014, Macmillan Publishers Limited, pp. 1-9.
Samitsu, Sadaki et al., "Flash freezing route to mesoporous polymer nanofibre networks," Nature Communications, vol. 4, Issue 2653, Oct. 22, 2013, Macmillan Publishers Limited, pp. 1-7.
Shae, Yuanlong et al., "Fabrication of large-area and high-crystallinity photoreduced graphene oxide films via reconstructed two-dimensional multilayer structures," NPG Asia Materials, vol. 6, Issue 8, e119, Aug. 15, 2014, Nature Publishing Group, pp. 1-9.

(56) References Cited

OTHER PUBLICATIONS

Shao, Yuanlong et al., "Graphene-based materials for flexible supercapacitors," Chemical Society Review, vol. 44, Issue 11, Apr. 22, 2015, The Royal Society of Chemistry, 27 pages.
Shao, Yuanlong et al., "High-performance flexible asymmetric supercapacitors based on 3D porous graphene/MnO$_2$ nanorod and graphene/Ag hybrid thin-film electrodes," Journal of Materials Chemistry C, vol. 1, Dec. 5, 2012, The Royal Society of Chemistry, pp. 1245-1251.
Sheats, James R., "Manufacturing and commercialization issues in organic electronics," Journal of Materials Research, vol. 19, Issue 7, Jul. 2004, Materials Research Society, pp. 1974-1989.
Shen, Caiwei et al., "A high-energy-density micro supercapacitor of asymmetric MnO$_2$-carbon configuration by using micro-fabrication technologies," Journal of Power Sources, vol. 234, Feb. 9, 2013, Elsevier B.V., pp. 302-309.
Shen, Jiali et al., "High-Performance Asymmetric Supercapacitor Based on Nano-architectured Polyaniline/Graphene/Carbon Nanotube and Activated Graphene Electrodes," ACS Applied Materials & Interfaces, vol. 5, Issue 17, Aug. 9, 2013, American Chemical Society, 36 pages.
Shown, Indrajit et al., "Conducting polymer-based flexible supercapacitor," Energy Science & Engineering, vol. 3, Issue 1, Nov. 19, 2014, Society of Chemical Industry and John Wiley & Sons Ltd., pp. 1-25.
Simon, P. et al., "Capacitive Energy Storage in Nanostructured Carbon-Electrolyte Systems," Accounts of Chemical Research, vol. 46, Issue 5, Jun. 6, 2012, American Chemical Society, 10 pages.
Simon, Patrice et al., "Materials for electrochemical capacitors," Nature Materials, vol. 7, Issue 11, Nov. 2008, Macmillan Publishers Limited, pp. 845-854.
Simon, Patrice et al., "Where Do Batteries End and Supercapacitors Begin?" Science, vol. 343, Issue 6176, Mar. 14, 2014, American Association for the Advancement of Science, 3 pages.
Snook, Graeme A. et al., "Conducting-polymer-based supercapacitor devices and electrodes," Journal of Power Sources, vol. 196, Jul. 15, 2010, Elsevier B.V., pp. 1-12.
Stoller, Meryl D. et al., "Graphene-Based Ultracapacitors," Nano Letters, vol. 8, Issue 10, Sep. 13, 2008, American Chemical Society, pp. 3498-3502.
Strong, Veronica et al., "Patterning and Electronic Tuning of Laser Scribed Graphene for Flexible All-Carbon Devices," ACS Nano, vol. 6, Issue 2, Jan. 13, 2012, American Chemical Society, p. 1395-1403.
Su, Zijin et al., "Scalable fabrication of MnO$_2$ nanostructure deposited on free-standing Ni nanocone arrays for ultrathin, flexible, high-performance micro-supercapacitor," Energy and Environmental Science, vol. 7, May 28, 2014, The Royal Society of Chemistry, pp. 2652-2659.
Sumboja, Afriyanti et al., "Large Areal Mass, Flexible and Free-Standing Reduced Graphene Oxide/Manganese Dioxide Paper for Asymmetric Supercapacitor Device," Advanced Materials, vol. 25, Issue 20, May 28, 2013, Wiley-VCH Verlag GmbH & Co. KGaA, Weinheim, pp. 2809-2815.
Tian, Yuyu et al., "Synergy of $W_{18}O_{49}$ and Polyaniline for Smart Supercapacitor Electrode Integrated with Energy Level Indicating Functionality," Nano Letters, vol. 14, Issue 4, Mar. 4, 2014, American Chemical Society, pp. 2150-2156.
Toupin, Mathieu et al., "Charge Storage Mechanism of MnO$_2$ Electrode Used in Aqueous Electrochemical Capacitor," Chemistry of Materials, vol. 16, Issue 16, Jul. 16, 2004, American Chemical Society, pp. 3184-3190.
Tran, Henry D. et al., "The oxidation of aniline to produce "polyaniline": a process yielding many different nanoscale structures," Journal of Materials Chemistry, vol. 21, Issue 11, Nov. 25, 2010, The Royal Society of Chemistry, pp. 3534-3550.
Viculis, Lisa M. et al., "A Chemical Route to Carbon Nanoscrolls," Science, vol. 299, Issue 5611, Feb. 28, 2003, American Association for the Advancement of Science, 2 pages.
Vonlanthen, David et al., "A Stable Polyaniline-Benzoquinone-Hydroquinone Supercapacitor," Advanced Materials, vol. 26, Issue 30, Jun. 13, 2014, Wiley-VCH Verlag GmbH & Co., pp. 1-6.
Wallace, Gordon G. et al., "Processable aqueous dispersions of graphene nanosheets," Nature Nanotechnology, vol. 3, Issue 2, 2008, Nature Publishing Group, pp. 101-105.
Wang, Gongkai et al., "Flexible Pillared Graphene-Paper Electrodes for High-Performance Electrochemical Supercapacitors," Small, vol. 8, Issue 3, Dec. 8, 2011, pp. 452-459.
Wang, Guoping et al, "A review of electrode materials for electrochemical supercapacitors," Chemical Society Reviews, vol. 41, Jul. 21, 2011, The Royal Society of Chemistry, pp. 797-828.
Wang, Guoxiu et al., "Graphene nanosheets for enhanced lithium storage in lithium ion batteries," Carbon, vol. 47, Issue 8, Apr. 1, 2009, Elsevier Ltd., pp. 2049-2053.
Wang, Hailiang et al., "Mn$_3$O$_4$-Graphene Hybrid as a High-Capacity Anode Material for Lithium Ion Batteries," Journal of the American Chemical Society, vol. 132, Issue 40, Oct. 13, 2010, American Chemical Society, pp. 13978-13980.
Wang, Huanlei et al., "Graphene-Nickel Cobaltite Nanocomposite Asymmetrical Supercapacitor with Commercial Level Mass Loading," Nano Research, vol. 5, Issue 9, Sep. 2012, Tsinghua University Press and Springer-Verlag Berlin Heidelberg, pp. 605-617.
Wang, Kai et al., "Flexible supercapacitors based on cloth-supported electrodes of conducting polymer nanowire array/SWCNT composites," Journal of Materials Chemistry, vol. 21, Issue 41, Sep. 20, 2011, The Royal Society of Chemistry, pp. 16373-16378.
Notice of Reasons for Rejection for Japanese Patent Application No. 2014-561017, dated Mar. 21, 2017, 10 pages.
International Search Report and Written Opinion for PCT/US2013/029022, dated Jun. 26, 2013, 13 pages.
International Preliminary Report on Patentability for PCT/US2013/029022 dated Sep. 18, 2014, 9 pages.
International Search Report and Written Opinion for International Patent Application No. PCT/US2015/036082, dated Aug. 27, 2015, 15 pages.
International Preliminary Report on Patentability for International Patent Application No. PCT/US2015/036082, dated Dec. 29, 2016, 12 pages.
International Search Report and Written Opinion for International Patent Application No. PCT/US2015/061400, dated Mar. 29, 2016, 20 pages.
Invitation to Pay Additional Fees for International Patent Application No. PCT/US2016/067468, dated Feb. 13, 2017, 2 pages.
Conway, B. E., "Chapter 2: Similarities and Differences between Supercapacitors and Batteries for Storing Electrical Energy," Electrochemical Supercapacitors: Scientific Fundamentals and Technological Applications (book), 1999, New York, Springer Science + Business Media, pp. 11-12.
Conway, B. E., "Chapter 3: Energetics and Elements of the Kinetics of Electrode Processes," Electrochemical Supercapacitors: Scientific Fundamentals and Technological Applications (book), 1999, New York, Springer Science + Business Media, pp. 33-34.
Ozawa, Kazunori, "Lithium-Cell System—Nonaqueous Electrolyte System," Lithium Ion Rechargeable Batteries (book), Chapter 1: General Concepts, Section 1.1.2, 2009, Wiley-VCH Verlag GmbH & Co. KGaA, 5 pages.
Root, Michael, "Electric Vehicles," The TAB™ Battery Book: An In-Depth Guide to Construction, Design, and Use (book), Chapter 2: The Many Uses of Batteries, 2011, The McGraw-Hill Companies, 4 pages.
International Search Report and Written Opinion for International Patent Application No. PCT/US2017/048883, dated Dec. 26, 2017, 10 pages.
Non-Final Office Action for U.S. Appl. No. 14/945,232, dated Jan. 29, 2018, 9 pages.
Extended European Search Report for European Patent Application No. 15809519.0, dated Feb. 5, 2018, 10 pages.
Decision on Rejection for Chinese Patent Application No. 201280070343.4, dated Jan. 5, 2018, 18 pages.
Non-Final Office Action for U.S. Appl. No. 15/612,405, dated Feb. 9, 2018, 9 pages.

(56) References Cited

OTHER PUBLICATIONS

Decision to Grant a Patent for Japanese Patent Application No. 2014-561017, dated Mar. 13, 2018, 4 pages.
Corrected Notice of Allowability for U.S. Appl. No. 15/319,286, dated Nov. 30, 2018, 5 pages.
Notification of the First Office Action for Chinese Patent Application No. 201580072540.3, dated Jun. 25, 2018, 14 pages.
International Preliminary Report on Patentability for International Patent Application No. PCT/US2017/014126, dated Aug. 2, 2018, 10 pages.
Non-Final Office Action for U.S. Appl. No. 15/319,286, dated Jun. 27, 2018, 9 pages.
Non-Final Office Action for U.S. Appl. No. 15/472,409, dated Jun. 29, 2018, 11 pages.
Notice of Allowance for U.S. Appl. No. 15/319,286, dated Oct. 1, 2018, 8 pages.
Non-Final Office Action for U.S. Appl. No. 15/410,404, dated Sep. 27, 2018, 9 pages.
Advisory Action for U.S. Appl. No. 14/945,232, dated Oct. 15, 2018, 3 pages.
Braz, Elton P., et al., "Effects of Gamma Irradiation in Graphene/Poly(ethylene Oxide) Nanocomposites," 2013 International Nuclear Atlantic Conference—INAC 2013, Nov. 24-29, 2013, Recife, PE, Brazil, 7 pages.
Hu, Liangbing, et al., "Lithium-Ion Textile Batteries with Large Areal Mass Loading," Advanced Energy Materials, vol. 1, Issue 6, Oct. 6, 2011, pp. 1012-1017.
Corrected Notice of Allowability for U.S. Appl. No. 15/319,286, dated Oct. 29, 2018, 5 pages.
Final Office Action for U.S. Appl. No. 14/945,232, dated Aug. 10, 2018, 7 pages.
Examination Report for European Patent Application No. 13757195.6, dated Jun. 13, 2018, 7 pages.
Partial Supplementary European Search Report for European Patent Application No. 15861794.4, dated Jun. 28, 2018, 16 pages.
International Preliminary Report on Patentability for International Patent Application No. PCT/US2016/067468, dated Jul. 5, 2018, 7 pages.
Decision on Rejection for Chinese Patent Application No. 201380023699.7, dated Aug. 16, 2018, 11 pages.
International Preliminary Report on Patentability for International Patent Application No. PCT/US2017/024716, dated Oct. 11, 2018, 10 pages.
International Preliminary Report on Patentability for International Patent Application No. PCT/US2017/023632, dated Oct. 4, 2018, 8 pages.
Invitation to Pay Additional Fees for International Patent Application No. PCT/US2018/041728, dated Sep. 12, 2018, 2 pages.
Extended European Search Report for European Patent Application No. 15861794.4, dated Oct. 2, 2018, 13 pages.
First Office Action for Canadian Patent Application No. 2,862,806, dated Nov. 22, 2018, 5 pages.
Notification of the First Office Action for Chinese Patent Application No. 201580043429.1, dated Oct. 29, 2018, 19 pages.
International Search Report and Written Opinion for International Patent Application No. PCT/US2018/041728, dated Nov. 9, 2018, 10 pages.
Examination Report for European Patent Application No. 12874989.2, dated Mar. 5, 2019, 5 pages.
Office Action for Canadian Patent Application No. 2,866,250, dated Jan. 11, 2019, 3 pages.
Notice of Reasons for Rejection for Japanese Patent Application No. 2016-573846, dated Feb. 26, 2019, 8 pages.
Search Report for Japanese Patent Application No. 2016-573846, dated Feb. 28, 2019, 44 pages.
Examination Report No. 1 for Australian Patent Application No. 2015349949, dated Mar. 8, 2019, 4 pages.
International Preliminary Report on Patentability for International Patent Application No. PCT/US2017/048883, dated Mar. 14, 2019, 7 pages.
International Preliminary Report on Patentability for International Patent Application No. PCT/US2017/038992, dated Jan. 3, 2019, 10 pages.
Huang, L. et al., "Pulsed laser assisted reduction of graphene oxide," Carbon, vol. 49, 2011, Elsevier, pp. 2431-2436.
Kumar, P. et al., "Graphene produced by radiation-induced reduction of graphene oxide," Sep. 26, 2010, DOI: DOI:10.1142/S0219581X11008824, 23 pages.
Notice of Preliminary Rejection for Korean Patent Application No. 10-2014-7020353, dated Apr. 15, 2019, 11 pages.
Non-Final Office Action for U.S. Appl. No. 16/029,930, dated Apr. 3, 2019, 13 pages.
Examination Report No. 1 for Australian Patent Application No. 2015277264, dated Mar. 7, 2019, 4 pages.
Interview Summary for U.S. Appl. No. 14/945,232, dated Apr. 11, 2019, 3 pages.
Notification of the Second Office Action for Chinese Patent Application No. 201580072540.3, dated Mar. 7, 2019, 12 pages.
Official Action for Eurasian Patent Application No. 201791078, dated Mar. 27, 2019, 5 pages.
Non-Final Office Action for U.S. Appl. No. 15/688,342, dated Mar. 26, 2019, 9 pages.
Non-Final Office Action for U.S. Appl. No. 15/427,210, dated Feb. 28, 2019, 17 pages.
Non-Final Office Action for U.S. Appl. No. 16/029,930, dated Jan. 14, 2019, 8 pages.
Corrected Notice of Allowability for U.S. Appl. No. 15/319,286, dated Jan. 18, 2019, 5 pages.
Non-Final Office Action for U.S. Appl. No. 14/945,232, dated Jan. 9, 2019, 7 pages.
Final Office Action for U.S. Appl. No. 15/410,404, dated Feb. 21, 2019, 9 pages.
Final Office Action for U.S. Appl. No. 15/472,409, dated Jan. 18, 2019, 12 pages.
Interview Summary for U.S. Appl. No. 15/427,210, dated May 29, 2019, 3 pages.
Non-Final Office Action for U.S. Appl. No. 15/410,404, dated May 24, 2019, 9 pages.

* cited by examiner

CELLULAR GRAPHENE FILMS

RELATED APPLICATIONS

This application claims the benefit of U.S. Provisional Patent Application Ser. No. 62/271,115, filed Dec. 22, 2015, and claims the benefit of U.S. Provisional Patent Application Ser. No. 62/428,608, filed Dec. 1, 2016, the disclosures of which are hereby incorporated herein by reference in their entireties.

BACKGROUND

As a result of the rapidly growing energy needs of modern life, the development of high performance energy storage devices has gained significant attention. Supercapacitors are promising energy storage devices with properties intermediate between those of batteries and traditional capacitors, but they are being improved more rapidly than either. Over the past couple of decades, supercapacitors have become key components of everyday products by replacing batteries and capacitors in an increasing number of applications. Their high power density and excellent low temperature performance have made them the technology of choice for back-up power, cold starting, flash cameras, regenerative braking and hybrid electric vehicles. The future growth of this technology depends on further improvements in energy density, power density, calendar and cycle life and production cost.

SUMMARY

The instant inventors have recognized and provided a solution to the need for higher performance energy storage devices. Provided herein are graphene materials, compositions of matter, fabrication processes and devices with improved performance.

The applications described herein provide for improvements in the areas of flexible electronics such as solar cell arrays, flexible displays and wearable electronics, as well as an increase in energy storage systems with high power densities. Many conventional supercapacitors exhibit low energy densities, and rigid form factors which break or degrade by repeated bending. While normal electronic devices have seen very rapid progress following Moore's law, energy storage devices have advanced only slightly because of the lack of new materials with high charge storage capacity.

The present disclosure provides supercapacitors that may avoid shortcomings of current energy storage technology. Provided herein are materials and fabrication processes of such supercapacitors. In some embodiments, an electrochemical system comprising a first electrode, a second electrode, wherein at least one of the first electrode and the second electrode comprises a three dimensional porous reduced graphene oxide film. In some embodiments, the electrochemical system further comprises an electrolyte disposed between the first electrode and the second electrode. In some embodiments, the electrolyte is an aqueous electrolyte. In some embodiments, the electrochemical system further comprises a separator disposed between the first electrode and the second electrode. In some embodiments, the electrochemical system further comprises a current collector.

In some embodiments, the present disclosure provides three dimensional porous reduced graphene oxide films that may avoid the shortcomings of current supercapacitor technology. Prototype supercapacitors disclosed herein may exhibit improved performance compared to commercial supercapacitors. In some embodiments, the supercapacitor devices described herein exhibit power densities in excess of twice the power density of commercial supercapacitors. In certain embodiments, the supercapacitor devices described herein not only exhibit power densities in excess of twice the power density of commercial supercapacitors, but also may also be charged and discharged in excess of 50% less time.

In some embodiments, the present disclosure provides a simple, yet versatile technique for the fabrication of supercapacitors. In some embodiments, the present disclosure provides a method of fabrication of a supercapacitor electrode. In some embodiments, the fabrication method of such a supercapacitor electrode is based on method for the direct preparation of reduced graphene oxide. In some embodiments, the fabrication method of such a supercapacitor electrode is based on method for the filtration of reduced graphene oxide. In some embodiments, the fabrication method of such a supercapacitor electrode is based on method for freeze casting reduced graphene oxide. In some embodiments, the fabrication method produces an electrode comprising three dimensional porous reduced graphene oxide films.

One aspect provided herein is an electrode comprising a reduced graphene oxide film wherein the graphene oxide film has a thickness of about 1 μm to about 4 μm.

In some embodiments, the graphene oxide film has a double layer capacitance of at least about 10 $\mu F/cm^2$. In some embodiments, the graphene oxide film has a double layer capacitance of at most about 35 $\mu F/cm^2$. In some embodiments, the graphene oxide film has a double layer capacitance of about 10 $\mu F/cm^2$ to about 35 $\mu F/cm^2$. In some embodiments, the graphene oxide film has a double layer capacitance of about 10 $mF/cm^2$ to about 15 $mF/cm^2$, about 10 $mF/cm^2$ to about 20 $mF/cm^2$, about 10 $mF/cm^2$ to about 25 $mF/cm^2$, about 10 $mF/cm^2$ to about 30 $mF/cm^2$, about 10 $mF/cm^2$ to about 35 $mF/cm^2$, about 15 $mF/cm^2$ to about 20 $mF/cm^2$, about 15 $mF/cm^2$ to about 25 $mF/cm^2$, about 15 $mF/cm^2$ to about 30 $mF/cm^2$, about 15 $mF/cm^2$ to about 35 $mF/cm^2$, about 20 $mF/cm^2$ to about 25 $mF/cm^2$, about 20 $mF/cm^2$ to about 30 $mF/cm^2$, about 20 $mF/cm^2$ to about 35 $mF/cm^2$, about 25 $mF/cm^2$ to about 30 $mF/cm^2$, about 25 $mF/cm^2$ to about 35 $mF/cm^2$ or about 30 $mF/cm^2$ to about 35 $mF/cm^2$.

In some embodiments the graphene oxide film has a characteristic time constant of at least about 45 seconds. In some embodiments, the graphene oxide film has a characteristic time constant of at most about 150 seconds. In some embodiments, the graphene oxide film has a characteristic time constant of about 45 to about 150. In some embodiments the graphene oxide film has a characteristic time constant of about 45 seconds to about 50 seconds, about 45 seconds to about 60 seconds, about 45 seconds to about 70 seconds, about 45 seconds to about 80 seconds, about 45 seconds to about 90 seconds, about 45 seconds to about 100 seconds, about 45 seconds to about 120 seconds, about 45 seconds to about 130 seconds, about 45 seconds to about 140 seconds, about 45 seconds to about 150 seconds, about 50 seconds to about 60 seconds, about 50 seconds to about 70 seconds, about 50 seconds to about 80 seconds, about 50 seconds to about 90 seconds, about 50 seconds to about 100 seconds, about 50 seconds to about 120 seconds, about 50 seconds to about 130 seconds, about 50 seconds to about 140 seconds, about 50 seconds to about 150 seconds, about 60 seconds to about 70 seconds, about 60 seconds to about 80 seconds, about 60 seconds to about 90 seconds, about 60 seconds to about 100 seconds, about 60 seconds to about 120 seconds, about 60 seconds to about 130 seconds, about 60 seconds to about 140 seconds, about 60 seconds to about 150 seconds, about 70 seconds to about 80 seconds, about 70 seconds to about 90 seconds, about 70 seconds to about 100 seconds, about 70 seconds to about 120 seconds, about 70 seconds to about 130 seconds, about 70 seconds to about 140 seconds, about 70 seconds to about 150 seconds, about 80 seconds to about 90 seconds, about 80 seconds to about 100 seconds, about 80 seconds to about 120 seconds, about 80 seconds to about 130 seconds, about 80 seconds to about 140 seconds, about 80 seconds to about 150 seconds, about 90 seconds to about 100 seconds, about 90 seconds to about 120 seconds, about 90 seconds to about 130 seconds, about 90 seconds to about 140 seconds, about 90 seconds to about 150 seconds, about 100 seconds to about 120 seconds, about 100 seconds to about 130 seconds, about 100 seconds to about 140 seconds, about 100 seconds to about 150 seconds, about 120 seconds to about 130 seconds, about 120 seconds to about 140 seconds, about 120 seconds to about 150 seconds, about 130 seconds to about 140 seconds, about 130 seconds to about 150 seconds or about 140 seconds to about 150 seconds.

In some embodiments the graphene oxide film has a sheet resistance of at least about $0.125\Omega$. In some embodiments, the graphene oxide film has a sheet resistance of at most about $0.5\Omega$. In some embodiments, the graphene oxide film has a sheet resistance of about $0.125\Omega$ to about $0.5\Omega$. In some embodiments the graphene oxide film has a sheet resistance of about $0.125\Omega$ to about $0.1875\Omega$, about $0.125\Omega$ to about $0.25\Omega$, about $0.125\Omega$ to about $0.3125\Omega$, about $0.125\Omega$ to about $0.375\Omega$, about $0.125\Omega$ to about $0.4375\Omega$, about $0.125\Omega$ to about $0.5\Omega$, about $0.1875\Omega$ to about $0.25\Omega$, about $0.1875\Omega$ to about $0.3125\Omega$, about $0.1875\Omega$ to about $0.375\Omega$, about $0.1875\Omega$ to about $0.4375\Omega$, about $0.1875\Omega$ to about $0.5\Omega$, about $0.25\Omega$ to about $0.3125\Omega$, about $0.25\Omega$ to about $0.375\Omega$, about $0.25\Omega$ to about $0.4375\Omega$, about $0.25\Omega$ to about $0.5\Omega$, about $0.3125\Omega$ to about $0.375\Omega$, about $0.3125\Omega$ to about $0.4375\Omega$, about $0.3125\Omega$ to about $0.5\Omega$, about $0.375\Omega$ to about $0.4375\Omega$, about $0.375\Omega$ to about $0.5\Omega$ or about $0.4375\Omega$ to about $0.5\Omega$.

In some embodiments the graphene oxide film has a charge transport resistance of at least about $0.5\Omega$. In some embodiments, the graphene oxide film has a charge transport resistance of at most about $2\Omega$. In some embodiments, the graphene oxide film has a charge transport resistance of about $0.5\Omega$ to about $2\Omega$. In some embodiments the graphene oxide film has a charge transport resistance of about $0.5\Omega$ to about $0.6\Omega$, about $0.5\Omega$ to about $0.7\Omega$, about $0.5\Omega$ to about $0.8\Omega$, about $0.5\Omega$ to about $0.9\Omega$, about $0.5\Omega$ to about $1\Omega$, about $0.5\Omega$ to about $1.25\Omega$, about $0.5\Omega$ to about $1.5\Omega$, about $0.5\Omega$ to about $1.75\Omega$, about $0.5\Omega$ to about $2\Omega$, about $0.6\Omega$ to about $0.7\Omega$, about $0.6\Omega$ to about $0.8\Omega$, about $0.6\Omega$ to about $0.9\Omega$, about $0.6\Omega$ to about $1\Omega$, about $0.6\Omega$ to about $1.25\Omega$, about $0.6\Omega$ to about $1.5\Omega$, about $0.6\Omega$ to about $1.75\Omega$, about $0.6\Omega$ to about $2\Omega$, about $0.7\Omega$ to about $0.8\Omega$, about $0.7\Omega$ to about $0.9\Omega$, about $0.7\Omega$ to about $1\Omega$, about $0.7\Omega$ to about $1.25\Omega$, about $0.7\Omega$ to about $1.5\Omega$, about $0.7\Omega$ to about $1.75\Omega$, about $0.7\Omega$ to about $2\Omega$, about $0.8\Omega$ to about $0.9\Omega$, about $0.8\Omega$ to about $1\Omega$, about $0.8\Omega$ to about $1.25\Omega$, about $0.8\Omega$ to about $1.5\Omega$, about $0.8\Omega$ to about $1.75\Omega$, about $0.8\Omega$ to about $2\Omega$, about $0.9\Omega$ to about $1\Omega$, about $0.9\Omega$ to about $1.25\Omega$, about $0.9\Omega$ to about $1.5\Omega$, about $0.9\Omega$ to about $1.75\Omega$, about $0.9\Omega$ to about $2\Omega$, about $1\Omega$ to about $1.25\Omega$, about $1\Omega$ to about $1.5\Omega$, about $1\Omega$ to about $1.75\Omega$, about $1\Omega$ to about $2\Omega$, about $1.25\Omega$ to about $1.5\Omega$, about $1.25\Omega$ to about $1.75\Omega$, about $1.25\Omega$ to about $2\Omega$, about $1.5\Omega$ to about $1.75\Omega$, about $1.5\Omega$ to about $2\Omega$ or about $1.75\Omega$ to about $2\Omega$.

In some embodiments the graphene oxide film has a charge transport resistance of at least about 10 kn. In some embodiments, the graphene oxide film has a charge transport resistance of at most about 45 kn. In some embodiments, the graphene oxide film has a charge transport resistance of about $10\Omega$ to about $45\Omega$. In some embodiments the graphene oxide film has a charge transport resistance of about $10\Omega$ to about $15\Omega$, about $10\Omega$ to about $20\Omega$, about $10\Omega$ to about $25\Omega$, about $10\Omega$ to about $30\Omega$, about $10\Omega$ to about $35\Omega$, about $10\Omega$ to about $40\Omega$, about $10\Omega$ to about $45\Omega$, about $15\Omega$ to about $20\Omega$, about $15\Omega$ to about $25\Omega$, about $15\Omega$ to about 30 k$\Omega$, about $15\Omega$ to about $35\Omega$, about $15\Omega$ to about $40\Omega$, about $15\Omega$ to about $45\Omega$, about $20\Omega$ to about $25\Omega$, about $20\Omega$ to about $30\Omega$, about $20\Omega$ to about $35\Omega$, about $20\Omega$ to about $40\Omega$, about $20\Omega$ to about $45\Omega$, about $25\Omega$ to about $30\Omega$, about $25\Omega$ to about 35 k$\Omega$, about $25\Omega$ to about $40\Omega$, about $25\Omega$ to about $45\Omega$, about $30\Omega$ to about $35\Omega$, about $30\Omega$ to about $40\Omega$, about $30\Omega$ to about $45\Omega$, about $35\Omega$ to about $40\Omega$, about $35\Omega$ to about $45\Omega$ or about $40\Omega$ to about $45\Omega$.

In some embodiments the graphene oxide film has a charge transport resistance of at least about 35. In some embodiments, the graphene oxide film has a charge transport resistance of at most about 120. In some embodiments, the graphene oxide film has a charge transport resistance of about 35 to about 120. In some embodiments the graphene oxide film has a charge transport resistance of about 35 $S^{-n}$ to about 45 $S^{-n}$, about 35 $S^{-n}$ to about 55 $S^{-n}$, about 35 $S^{-n}$ to about 65 $S^{-n}$, about 35 $S^{-n}$ to about 75 $S^{-n}$, about 35 $S^{-n}$ to about 85 $S^{-n}$, about 35 $S^{-n}$ to about 95 $S^{-n}$, about 35 $S^{-n}$ to about 100 $S^{-n}$, about 35 $S^{-n}$ to about 110 $S^{-n}$, about 35 $S^{-n}$ to about 120 $S^{-n}$, about 45 $S^{-n}$ to about 55 $S^{-n}$, about 45 $S^{-n}$ to about 65 $S^{-n}$, about 45 $S^{-n}$ to about 75 $S^{-n}$, about 45 $S^{-n}$ to about 85 $S^{-n}$, about 45 $S^{-n}$ to about 95 $S^{-n}$, about 45 $S^{-n}$ to about 100 $S^{-n}$, about 45 $S^{-n}$ to about 110 $S^{-n}$, about 45 $S^{-n}$ to about 120 $S^{-n}$, about 55 $S^{-n}$ to about 65 $S^{-n}$, about 55 $S^{-n}$ to about 75 $S^{-n}$, about 55 $S^{-n}$ to about 85 $S^{-n}$, about 55 $S^{-n}$ to about 95 $S^{-n}$, about 55 $S^{-n}$ to about 100 $S^{-n}$, about 55 $S^{-n}$ to about 110 $S^{-n}$, about 55 $S^{-n}$ to about 120 $S^{-n}$, about 65 $S^{-n}$ to about 75 $S^{-n}$, about 65 $S^{-n}$ to about 85 $S^{-n}$, about 65 $S^{-n}$ to about 95 $S^{-n}$, about 65 $S^{-n}$ to about 100 $S^{-n}$, about 65 $S^{-n}$ to about 110 $S^{-n}$, about 65 $S^{-n}$ to about 120 $S^{-n}$, about 75 $S^{-n}$ to about 85 $S^{-n}$, about 75 $S^{-n}$ to about 95 $S^{-n}$, about 75 $S^{-n}$ to about 100 $S^{-n}$, about 75 $S^{-n}$ to about 110 $S^{-n}$, about 75 $S^{-n}$ to about 120 $S^{-n}$, about 85 $S^{-n}$ to about 95 $S^{-n}$, about 85 $S^{-n}$ to about 100 $S^{-n}$, about 85 $S^{-n}$ to about 110 $S^{-n}$, about 85 $S^{-n}$ to about 120 $S^{-n}$, about 95 $S^{-n}$ to about 100 $S''$, about 95 $S^{-n}$ to about 110 $S''$, about 95 $S^{-n}$ to about 120 $S^{-n}$, about 100 $S^{-n}$ to about 110 $S^{-n}$, about 100 $S^{-n}$ to about 120 $S^{-n}$ or about 110 $S^{-n}$ to about 120 $S^{-n}$.

In some embodiments the graphene oxide film has a constant phase element exponent of at least about 0.1. In some embodiments, the graphene oxide film has a constant phase element exponent of at most about 0.6. In some embodiments, the graphene oxide film has a constant phase element exponent of about 0.1 to about 0.6. In some embodiments the graphene oxide film has a constant phase element exponent of about 0.1 to about 0.2, about 0.1 to about 0.3, about 0.1 to about 0.4, about 0.1 to about 0.5, about 0.1 to about 0.6, about 0.2 to about 0.3, about 0.2 to about 0.4, about 0.2 to about 0.5, about 0.2 to about 0.6, about 0.3 to about 0.4, about 0.3 to about 0.5, about 0.3 to about 0.6, about 0.4 to about 0.5, about 0.4 to about 0.6 or about 0.5 to about 0.6.

In some embodiments the graphene oxide film has a feedback capacitance of at least about 50 F/g. In some embodiments, the graphene oxide film has a feedback capacitance of at most about 200 F/g. In some embodiments, the graphene oxide film has a feedback capacitance of is about 50 F/g to about 200 F/g. In some embodiments the graphene oxide film has a feedback capacitance of is about 50 F/g to about 60 F/g, about 50 F/g to about 70 F/g, about 50 F/g to about 80 F/g, about 50 F/g to about 90 F/g, about 50 F/g to about 100 F/g, about 50 F/g to about 120 F/g, about 50 F/g to about 140 F/g, about 50 F/g to about 160 F/g, about 50 F/g to about 180 F/g, about 50 F/g to about 200 F/g, about 60 F/g to about 70 F/g, about 60 F/g to about 80 F/g, about 60 F/g to about 90 F/g, about 60 F/g to about 100 F/g, about 60 F/g to about 120 F/g, about 60 F/g to about 140 F/g, about 60 F/g to about 160 F/g, about 60 F/g to about 180 F/g, about 60 F/g to about 200 F/g, about 70 F/g to about 80 F/g, about 70 F/g to about 90 F/g, about 70 F/g to about 100 F/g, about 70 F/g to about 120 F/g, about 70 F/g to about 140 F/g, about 70 F/g to about 160 F/g, about 70 F/g to about 180 F/g, about 70 F/g to about 200 F/g, about 80 F/g to about 90 F/g, about 80 F/g to about 100 F/g, about 80 F/g to about 120 F/g, about 80 F/g to about 140 F/g, about 80 F/g to about 160 F/g, about 80 F/g to about 180 F/g, about 80 F/g to about 200 F/g, about 90 F/g to about 100 F/g, about 90 F/g to about 120 F/g, about 90 F/g to about 140 F/g, about 90 F/g to about 160 F/g, about 90 F/g to about 180 F/g, about 90 F/g to about 200 F/g, about 100 F/g to about 120 F/g, about 100 F/g to about 140 F/g, about 100 F/g to about 160 F/g, about 100 F/g to about 180 F/g, about 100 F/g to about 200 F/g, about 120 F/g to about 140 F/g, about 120 F/g to about 160 F/g, about 120 F/g to about 180 F/g, about 120 F/g to about 200 F/g, about 140 F/g to about 160 F/g, about 140 F/g to about 180 F/g, about 140 F/g to about 200 F/g, about 160 F/g to about 180 F/g, about 160 F/g to about 200 F/g or about 180 F/g to about 200 F/g.

In some embodiments the graphene oxide film has a conductivity of at least about 5 S/m. In some embodiments, the graphene oxide film has a conductivity of at most about 20 S/m. In some embodiments, the graphene oxide film has a conductivity of about 5 S/m to about 20 S/m. In some embodiments the graphene oxide film has a conductivity of about 5 S/m to about 6 S/m, about 5 S/m to about 7 S/m, about 5 S/m to about 8 S/m, about 5 S/m to about 9 S/m, about 5 S/m to about 10 S/m, about 5 S/m to about 12 S/m, about 5 S/m to about 14 S/m, about 5 S/m to about 16 S/m, about 5 S/m to about 18 S/m, about 5 S/m to about 20 S/m, about 6 S/m to about 7 S/m, about 6 S/m to about 8 S/m, about 6 S/m to about 9 S/m, about 6 S/m to about 10 S/m, about 6 S/m to about 12 S/m, about 6 S/m to about 14 S/m, about 6 S/m to about 16 S/m, about 6 S/m to about 18 S/m, about 6 S/m to about 20 S/m, about 7 S/m to about 8 S/m, about 7 S/m to about 9 S/m, about 7 S/m to about 10 S/m, about 7 S/m to about 12 S/m, about 7 S/m to about 14 S/m, about 7 S/m to about 16 S/m, about 7 S/m to about 18 S/m, about 7 S/m to about 20 S/m, about 8 S/m to about 9 S/m, about 8 S/m to about 10 S/m, about 8 S/m to about 12 S/m, about 8 S/m to about 14 S/m, about 8 S/m to about 16 S/m, about 8 S/m to about 18 S/m, about 8 S/m to about 20 S/m, about 9 S/m to about 10 S/m, about 9 S/m to about 12 S/m, about 9 S/m to about 14 S/m, about 9 S/m to about 16 S/m, about 9 S/m to about 18 S/m, about 9 S/m to about 20 S/m, about 10 S/m to about 12 S/m, about 10 S/m to about 14 S/m, about 10 S/m to about 16 S/m, about 10 S/m to about 18 S/m, about 10 S/m to about 20 S/m, about 12 S/m to about 14 S/m, about 12 S/m to about 16 S/m, about 12 S/m to about 18 S/m, about 12 S/m to about 20 S/m, about 14 S/m to about 16 S/m, about 14 S/m to about 18 S/m, about 14 S/m to about 20 S/m, about 16 S/m to about 18 S/m, about 16 S/m to about 20 S/m or about 18 S/m to about 20 S/m.

In some embodiments the graphene oxide film has an areal mass loading of at least about 0.1 mg/cm$^2$. In some embodiments, the graphene oxide film has an areal mass loading of at most about 0.5 mg/cm$^2$. In some embodiments, the graphene oxide film has an areal mass loading of about 0.1 mg/cm$^2$ to about 0.5 mg/cm$^2$. In some embodiments the graphene oxide film has an areal mass loading of about 0.1 mg/cm$^2$ to about 0.2 mg/cm$^2$, about 0.1 mg/cm$^2$ to about 0.3 mg/cm$^2$, about 0.1 mg/cm$^2$ to about 0.4 mg/cm$^2$, about 0.1 mg/cm$^2$ to about 0.5 mg/cm$^2$, about 0.2 mg/cm$^2$ to about 0.3 mg/cm$^2$, about 0.2 mg/cm$^2$ to about 0.4 mg/cm$^2$, about 0.2 mg/cm$^2$ to about 0.5 mg/cm$^2$, about 0.3 mg/cm$^2$ to about 0.4 mg/cm$^2$, about 0.3 mg/cm$^2$ to about 0.5 mg/cm$^2$ or about 0.4 mg/cm$^2$ to about 0.5 mg/cm$^2$.

In some embodiments the graphene oxide film has an active density of at least about 0.5 mg/cm$^3$. In some embodiments, the graphene oxide film has an active density of at most about 2 mg/cm$^3$. In some embodiments, the graphene oxide film has an active density of about 0.5 mg/cm$^3$ to about 2 mg/cm$^3$. In some embodiments the graphene oxide film has an active density of about 0.5 mg/cm$^3$ to about 0.75 mg/cm$^3$, about 0.5 mg/cm$^3$ to about 1 mg/cm$^3$, about 0.5 mg/cm$^3$ to about 1.25 mg/cm$^3$, about 0.5 mg/cm$^3$ to about 1.5 mg/cm$^3$, about 0.5 mg/cm$^3$ to about 1.75 mg/cm$^3$, about 0.5 mg/cm$^3$ to about 2 mg/cm$^3$, about 0.75 mg/cm$^3$ to about 1 mg/cm$^3$, about 0.75 mg/cm$^3$ to about 1.25 mg/cm$^3$, about 0.75 mg/cm$^3$ to about 1.5 mg/cm$^3$, about 0.75 mg/cm$^3$ to about 1.75 mg/cm$^3$, about 0.75 mg/cm$^3$ to about 2 mg/cm$^3$, about 1 mg/cm$^3$ to about 1.25 mg/cm$^3$, about 1 mg/cm$^3$ to about 1.5 mg/cm$^3$, about 1 mg/cm$^3$ to about 1.75 mg/cm$^3$, about 1 mg/cm$^3$ to about 2 mg/cm$^3$, about 1.25 mg/cm$^3$ to about 1.5 mg/cm$^3$, about 1.25 mg/cm$^3$ to about 1.75 mg/cm$^3$, about 1.25 mg/cm$^3$ to about 2 mg/cm$^3$, about 1.5 mg/cm$^3$ to about 1.75 mg/cm$^3$, about 1.5 mg/cm$^3$ to about 2 mg/cm$^3$ or about 1.75 mg/cm$^3$ to about 2 mg/cm$^3$.

In some embodiments the graphene oxide film has a gravimetric capacitance, in a current density of about 1 A/g, of at least about 90 F/g. In some embodiments, the graphene oxide film has a gravimetric capacitance, in a current density of about 1 A/g, of at most about 360 F/g. In some embodiments, the graphene oxide film has a gravimetric capacitance, in a current density of about 1 A/g, of about 90 F/g to about 360 F/g. In some embodiments the graphene oxide film has a gravimetric capacitance, in a current density of about 1 A/g, of about 90 F/g to about 120 F/g, about 90 F/g to about 150 F/g, about 90 F/g to about 180 F/g, about 90 F/g to about 210 F/g, about 90 F/g to about 240 F/g, about 90 F/g to about 270 F/g, about 90 F/g to about 300 F/g, about 90 F/g to about 360 F/g, about 120 F/g to about 150 F/g, about 120 F/g to about 180 F/g, about 120 F/g to about 210 F/g, about 120 F/g to about 240 F/g, about 120 F/g to about 270 F/g, about 120 F/g to about 300 F/g, about 120 F/g to about 360 F/g, about 150 F/g to about 180 F/g, about 150 F/g to about 210 F/g, about 150 F/g to about 240 F/g, about 150 F/g to about 270 F/g, about 150 F/g to about 300 F/g, about 150 F/g to about 360 F/g, about 180 F/g to about 210 F/g, about 180 F/g to about 240 F/g, about 180 F/g to about 270 F/g, about 180 F/g to about 300 F/g, about 180 F/g to about 360 F/g, about 210 F/g to about 240 F/g, about 210 F/g to about 270 F/g, about 210 F/g to about 300 F/g, about 210 F/g to about 360 F/g, about 240 F/g to about 270 F/g, about 240 F/g to about 300 F/g, about 240 F/g to about 360 F/g, about 270 F/g to about 300 F/g, about 270 F/g to about 360 F/g or about 300 F/g to about 360 F/g.

In some embodiments the graphene oxide film has a volumetric capacitance, in a current density of about 1 A/g, of at least about 80 F/g. In some embodiments, the graphene oxide film has a volumetric capacitance, in a current density of about 1 A/g, of at most about 360 F/g. In some embodiments, the graphene oxide film has a volumetric capacitance, in a current density of about 1 A/g, of about 80 F/g to about 360 F/g. In some embodiments the graphene oxide film has a volumetric capacitance, in a current density of about 1 A/g, of about 80 F/g to about 120 F/g, about 80 F/g to about 150 F/g, about 80 F/g to about 180 F/g, about 80 F/g to about 210 F/g, about 80 F/g to about 240 F/g, about 80 F/g to about 270 F/g, about 80 F/g to about 300 F/g, about 80 F/g to about 360 F/g, about 120 F/g to about 150 F/g, about 120 F/g to about 180 F/g, about 120 F/g to about 210 F/g, about 120 F/g to about 240 F/g, about 120 F/g to about 270 F/g, about 120 F/g to about 300 F/g, about 120 F/g to about 360 F/g, about 150 F/g to about 180 F/g, about 150 F/g to about 210 F/g, about 150 F/g to about 240 F/g, about 150 F/g to about 270 F/g, about 150 F/g to about 300 F/g, about 150 F/g to about 360 F/g, about 180 F/g to about 210 F/g, about 180 F/g to about 240 F/g, about 180 F/g to about 270 F/g, about 180 F/g to about 300 F/g, about 180 F/g to about 360 F/g, about 210 F/g to about 240 F/g, about 210 F/g to about 270 F/g, about 210 F/g to about 300 F/g, about 210 F/g to about 360 F/g, about 240 F/g to about 270 F/g, about 240 F/g to about 300 F/g, about 240 F/g to about 360 F/g, about 270 F/g to about 300 F/g, about 270 F/g to about 360 F/g, or about 300 F/g to about 360 F/g.

In some embodiments the graphene oxide film has a gravimetric capacitance, in a current density of about 500 A/g, of at least about 25 F/g. In some embodiments, the graphene oxide film has a gravimetric capacitance, in a current density of about 500 A/g, of at most about 100 F/g. In some embodiments, the graphene oxide film has a gravimetric capacitance, in a current density of about 500 A/g, of about 25 F/g to about 100 F/g. In some embodiments the graphene oxide film has a gravimetric capacitance, in a current density of about 500 A/g, of about 25 F/g to about 30 F/g, about 25 F/g to about 40 F/g, about 25 F/g to about 50 F/g, about 25 F/g to about 60 F/g, about 25 F/g to about 70 F/g, about 25 F/g to about 80 F/g, about 25 F/g to about 90 F/g, about 25 F/g to about 100 F/g, about 30 F/g to about 40 F/g, about 30 F/g to about 50 F/g, about 30 F/g to about 60 F/g, about 30 F/g to about 70 F/g, about 30 F/g to about 80 F/g, about 30 F/g to about 90 F/g, about 30 F/g to about 100 F/g, about 40 F/g to about 50 F/g, about 40 F/g to about 60 F/g, about 40 F/g to about 70 F/g, about 40 F/g to about 80 F/g, about 40 F/g to about 90 F/g, about 40 F/g to about 100 F/g, about 50 F/g to about 60 F/g, about 50 F/g to about 70 F/g, about 50 F/g to about 80 F/g, about 50 F/g to about 90 F/g, about 50 F/g to about 100 F/g, about 60 F/g to about 70 F/g, about 60 F/g to about 80 F/g, about 60 F/g to about 90 F/g, about 60 F/g to about 100 F/g, about 70 F/g to about 80 F/g, about 70 F/g to about 90 F/g, about 70 F/g to about 100 F/g, about 80 F/g to about 90 F/g, about 80 F/g to about 100 F/g or about 90 F/g to about 100 F/g.

In some embodiments the graphene oxide film has a capacitive retention, after about 1000 cycles of charging, of at least about 40%. In some embodiments, the graphene oxide film has a capacitive retention, after about 1000 cycles of charging, of at most about 98%. In some embodiments, the graphene oxide film has a capacitive retention, after about 1000 cycles of charging, of about 40% to about 98%. In some embodiments the graphene oxide film has a capacitive retention, after about 1000 cycles of charging, of about 40% to about 50%, about 40% to about 60%, about 40% to about 70%, about 40% to about 80%, about 40% to about 90%, about 40% to about 98%, about 50% to about 60%, about 50% to about 70%, about 50% to about 80%, about 50% to about 90%, about 50% to about 98%, about 60% to about 70%, about 60% to about 80%, about 60% to about 90%, about 60% to about 98%, about 70% to about 80%, about 70% to about 90%, about 70% to about 98%, about 80% to about 90%, about 80% to about 98% or about 90% to about 98%.

In some embodiments the graphene oxide film has a gravimetric energy density of at least about 3 Wh/kg. In some embodiments, the graphene oxide film has a gravimetric energy density of at most about 12 Wh/kg. In some embodiments, the graphene oxide film has a gravimetric energy density of about 3 Wh/kg to about 12 Wh/kg. In some embodiments the graphene oxide film has a gravimetric energy density of about 3 Wh/kg to about 4 Wh/kg, about 3 Wh/kg to about 5 Wh/kg, about 3 Wh/kg to about 6 Wh/kg, about 3 Wh/kg to about 7 Wh/kg, about 3 Wh/kg to about 8 Wh/kg, about 3 Wh/kg to about 9 Wh/kg, about 3 Wh/kg to about 10 Wh/kg, about 3 Wh/kg to about 11 Wh/kg, about 3 Wh/kg to about 12 Wh/kg, about 4 Wh/kg to about 5 Wh/kg, about 4 Wh/kg to about 6 Wh/kg, about 4 Wh/kg to about 7 Wh/kg, about 4 Wh/kg to about 8 Wh/kg, about 4 Wh/kg to about 9 Wh/kg, about 4 Wh/kg to about 10 Wh/kg, about 4 Wh/kg to about 11 Wh/kg, about 4 Wh/kg to about 12 Wh/kg, about 5 Wh/kg to about 6 Wh/kg, about 5 Wh/kg to about 7 Wh/kg, about 5 Wh/kg to about 8 Wh/kg, about 5 Wh/kg to about 9 Wh/kg, about 5 Wh/kg to about 10 Wh/kg, about 5 Wh/kg to about 11 Wh/kg, about 5 Wh/kg to about 12 Wh/kg, about 6 Wh/kg to about 7 Wh/kg, about 6 Wh/kg to about 8 Wh/kg, about 6 Wh/kg to about 9 Wh/kg, about 6 Wh/kg to about 10 Wh/kg, about 6 Wh/kg to about 11 Wh/kg, about 6 Wh/kg to about 12 Wh/kg, about 7 Wh/kg to about 8 Wh/kg, about 7 Wh/kg to about 9 Wh/kg, about 7 Wh/kg to about 10 Wh/kg, about 7 Wh/kg to about 11 Wh/kg, about 7 Wh/kg to about 12 Wh/kg, about 8 Wh/kg to about 9 Wh/kg, about 8 Wh/kg to about 10 Wh/kg, about 8 Wh/kg to about 11 Wh/kg, about 8 Wh/kg to about 12 Wh/kg, about 9 Wh/kg to about 10 Wh/kg, about 9 Wh/kg to about 11 Wh/kg, about 9 Wh/kg to about 12 Wh/kg, about 10 Wh/kg to about 11 Wh/kg, about 10 Wh/kg to about 12 Wh/kg or about 11 Wh/kg to about 12 Wh/kg.

In some embodiments the graphene oxide film has a volumetric energy density of at least about 3 Wh/L. In some embodiments, the graphene oxide film has a volumetric energy density of at most about 12 Wh/L. In some embodiments, the graphene oxide film has a volumetric energy density of about 3 Wh/L to about 12 Wh/L. In some embodiments the graphene oxide film has a volumetric energy density of about 3 Wh/L to about 4 Wh/L, about 3 Wh/L to about 5 Wh/L, about 3 Wh/L to about 6 Wh/L, about 3 Wh/L to about 7 Wh/L, about 3 Wh/L to about 8 Wh/L, about 3 Wh/L to about 9 Wh/L, about 3 Wh/L to about 10 Wh/L, about 3 Wh/L to about 11 Wh/L, about 3 Wh/L to about 12 Wh/L, about 4 Wh/L to about 5 Wh/L, about 4 Wh/L to about 6 Wh/L, about 4 Wh/L to about 7 Wh/L, about 4 Wh/L to about 8 Wh/L, about 4 Wh/L to about 9 Wh/L, about 4 Wh/L to about 10 Wh/L, about 4 Wh/L to about 11 Wh/L, about 4 Wh/L to about 12 Wh/L, about 5 Wh/L to about 6 Wh/L, about 5 Wh/L to about 7 Wh/L, about 5 Wh/L to about 8 Wh/L, about 5 Wh/L to about 9 Wh/L, about 5 Wh/L to about 10 Wh/L, about 5 Wh/L to about 11 Wh/L, about 5 Wh/L to about 12 Wh/L, about 6 Wh/L to about 7 Wh/L, about 6 Wh/L to about 8 Wh/L, about 6 Wh/L to about 9 Wh/L, about 6 Wh/L to about 10 Wh/L, about 6 Wh/L to about 11 Wh/L, about 6 Wh/L to about 12 Wh/L, about 7 Wh/L to about 8 Wh/L, about 7 Wh/L to about 9 Wh/L, about 7 Wh/L to about 10 Wh/L, about 7 Wh/L to about 11 Wh/L, about 7 Wh/L to about 12 Wh/L, about 8 Wh/L to about 9 Wh/L, about 8 Wh/L to about 10 Wh/L, about 8 Wh/L to about 11 Wh/L, about 8 Wh/L to about 12 Wh/L, about 9 Wh/L to about 10 Wh/L, about 9 Wh/L to about 11 Wh/L, about 9 Wh/L to about 12 Wh/L, about 10 Wh/L to about 11 Wh/L, about 10 Wh/L to about 12 Wh/L or about 11 Wh/L to about 12 Wh/L.

In some embodiments the graphene oxide film has a gravimetric power density of at least about 35 kW/kg. In some embodiments, the graphene oxide film has a gravimetric power density of at most about 140 kW/kg. In some embodiments, the graphene oxide film has a gravimetric power density of about 35 kW/kg to about 140 kW/kg. In some embodiments the graphene oxide film has a gravimetric power density of about 35 kW/kg to about 55 kW/kg, about 35 kW/kg to about 75 kW/kg, about 35 kW/kg to about 95 kW/kg, about 35 kW/kg to about 110 kW/kg, about 35 kW/kg to about 125 kW/kg, about 35 kW/kg to about 140 kW/kg, about 55 kW/kg to about 75 kW/kg, about 55 kW/kg to about 95 kW/kg, about 55 kW/kg to about 110 kW/kg, about 55 kW/kg to about 125 kW/kg, about 55 kW/kg to about 140 kW/kg, about 75 kW/kg to about 95 kW/kg, about 75 kW/kg to about 110 kW/kg, about 75 kW/kg to about 125 kW/kg, about 75 kW/kg to about 140 kW/kg, about 95 kW/kg to about 110 kW/kg, about 95 kW/kg to about 125 kW/kg, about 95 kW/kg to about 140 kW/kg, about 110 kW/kg to about 125 kW/kg, about 110 kW/kg to about 140 kW/kg or about 125 kW/kg to about 140 kW/kg.

In some embodiments the graphene oxide film has a volumetric power density of at least about 30 kW/L. In some embodiments, the graphene oxide film has a volumetric power density of at most about 140 kW/L. In some embodiments, the graphene oxide film has a volumetric power density of about 30 kW/L to about 140 kW/L. In some embodiments the graphene oxide film has a volumetric power density of about 30 kW/L to about 50 kW/L, about 30 kW/L to about 70 kW/L, about 30 kW/L to about 90 kW/L, about 30 kW/L to about 110 kW/L, about 30 kW/L to about 130 kW/L, about 30 kW/L to about 140 kW/L, about 50 kW/L to about 70 kW/L, about 50 kW/L to about 90 kW/L, about 50 kW/L to about 110 kW/L, about 50 kW/L to about 130 kW/L, about 50 kW/L to about 140 kW/L, about 70 kW/L to about 90 kW/L, about 70 kW/L to about 110 kW/L, about 70 kW/L to about 130 kW/L, about 70 kW/L to about 140 kW/L, about 90 kW/L to about 110 kW/L, about 90 kW/L to about 130 kW/L, about 90 kW/L to about 140 kW/L, about 110 kW/L to about 130 kW/L, about 110 kW/L to about 140 kW/L or about 130 kW/L to about 140 kW/L.

Another aspect provided herein is an electrode comprising a reduced graphene oxide film, wherein the graphene oxide film contains a three-dimensional hierarchy of pores, wherein the graphene oxide film has a thickness of about 6 μm to about 16 μm.

In some embodiments the graphene oxide film has a double layer capacitance of at least about 25 μF/cm$^2$. In some embodiments, the graphene oxide film has a double layer capacitance of at most about 100 μF/cm$^2$. In some embodiments, the graphene oxide film has a double layer capacitance of about 25 μF/cm$^2$ to about 100 μF/cm$^2$. In some embodiments the graphene oxide film has a double layer capacitance of about 25 μF/cm$^2$ to about 45 μF/cm$^2$, about 25 μF/cm$^2$ to about 65 μF/cm$^2$, about 25 μF/cm$^2$ to about 85 μF/cm$^2$, about 25 μF/cm$^2$ to about 100 μF/cm$^2$, about 45 μF/cm$^2$ to about 65 μF/cm$^2$, about 45 μF/cm$^2$ to about 85 μF/cm$^2$, about 45 μF/cm$^2$ to about 100 μF/cm$^2$, about 65 μF/cm$^2$ to about 85 μF/cm$^2$, about 65 μF/cm$^2$ to about 100 μF/cm$^2$ or about 85 μF/cm$^2$ to about 100 μF/cm$^2$.

In some embodiments the graphene oxide film has a characteristic time constant o at least about 9 seconds. In some embodiments, the graphene oxide film has a characteristic time constant o at most about 36 seconds. In some embodiments, the graphene oxide film has a characteristic time constant o about 9 seconds to about 36 seconds. In some embodiments the graphene oxide film has a characteristic time constant o about 9 seconds to about 12 seconds, about 9 seconds to about 15 seconds, about 9 seconds to about 18 seconds, about 9 seconds to about 21 seconds, about 9 seconds to about 24 seconds, about 9 seconds to about 27 seconds, about 9 seconds to about 30 seconds, about 9 seconds to about 33 seconds, about 9 seconds to about 36 seconds, about 12 seconds to about 15 seconds, about 12 seconds to about 18 seconds, about 12 seconds to about 21 seconds, about 12 seconds to about 24 seconds, about 12 seconds to about 27 seconds, about 12 seconds to about 30 seconds, about 12 seconds to about 33 seconds, about 12 seconds to about 36 seconds, about 15 seconds to about 18 seconds, about 15 seconds to about 21 seconds, about 15 seconds to about 24 seconds, about 15 seconds to about 27 seconds, about 15 seconds to about 30 seconds, about 15 seconds to about 33 seconds, about 15 seconds to about 36 seconds, about 18 seconds to about 21 seconds, about 18 seconds to about 24 seconds, about 18 seconds to about 27 seconds, about 18 seconds to about 30 seconds, about 18 seconds to about 33 seconds, about 18 seconds to about 36 seconds, about 21 seconds to about 24 seconds, about 21 seconds to about 27 seconds, about 21 seconds to about 30 seconds, about 21 seconds to about 33 seconds, about 21 seconds to about 36 seconds, about 24 seconds to about 27 seconds, about 24 seconds to about 30 seconds, about 24 seconds to about 33 seconds, about 24 seconds to about 36 seconds, about 27 seconds to about 30 seconds, about 27 seconds to about 33 seconds, about 27 seconds to about 36 seconds, about 30 seconds to about 33 seconds, about 30 seconds to about 36 seconds or about 33 seconds to about 36 seconds.

In some embodiments the graphene oxide film has a sheet resistance of at least about 0.1Ω. In some embodiments, the graphene oxide film has a sheet resistance of at most about 0.4Ω. In some embodiments, the graphene oxide film has a sheet resistance of about 0.1Ω to about 0.4Ω. In some embodiments the graphene oxide film has a sheet resistance of about 0.1Ω to about 0.2Ω, about 0.1Ω to about 0.3Ω, about 0.1Ω to about 0.4Ω, about 0.2Ω to about 0.3Ω, about 0.2Ω to about 0.4Ω or about 0.3Ω to about 0.4Ω.

In some embodiments the graphene oxide film has a charge transport resistance of at least about 0.1Ω. In some embodiments, the graphene oxide film has a charge transport resistance of at most about 0.4Ω. In some embodiments, the graphene oxide film has a charge transport resistance of about 0.1Ω to about 0.4Ω. In some embodiments the graphene oxide film has a charge transport resistance of about 0.1Ω to about 0.2Ω, about 0.1Ω to about 0.3Ω, about 0.1Ω to about 0.4Ω, about 0.2Ω to about 0.3Ω, about 0.2Ω to about 0.4Ω or about 0.3Ω to about 0.4 Ω. Ω

In some embodiments the graphene oxide film has a leak resistance of at least about 13 kn. In some embodiments, the graphene oxide film has a leak resistance of at most about 60 kΩ. In some embodiments, the graphene oxide film has a leak resistance of about 13 kΩ to about 60 kΩ. In some embodiments the graphene oxide film has a leak resistance of about 13 kΩ to about 15 kΩ, about 13 kΩ to about 20 kΩ, about 13 kΩ to about 30 kΩ, about 13 kΩ to about 40 kΩ, about 13 kΩ to about 50 kΩ, about 13 kΩ to about 60 kΩ, about 15 kΩ to about 20 kΩ, about 15 kΩ to about 30 kΩ, about 15 kΩ to about 40 kΩ, about 15 kΩ to about 50 kΩ, about 15 kΩ to about 60 kΩ, about 20 kΩ to about 30 kΩ, about 20 kΩ to about 40 kΩ, about 20 kΩ to about 50 kΩ, about 20 kΩ to about 60 kΩ, about 30 kΩ to about 40 kΩ, about 30 kΩ to about 50 kΩ, about 30 kΩ to about 60 kΩ, about 40 kΩ to about 50 kΩ, about 40 kΩ to about 60 kΩ or about 50 kΩ to about 60 kΩ.

In some embodiments the graphene oxide film has a Warburg coefficient of at least about 50 $\Omega S^{-n}$. In some embodiments, the graphene oxide film has a Warburg coefficient of at most about 200 $\Omega S^{-n}$. In some embodiments, the graphene oxide film has a Warburg coefficient of about 50 $\Omega S^{-n}$ to about 200 $\Omega S^{-n}$. In some embodiments the graphene oxide film has a Warburg coefficient of about 50 $\Omega S^{-n}$ to about 75 $\Omega S^{-n}$, about 50 $\Omega S^{-n}$ to about 100 $\Omega S^{-n}$, about 50 $\Omega S^{-n}$ to about 125 $\Omega S^{-n}$, about 50 $\Omega S^{-n}$ to about 150 $\Omega S^{-n}$, about 50 $\Omega S^{-n}$ to about 175 $\Omega S^{-n}$, about 50 $\Omega S^{-n}$ to about 200 $\Omega S^{-n}$, about 75 $\Omega S^{-n}$ to about 100 $\Omega S^{-n}$, about 75 $\Omega S^{-n}$ to about 125 $\Omega S^{-n}$, about 75 $\Omega S^{-n}$ to about 150 $\Omega S^{-n}$, about 75 $\Omega S^{-n}$ to about 175 $\Omega S^{-n}$, about 75 $\Omega S^{-n}$ to about 200 $\Omega S^{-n}$, about 100 $\Omega S^{-n}$ to about 125 $\Omega S^{-n}$, about 100 $\Omega S^{-n}$ to about 150 $\Omega S^{-n}$, about 100 $\Omega S^{-n}$ to about 175 $\Omega S^{-n}$, about 100 $\Omega S^{-n}$ to about 200 $\Omega S^{-n}$, about 125 $\Omega S^{-n}$ to about 150 $\Omega S^{-n}$, about 125 $\Omega S^{-n}$ to about 175 $\Omega S^{-n}$, about 125 $\Omega S^{-n}$ to about 200 $\Omega S^{-n}$, about 150 $\Omega S^{-n}$ to about 175 $\Omega S^{-n}$, about 150 $\Omega S^{-n}$ to about 200 $\Omega S^{-n}$ or about 175 $\Omega S^{-n}$ to about 200 $\Omega S^{-n}$.

In some embodiments the graphene oxide film has a constant phase element exponent of at least about 0.2. In some embodiments, the graphene oxide film has a constant phase element exponent of at most about 0.8. In some embodiments, the graphene oxide film has a constant phase element exponent of about 0.2 to about 0.8. In some embodiments the graphene oxide film has a constant phase element exponent of about 0.2 to about 0.3, about 0.2 to about 0.4, about 0.2 to about 0.5, about 0.2 to about 0.6, about 0.2 to about 0.7, about 0.2 to about 0.8, about 0.3 to about 0.4, about 0.3 to about 0.5, about 0.3 to about 0.6, about 0.3 to about 0.7, about 0.3 to about 0.8, about 0.4 to about 0.5, about 0.4 to about 0.6, about 0.4 to about 0.7, about 0.4 to about 0.8, about 0.5 to about 0.6, about 0.5 to about 0.7, about 0.5 to about 0.8, about 0.6 to about 0.7, about 0.6 to about 0.8 or about 0.7 to about 0.8.

In some embodiments the graphene oxide film has a feedback capacitance of at least about 100 F/g. In some embodiments, the graphene oxide film has a feedback capacitance of at most about 400 F/g. In some embodiments, the graphene oxide film has a feedback capacitance of about 100 F/g to about 400 F/g. In some embodiments the graphene oxide film has a feedback capacitance of about 100 F/g to about 200 F/g, about 100 F/g to about 300 F/g, about 100 F/g to about 400 F/g, about 200 F/g to about 300 F/g, about 200 F/g to about 400 F/g or about 300 F/g to about 400 F/g.

In some embodiments the graphene oxide film has a conductivity of at least about 1,000 S/m. In some embodiments, the graphene oxide film has a conductivity of at most about 4,000 S/m. In some embodiments, the graphene oxide film has a conductivity of about 1,000 S/m to about 4,000 S/m. In some embodiments the graphene oxide film has a conductivity of about 1,000 S/m to about 2,000 S/m, about 1,000 S/m to about 3,000 S/m, about 1,000 S/m to about 4,000 S/m, about 2,000 S/m to about 3,000 S/m, about 2,000 S/m to about 4,000 S/m or about 3,000 S/m to about 4,000 S/m.

In some embodiments the graphene oxide film has a strain of at least about 3%. In some embodiments, the graphene oxide film has a strain of at most about 16%. In some embodiments, the graphene oxide film has a strain of about 3% to about 16%. In some embodiments the graphene oxide film has a strain of about 3% to about 5%, about 3% to about 7%, about 3% to about 9%, about 3% to about 11%, about 3% to about 13%, about 3% to about 16%, about 5% to about 7%, about 5% to about 9%, about 5% to about 11%, about 5% to about 13%, about 5% to about 16%, about 7% to about 9%, about 7% to about 11%, about 7% to about 13%, about 7% to about 16%, about 9% to about 11%, about 9% to about 13%, about 9% to about 16%, about 11% to about 13%, about 11% to about 16% or about 13% to about 16%.

In some embodiments the graphene oxide film has a tensile strength of at least about 9 MPa. In some embodiments, the graphene oxide film has a tensile strength of at most about 36 MPa. In some embodiments, the graphene oxide film has a tensile strength of about 9 MPa to about 36 MPa. In some embodiments the graphene oxide film has a tensile strength of about 9 MPa to about 12 MPa, about 9 MPa to about 15 MPa, about 9 MPa to about 18 MPa, about 9 MPa to about 21 MPa, about 9 MPa to about 24 MPa, about 9 MPa to about 27 MPa, about 9 MPa to about 30 MPa, about 9 MPa to about 33 MPa, about 9 MPa to about 36 MPa, about 12 MPa to about 15 MPa, about 12 MPa to about 18 MPa, about 12 MPa to about 21 MPa, about 12 MPa to about 24 MPa, about 12 MPa to about 27 MPa, about 12 MPa to about 30 MPa, about 12 MPa to about 33 MPa, about 12 MPa to about 36 MPa, about 15 MPa to about 18 MPa, about 15 MPa to about 21 MPa, about 15 MPa to about 24 MPa, about 15 MPa to about 27 MPa, about 15 MPa to about 30 MPa, about 15 MPa to about 33 MPa, about 15 MPa to about 36 MPa, about 18 MPa to about 21 MPa, about 18 MPa to about 24 MPa, about 18 MPa to about 27 MPa, about 18 MPa to about 30 MPa, about 18 MPa to about 33 MPa, about 18 MPa to about 36 MPa, about 21 MPa to about 24 MPa, about 21 MPa to about 27 MPa, about 21 MPa to about 30 MPa, about 21 MPa to about 33 MPa, about 21 MPa to about 36 MPa, about 24 MPa to about 27 MPa, about 24 MPa to about 30 MPa, about 24 MPa to about 33 MPa, about 24 MPa to about 36 MPa, about 27 MPa to about 30 MPa, about 27 MPa to about 33 MPa, about 27 MPa to about 36 MPa, about 30 MPa to about 33 MPa, about 30 MPa to about 36 MPa or about 33 MPa to about 36 MPa.

In some embodiments the graphene oxide film has a pore size of at least about 100 nm. In some embodiments, the graphene oxide film has a pore size of at most about 10,000 nm. In some embodiments, the graphene oxide film has a pore size of about 100 nm to about 10,000 nm. In some embodiments the graphene oxide film has a pore size of about 100 nm to about 200 nm, about 100 nm to about 500 nm, about 100 nm to about 1,000 nm, about 100 nm to about 2,000 nm, about 100 nm to about 5,000 nm, about 100 nm to about 10,000 nm, about 200 nm to about 500 nm, about 200 nm to about 1,000 nm, about 200 nm to about 2,000 nm, about 200 nm to about 5,000 nm, about 200 nm to about 10,000 nm, about 500 nm to about 1,000 nm, about 500 nm to about 2,000 nm, about 500 nm to about 5,000 nm, about 500 nm to about 10,000 nm, about 1,000 nm to about 2,000 nm, about 1,000 nm to about 5,000 nm, about 1,000 nm to about 10,000 nm, about 2,000 nm to about 5,000 nm, about 2,000 nm to about 10,000 nm or about 5,000 nm to about 10,000 nm.

In some embodiments the graphene oxide film has an areal mass loading of at least about 0.1 mg/cm². In some embodiments, the graphene oxide film has an areal mass loading of at most about 0.4 mg/cm². In some embodiments, the graphene oxide film has an areal mass loading of about 0.1 mg/cm² to about 0.4 mg/cm². In some embodiments the graphene oxide film has an areal mass loading of about 0.1 mg/cm² to about 0.2 mg/cm², about 0.1 mg/cm² to about 0.3 mg/cm², about 0.1 mg/cm² to about 0.4 mg/cm², about 0.2 mg/cm² to about 0.3 mg/cm², about 0.2 mg/cm² to about 0.4 mg/cm² or about 0.3 mg/cm² to about 0.4 mg/cm².

In some embodiments the graphene oxide film has an active density of at least about 0.08 g/cm². In some embodiments, the graphene oxide film has an active density of at most about 0.4 g/cm². In some embodiments, the graphene oxide film has an active density of about 0.08 g/cm² to about 0.4 g/cm². In some embodiments the graphene oxide film has an active density of about 0.08 g/cm² to about 0.1 g/cm², about 0.08 g/cm² to about 0.2 g/cm², about 0.08 g/cm² to about 0.3 g/cm², about 0.08 g/cm² to about 0.4 g/cm², about 0.1 g/cm² to about 0.2 g/cm², about 0.1 g/cm² to about 0.3 g/cm², about 0.1 g/cm² to about 0.4 g/cm², about 0.2 g/cm² to about 0.3 g/cm², about 0.2 g/cm² to about 0.4 g/cm² or about 0.3 g/cm² to about 0.4 g/cm².

In some embodiments the graphene oxide film has a gravimetric capacitance, in a current density of about 1 A/g, of at least about 140 F/g. In some embodiments, the graphene oxide film has a gravimetric capacitance, in a current density of about 1 A/g, of at most about 600 F/g. In some embodiments, the graphene oxide film has a gravimetric capacitance, in a current density of about 1 A/g, of about 140 F/g to about 600 F/g. In some embodiments the graphene oxide film has a gravimetric capacitance, in a current density of about 1 A/g, of about 140 F/g to about 200 F/g, about 140 F/g to about 300 F/g, about 140 F/g to about 400 F/g, about 140 F/g to about 500 F/g, about 140 F/g to about 600 F/g, about 200 F/g to about 300 F/g, about 200 F/g to about 400 F/g, about 200 F/g to about 500 F/g, about 200 F/g to about 600 F/g, about 300 F/g to about 400 F/g, about 300 F/g to about 500 F/g, about 300 F/g to about 600 F/g, about 400 F/g to about 500 F/g, about 400 F/g to about 600 F/g or about 500 F/g to about 600 F/g.

In some embodiments the graphene oxide film has a volumetric capacitance, in a current density of about 1 A/g, of at least about 20 F/cm³. In some embodiments, the graphene oxide film has a volumetric capacitance, in a current density of about 1 A/g, of at most about 90 F/cm³. In some embodiments, the graphene oxide film has a volumetric capacitance, in a current density of about 1 A/g, of about 20 F/cm³ to about 90 F/cm³. In some embodiments the graphene oxide film has a volumetric capacitance, in a current density of about 1 A/g, of about 20 F/cm³ to about 30 F/cm³, about 20 F/cm³ to about 40 F/cm³, about 20 F/cm³ to about 50 F/cm³, about 20 F/cm³ to about 60 F/cm³, about 20 F/cm³ to about 70 F/cm³, about 20 F/cm³ to about 80 F/cm³, about 20 F/cm³ to about 90 F/cm³, about 30 F/cm³ to about 40 F/cm³, about 30 F/cm³ to about 50 F/cm³, about 30 F/cm³ to about 60 F/cm³, about 30 F/cm³ to about 70 F/cm³, about 30 F/cm³ to about 80 F/cm³, about 30 F/cm³ to about 90 F/cm³, about 40 F/cm³ to about 50 F/cm³, about 40 F/cm³ to about 60 F/cm³, about 40 F/cm³ to about 70 F/cm³, about 40 F/cm³ to about 80 F/cm³, about 40 F/cm³ to about 90 F/cm³, about 50 F/cm³ to about 60 F/cm³, about 50 F/cm³ to about 70 F/cm³, about 50 F/cm³ to about 80 F/cm³, about 50 F/cm³ to about 90 F/cm³, about 60 F/cm³ to about 70 F/cm³, about 60 F/cm³ to about 80 F/cm³, about 60 F/cm³ to about 90 F/cm³, about 70 F/cm³ to about 80 F/cm³, about 70 F/cm³ to about 90 F/cm³ or about 80 F/cm³ to about 90 F/cm³.

In some embodiments the graphene oxide film has a gravimetric capacitance, in a current density of about 500 A/g, of at least about 90 F/g. In some embodiments, the graphene oxide film has a gravimetric capacitance, in a current density of about 500 A/g, of at most about 360 F/g. In some embodiments, the graphene oxide film has a gravimetric capacitance, in a current density of about 500 A/g, of about 90 F/g to about 360 F/g. In some embodiments the graphene oxide film has a gravimetric capacitance, in a current density of about 500 A/g, of about 90 F/g to about 120 F/g, about 90 F/g to about 150 F/g, about 90 F/g to about 180 F/g, about 90 F/g to about 210 F/g, about 90 F/g to about 240 F/g, about 90 F/g to about 270 F/g, about 90 F/g to about 300 F/g, about 90 F/g to about 330 F/g, about 90 F/g to about 360 F/g, about 120 F/g to about 150 F/g, about 120 F/g to about 180 F/g, about 120 F/g to about 210 F/g, about 120 F/g to about 240 F/g, about 120 F/g to about 270 F/g, about 120 F/g to about 300 F/g, about 120 F/g to about 330 F/g, about 120 F/g to about 360 F/g, about 150 F/g to about 180 F/g, about 150 F/g to about 210 F/g, about 150 F/g to about 240 F/g, about 150 F/g to about 270 F/g, about 150 F/g to about 300 F/g, about 150 F/g to about 330 F/g, about 150 F/g to about 360 F/g, about 180 F/g to about 210 F/g, about 180 F/g to about 240 F/g, about 180 F/g to about 270 F/g, about 180 F/g to about 300 F/g, about 180 F/g to about 330 F/g, about 180 F/g to about 360 F/g, about 210 F/g to about 240 F/g, about 210 F/g to about 270 F/g, about 210 F/g to about 300 F/g, about 210 F/g to about 330 F/g, about 210 F/g to about 360 F/g, about 240 F/g to about 270 F/g, about 240 F/g to about 300 F/g, about 240 F/g to about 330 F/g, about 240 F/g to about 360 F/g, about 270 F/g to about 300 F/g, about 270 F/g to about 330 F/g, about 270 F/g to about 360 F/g, about 300 F/g to about 330 F/g, about 300 F/g to about 360 F/g or about 330 F/g to about 360 F/g.

In some embodiments the graphene oxide film has a capacitive retention, after about 1000 cycles of charging, of at least about 50%. In some embodiments, the graphene oxide film has a capacitive retention, after about 1000 cycles of charging, of at most about 99%. In some embodiments, the graphene oxide film has a capacitive retention, after about 1000 cycles of charging, of about 50% to about 99%. In some embodiments the graphene oxide film has a capacitive retention, after about 1000 cycles of charging, of about 50% to about 60%, about 50% to about 70%, about 50% to about 80%, about 50% to about 90%, about 50% to about 99%, about 60% to about 70%, about 60% to about 80%, about 60% to about 90%, about 60% to about 99%, about 70% to about 80%, about 70% to about 90%, about 70% to about 99%, about 80% to about 90%, about 80% to about 99%, about 90% to about 99%.

In some embodiments the graphene oxide film has a gravimetric energy density of at least about 4 Wh/kg. In some embodiments, the graphene oxide film has a gravimetric energy density of at most about 20 Wh/kg. In some embodiments, the graphene oxide film has a gravimetric energy density of about 4 Wh/kg to about 20 Wh/kg. In some embodiments the graphene oxide film has a gravimetric energy density of about 4 Wh/kg to about 6 Wh/kg, about 4 Wh/kg to about 8 Wh/kg, about 4 Wh/kg to about 10 Wh/kg, about 4 Wh/kg to about 12 Wh/kg, about 4 Wh/kg to about 14 Wh/kg, about 4 Wh/kg to about 16 Wh/kg, about 4 Wh/kg to about 18 Wh/kg, about 4 Wh/kg to about 20 Wh/kg, about 6 Wh/kg to about 8 Wh/kg, about 6 Wh/kg to about 10 Wh/kg, about 6 Wh/kg to about 12 Wh/kg, about 6 Wh/kg to about 14 Wh/kg, about 6 Wh/kg to about 16 Wh/kg, about 6 Wh/kg to about 18 Wh/kg, about 6 Wh/kg to about 20 Wh/kg, about 8 Wh/kg to about 10 Wh/kg, about 8 Wh/kg to about 12 Wh/kg, about 8 Wh/kg to about 14 Wh/kg, about 8 Wh/kg to about 16 Wh/kg, about 8 Wh/kg to about 18 Wh/kg, about 8 Wh/kg to about 20 Wh/kg, about 10 Wh/kg to about 12 Wh/kg, about 10 Wh/kg to about 14 Wh/kg, about 10 Wh/kg to about 16 Wh/kg, about 10 Wh/kg to about 18 Wh/kg, about 10 Wh/kg to about 20 Wh/kg, about 12 Wh/kg to about 14 Wh/kg, about 12 Wh/kg to about 16 Wh/kg, about 12 Wh/kg to about 18 Wh/kg, about 12 Wh/kg to about 20 Wh/kg, about 14 Wh/kg to about 16 Wh/kg, about 14 Wh/kg to about 18 Wh/kg, about 14 Wh/kg to about 20 Wh/kg, about 16 Wh/kg to about 18 Wh/kg, about 16 Wh/kg to about 20 Wh/kg, or about 18 Wh/kg to about 20 Wh/kg.

In some embodiments the graphene oxide film has a volumetric energy density of at least about 0.75 Wh/L. In some embodiments, the graphene oxide film has a volumetric energy density of at most about 3 Wh/L. In some embodiments, the graphene oxide film has a volumetric energy density of about 0.75 Wh/L to about 3 Wh/L. In some embodiments the graphene oxide film has a volumetric energy density of about 0.75 Wh/L to about 1 Wh/L, about 0.75 Wh/L to about 1.25 Wh/L, about 0.75 Wh/L to about 1.5 Wh/L, about 0.75 Wh/L to about 1.75 Wh/L, about 0.75 Wh/L to about 2 Wh/L, about 0.75 Wh/L to about 2.25 Wh/L, about 0.75 Wh/L to about 2.5 Wh/L, about 0.75 Wh/L to about 2.75 Wh/L, about 0.75 Wh/L to about 3 Wh/L, about 1 Wh/L to about 1.25 Wh/L, about 1 Wh/L to about 1.5 Wh/L, about 1 Wh/L to about 1.75 Wh/L, about 1 Wh/L to about 2 Wh/L, about 1 Wh/L to about 2.25 Wh/L, about 1 Wh/L to about 2.5 Wh/L, about 1 Wh/L to about 2.75 Wh/L, about 1 Wh/L to about 3 Wh/L, about 1.25 Wh/L to about 1.5 Wh/L, about 1.25 Wh/L to about 1.75 Wh/L, about 1.25 Wh/L to about 2 Wh/L, about 1.25 Wh/L to about 2.25 Wh/L, about 1.25 Wh/L to about 2.5 Wh/L, about 1.25 Wh/L to about 2.75 Wh/L, about 1.25 Wh/L to about 3 Wh/L, about 1.5 Wh/L to about 1.75 Wh/L, about 1.5 Wh/L to about 2 Wh/L, about 1.5 Wh/L to about 2.25 Wh/L, about 1.5 Wh/L to about 2.5 Wh/L, about 1.5 Wh/L to about 2.75 Wh/L, about 1.5 Wh/L to about 3 Wh/L, about 1.75 Wh/L to about 2 Wh/L, about 1.75 Wh/L to about 2.25 Wh/L, about 1.75 Wh/L to about 2.5 Wh/L, about 1.75 Wh/L to about 2.75 Wh/L, about 1.75 Wh/L to about 3 Wh/L, about 2 Wh/L to about 2.25 Wh/L, about 2 Wh/L to about 2.5 Wh/L, about 2 Wh/L to about 2.75 Wh/L, about 2 Wh/L to about 3 Wh/L, about 2.25 Wh/L to about 2.5 Wh/L, about 2.25 Wh/L to about 2.75 Wh/L, about 2.25 Wh/L to about 3 Wh/L, about 2.5 Wh/L to about 2.75 Wh/L, about 2.5 Wh/L to about 3 Wh/L or about 2.75 Wh/L to about 3 Wh/L.

In some embodiments the graphene oxide film has a gravimetric power density of at least about 140 kW/kg. In some embodiments, the graphene oxide film has a gravimetric power density of at most about 600 kW/kg. In some embodiments, the graphene oxide film has a gravimetric power density of about 140 kW/kg to about 600 kW/kg. In some embodiments the graphene oxide film has a gravimetric power density of about 140 kW/kg to about 200 kW/kg, about 140 kW/kg to about 260 kW/kg, about 140 kW/kg to about 320 kW/kg, about 140 kW/kg to about 380 kW/kg, about 140 kW/kg to about 440 kW/kg, about 140 kW/kg to about 500 kW/kg, about 140 kW/kg to about 560 kW/kg, about 140 kW/kg to about 600 kW/kg, about 200 kW/kg to about 260 kW/kg, about 200 kW/kg to about 320 kW/kg, about 200 kW/kg to about 380 kW/kg, about 200 kW/kg to about 440 kW/kg, about 200 kW/kg to about 500 kW/kg, about 200 kW/kg to about 560 kW/kg, about 200 kW/kg to about 600 kW/kg, about 260 kW/kg to about 320 kW/kg, about 260 kW/kg to about 380 kW/kg, about 260 kW/kg to about 440 kW/kg, about 260 kW/kg to about 500 kW/kg, about 260 kW/kg to about 560 kW/kg, about 260 kW/kg to about 600 kW/kg, about 320 kW/kg to about 380 kW/kg, about 320 kW/kg to about 440 kW/kg, about 320 kW/kg to about 500 kW/kg, about 320 kW/kg to about 560 kW/kg, about 320 kW/kg to about 600 kW/kg, about 380 kW/kg to about 440 kW/kg, about 380 kW/kg to about 500 kW/kg, about 380 kW/kg to about 560 kW/kg, about 380 kW/kg to about 600 kW/kg, about 440 kW/kg to about 500 kW/kg, about 440 kW/kg to about 560 kW/kg, about 440 kW/kg to about 600 kW/kg, about 500 kW/kg to about 560 kW/kg, about 500 kW/kg to about 600 kW/kg or about 560 kW/kg to about 600 kW/kg.

In some embodiments the graphene oxide film has a volumetric power density of at least about 25 kW/L. In some embodiments, the graphene oxide film has a volumetric power density of at most about 100 kW/L. In some embodiments, the graphene oxide film has a volumetric power density of about 25 kW/L to about 100 kW/L. In some embodiments the graphene oxide film has a volumetric power density of about 25 kW/L to about 50 kW/L, about 25 kW/L to about 75 kW/L, about 25 kW/L to about 100 kW/L, about 50 kW/L to about 75 kW/L, about 50 kW/L to about 100 kW/L or about 75 kW/L to about 100 kW/L.

In some embodiments the graphene oxide film has an areal capacitance of at least about 25 $mF/cm^2$. In some embodiments, the graphene oxide film has an areal capacitance of at most about 100 $mF/cm^2$. In some embodiments, the graphene oxide film has an areal capacitance of about 25 $mF/cm^2$ to about 100 $mF/cm^2$. In some embodiments the graphene oxide film has an areal capacitance of about 25 $mF/cm^2$ to about 50 $mF/cm^2$, about 25 $mF/cm^2$ to about 75 $mF/cm^2$, about 25 $mF/cm^2$ to about 100 $mF/cm^2$, about 50 $mF/cm^2$ to about 75 $mF/cm^2$, about 50 $mF/cm^2$ to about 100 $mF/cm^2$ or about 75 $mF/cm^2$ to about 100 $mF/cm^2$.

Another aspect provided herein is an electrode comprising a reduced graphene oxide film, wherein the graphene oxide film contains a three-dimensional hierarchy of pores, wherein the graphene oxide film has a thickness of about 15 μm to about 32 μm.

In some embodiments the graphene oxide film has an areal mass loading of at least about 0.2 $mg/cm^2$. In some embodiments, the graphene oxide film has an areal mass loading of at most about 0.8 $mg/cm^2$. In some embodiments, the graphene oxide film has an areal mass loading of about 0.2 $mg/cm^2$ to about 0.8 $mg/cm^2$. In some embodiments the graphene oxide film has an areal mass loading of about 0.2 $mg/cm^2$ to about 0.4 $mg/cm^2$, about 0.2 $mg/cm^2$ to about 0.6 $mg/cm^2$, about 0.2 $mg/cm^2$ to about 0.8 $mg/cm^2$, about 0.4 $mg/cm^2$ to about 0.6 $mg/cm^2$, about 0.4 $mg/cm^2$ to about 0.8 $mg/cm^2$ or about 0.6 $mg/cm^2$ to about 0.8 $mg/cm^2$.

In some embodiments the graphene oxide film has an active density of at least about 0.1 $g/cm^3$. In some embodiments, the graphene oxide film has an active density of at most about 0.5 $g/cm^3$. In some embodiments, the graphene oxide film has an active density of about 0.1 $g/cm^3$ to about 0.5 $g/cm^3$. In some embodiments the graphene oxide film has an active density of about 0.1 $g/cm^3$ to about 0.2 $g/cm^3$, about 0.1 $g/cm^3$ to about 0.3 $g/cm^3$, about 0.1 $g/cm^3$ to about 0.4 $g/cm^3$, about 0.1 $g/cm^3$ to about 0.5 $g/cm^3$, about 0.2 $g/cm^3$ to about 0.3 $g/cm^3$, about 0.2 $g/cm^3$ to about 0.4 $g/cm^3$, about 0.2 $g/cm^3$ to about 0.5 $g/cm^3$, about 0.3 $g/cm^3$ to about 0.4 $g/cm^3$, about 0.3 $g/cm^3$ to about 0.5 $g/cm^3$ or about 0.4 $g/cm^3$ to about 0.5 $g/cm^3$.

In some embodiments the graphene oxide film has a gravimetric capacitance, in a current density of about 1 A/g, of at least about 130 F/g. In some embodiments, the graphene oxide film has a gravimetric capacitance, in a current density of about 1 A/g, of at most about 550 F/g. In some embodiments, the graphene oxide film has a gravimetric capacitance, in a current density of about 1 A/g, of about 130

F/g to about 550 F/g. In some embodiments the graphene oxide film has a gravimetric capacitance, in a current density of about 1 A/g, of about 130 F/g to about 150 F/g, about 130 F/g to about 200 F/g, about 130 F/g to about 250 F/g, about 130 F/g to about 300 F/g, about 130 F/g to about 350 F/g, about 130 F/g to about 400 F/g, about 130 F/g to about 450 F/g, about 130 F/g to about 500 F/g, about 130 F/g to about 550 F/g, about 150 F/g to about 200 F/g, about 150 F/g to about 250 F/g, about 150 F/g to about 300 F/g, about 150 F/g to about 350 F/g, about 150 F/g to about 400 F/g, about 150 F/g to about 450 F/g, about 150 F/g to about 500 F/g, about 150 F/g to about 550 F/g, about 200 F/g to about 250 F/g, about 200 F/g to about 300 F/g, about 200 F/g to about 350 F/g, about 200 F/g to about 400 F/g, about 200 F/g to about 450 F/g, about 200 F/g to about 500 F/g, about 200 F/g to about 550 F/g, about 250 F/g to about 300 F/g, about 250 F/g to about 350 F/g, about 250 F/g to about 400 F/g, about 250 F/g to about 450 F/g, about 250 F/g to about 500 F/g, about 250 F/g to about 550 F/g, about 300 F/g to about 350 F/g, about 300 F/g to about 400 F/g, about 300 F/g to about 450 F/g, about 300 F/g to about 500 F/g, about 300 F/g to about 550 F/g, about 350 F/g to about 400 F/g, about 350 F/g to about 450 F/g, about 350 F/g to about 500 F/g, about 350 F/g to about 550 F/g, about 400 F/g to about 450 F/g, about 400 F/g to about 500 F/g, about 400 F/g to about 550 F/g, about 450 F/g to about 500 F/g, about 450 F/g to about 550 F/g or about 500 F/g to about 550 F/g.

In some embodiments the graphene oxide film has a volumetric capacitance, in a current density of about 1 A/g, of at least about 20 F/cm$^3$. In some embodiments, the graphene oxide film has a volumetric capacitance, in a current density of about 1 A/g, of at most about 100 F/cm$^3$. In some embodiments, the graphene oxide film has a volumetric capacitance, in a current density of about 1 A/g, of about 20 F/cm$^3$ to about 100 F/cm$^3$. In some embodiments the graphene oxide film has a volumetric capacitance, in a current density of about 1 A/g, of about 20 F/cm$^3$ to about 40 F/cm$^3$, about 20 F/cm$^3$ to about 60 F/cm$^3$, about 20 F/cm$^3$ to about 80 F/cm$^3$, about 20 F/cm$^3$ to about 100 F/cm$^3$, about 40 F/cm$^3$ to about 60 F/cm$^3$, about 40 F/cm$^3$ to about 80 F/cm$^3$, about 40 F/cm$^3$ to about 100 F/cm$^3$, about 60 F/cm$^3$ to about 80 F/cm$^3$, about 60 F/cm$^3$ to about 100 F/cm$^3$ or about 80 F/cm$^3$ to about 100 F/cm$^3$.

In some embodiments the graphene oxide film has a gravimetric energy density of at least about 4 Wh/kg. In some embodiments, the graphene oxide film has a gravimetric energy density of at most about 20 Wh/kg. In some embodiments, the graphene oxide film has a gravimetric energy density of about 4 Wh/kg to about 20 Wh/kg. In some embodiments the graphene oxide film has a gravimetric energy density of about 4 Wh/kg to about 8 Wh/kg, about 4 Wh/kg to about 12 Wh/kg, about 4 Wh/kg to about 16 Wh/kg, about 4 Wh/kg to about 20 Wh/kg, about 8 Wh/kg to about 12 Wh/kg, about 8 Wh/kg to about 16 Wh/kg, about 8 Wh/kg to about 20 Wh/kg, about 12 Wh/kg to about 16 Wh/kg, about 12 Wh/kg to about 20 Wh/kg or about 16 Wh/kg to about 20 Wh/kg.

In some embodiments the graphene oxide film has a volumetric energy density of at least about 0.75 Wh/L. In some embodiments, the graphene oxide film has a volumetric energy density of at most about 3 Wh/L. In some embodiments, the graphene oxide film has a volumetric energy density of about 0.75 Wh/L to about 3 Wh/L. In some embodiments the graphene oxide film has a volumetric energy density of about 0.75 Wh/L to about 1 Wh/L, about 0.75 Wh/L to about 1.5 Wh/L, about 0.75 Wh/L to about 2 Wh/L, about 0.75 Wh/L to about 2.5 Wh/L, about 0.75 Wh/L to about 3 Wh/L, about 1 Wh/L to about 1.5 Wh/L, about 1 Wh/L to about 2 Wh/L, about 1 Wh/L to about 2.5 Wh/L, about 1 Wh/L to about 3 Wh/L, about 1.5 Wh/L to about 2 Wh/L, about 1.5 Wh/L to about 2.5 Wh/L, about 1.5 Wh/L to about 3 Wh/L, about 2 Wh/L to about 2.5 Wh/L, about 2 Wh/L to about 3 Wh/L or about 2.5 Wh/L to about 3 Wh/L.

In some embodiments the graphene oxide film has a gravimetric power density of at least about 75 kW/kg. In some embodiments, the graphene oxide film has a gravimetric power density of at most about 300 kW/kg. In some embodiments, the graphene oxide film has a gravimetric power density of about 75 kW/kg to about 300 kW/kg. In some embodiments the graphene oxide film has a gravimetric power density of about 75 kW/kg to about 100 kW/kg, about 75 kW/kg to about 150 kW/kg, about 75 kW/kg to about 200 kW/kg, about 75 kW/kg to about 250 kW/kg, about 75 kW/kg to about 300 kW/kg, about 100 kW/kg to about 150 kW/kg, about 100 kW/kg to about 200 kW/kg, about 100 kW/kg to about 250 kW/kg, about 100 kW/kg to about 300 kW/kg, about 150 kW/kg to about 200 kW/kg, about 150 kW/kg to about 250 kW/kg, about 150 kW/kg to about 300 kW/kg, about 200 kW/kg to about 250 kW/kg, about 200 kW/kg to about 300 kW/kg or about 250 kW/kg to about 300 kW/kg.

In some embodiments the graphene oxide film has a volumetric power density of at least about 14 kW/L. In some embodiments, the graphene oxide film has a volumetric power density of at most about 60 kW/L. In some embodiments, the graphene oxide film has a volumetric power density of about 14 kW/L to about 60 kW/L. In some embodiments the graphene oxide film has a volumetric power density of about 14 kW/L to about 20 kW/L, about 14 kW/L to about 30 kW/L, about 14 kW/L to about 40 kW/L, about 14 kW/L to about 50 kW/L, about 14 kW/L to about 60 kW/L, about 20 kW/L to about 30 kW/L, about 20 kW/L to about 40 kW/L, about 20 kW/L to about 50 kW/L, about 20 kW/L to about 60 kW/L, about 30 kW/L to about 40 kW/L, about 30 kW/L to about 50 kW/L, about 30 kW/L to about 60 kW/L, about 40 kW/L to about 50 kW/L, about 40 kW/L to about 60 kW/L or about 50 kW/L to about 60 kW/L.

In some embodiments the graphene oxide film has an areal capacitance of at least about 50 mF/cm$^2$. In some embodiments, the graphene oxide film has an areal capacitance of at most about 300 mF/cm$^2$. In some embodiments, the graphene oxide film has an areal capacitance of about 50 mF/cm$^2$ to about 300 mF/cm$^2$. In some embodiments the graphene oxide film has an areal capacitance of about 50 mF/cm$^2$ to about 100 mF/cm$^2$, about 50 mF/cm$^2$ to about 150 mF/cm$^2$, about 50 mF/cm$^2$ to about 200 mF/cm$^2$, about 50 mF/cm$^2$ to about 250 mF/cm$^2$, about 50 mF/cm$^2$ to about 300 mF/cm$^2$, about 100 mF/cm$^2$ to about 150 mF/cm$^2$, about 100 mF/cm$^2$ to about 200 mF/cm$^2$, about 100 mF/cm$^2$ to about 250 mF/cm$^2$, about 100 mF/cm$^2$ to about 300 mF/cm$^2$, about 150 mF/cm$^2$ to about 200 mF/cm$^2$, about 150 mF/cm$^2$ to about 250 mF/cm$^2$, about 150 mF/cm$^2$ to about 300 mF/cm$^2$, about 200 mF/cm$^2$ to about 250 mF/cm$^2$, about 200 mF/cm$^2$ to about 300 mF/cm$^2$ or about 250 mF/cm$^2$ to about 300 mF/cm$^2$.

Another aspect provided herein is an electrode comprising a reduced graphene oxide film, wherein the graphene oxide film contains a three-dimensional hierarchy of pores, wherein the graphene oxide film has a thickness of about 32 μm to about 60 μm.

In some embodiments the graphene oxide film has an areal mass loading of at least about 0.5 mg/cm$^2$. In some embodiments, the graphene oxide film has an areal mass loading of at most about 3 mg/cm$^2$. In some embodiments, the graphene oxide film has an areal mass loading of about 0.5 mg/cm² to about 3 mg/cm². In some embodiments the graphene oxide film has an areal mass loading of about 0.5 mg/cm² to about 0.75 mg/cm², about 0.5 mg/cm² to about 1 mg/cm², about 0.5 mg/cm² to about 1.5 mg/cm², about 0.5 mg/cm² to about 2 mg/cm², about 0.5 mg/cm² to about 2.5 mg/cm², about 0.5 mg/cm² to about 3 mg/cm², about 0.75 mg/cm² to about 1 mg/cm², about 0.75 mg/cm² to about 1.5 mg/cm², about 0.75 mg/cm² to about 2 mg/cm², about 0.75 mg/cm² to about 2.5 mg/cm², about 0.75 mg/cm² to about 3 mg/cm², about 1 mg/cm² to about 1.5 mg/cm², about 1 mg/cm² to about 2 mg/cm², about 1 mg/cm² to about 2.5 mg/cm², about 1 mg/cm² to about 3 mg/cm², about 1.5 mg/cm² to about 2 mg/cm², about 1.5 mg/cm² to about 2.5 mg/cm², about 1.5 mg/cm² to about 3 mg/cm², about 2 mg/cm² to about 2.5 mg/cm², about 2 mg/cm² to about 3 mg/cm² or about 2.5 mg/cm² to about 3 mg/cm².

In some embodiments the graphene oxide film has an active density of at least about 0.1 g/cm². In some embodiments, the graphene oxide film has an active density of at most about 0.5 g/cm². In some embodiments, the graphene oxide film has an active density of about 0.1 g/cm² to about 0.5 g/cm². In some embodiments the graphene oxide film has an active density of about 0.1 g/cm² to about 0.2 g/cm², about 0.1 g/cm² to about 0.3 g/cm², about 0.1 g/cm² to about 0.4 g/cm², about 0.1 g/cm² to about 0.5 g/cm², about 0.2 g/cm² to about 0.3 g/cm², about 0.2 g/cm² to about 0.4 g/cm², about 0.2 g/cm² to about 0.5 g/cm², about 0.3 g/cm² to about 0.4 g/cm², about 0.3 g/cm² to about 0.5 g/cm² or about 0.4 g/cm² to about 0.5 g/cm².

In some embodiments the graphene oxide film has a gravimetric capacitance, in a current density of about 1 A/g, of at least about 120 F/g. In some embodiments, the graphene oxide film has a gravimetric capacitance, in a current density of about 1 A/g, of at most about 500 F/g. In some embodiments, the graphene oxide film has a gravimetric capacitance, in a current density of about 1 A/g, of about 120 F/g to about 500 F/g. In some embodiments the graphene oxide film has a gravimetric capacitance, in a current density of about 1 A/g, of about 120 F/g to about 150 F/g, about 120 F/g to about 200 F/g, about 120 F/g to about 300 F/g, about 120 F/g to about 400 F/g, about 120 F/g to about 500 F/g, about 150 F/g to about 200 F/g, about 150 F/g to about 300 F/g, about 150 F/g to about 400 F/g, about 150 F/g to about 500 F/g, about 200 F/g to about 300 F/g, about 200 F/g to about 400 F/g, about 200 F/g to about 500 F/g, about 300 F/g to about 400 F/g, about 300 F/g to about 500 F/g or about 400 F/g to about 500 F/g.

In some embodiments the graphene oxide film has a volumetric capacitance, in a current density of about 1 A/g, of at least about 20 F/cm³. In some embodiments, the graphene oxide film has a volumetric capacitance, in a current density of about 1 A/g, of at most about 100 F/cm³. In some embodiments, the graphene oxide film has a volumetric capacitance, in a current density of about 1 A/g, of about 20 F/cm³ to about 100 F/cm³. In some embodiments the graphene oxide film has a volumetric capacitance, in a current density of about 1 A/g, of about 20 F/cm³ to about 30 F/cm³, about 20 F/cm³ to about 40 F/cm³, about 20 F/cm³ to about 50 F/cm³, about 20 F/cm³ to about 60 F/cm³, about 20 F/cm³ to about 70 F/cm³, about 20 F/cm³ to about 80 F/cm³, about 20 F/cm³ to about 90 F/cm³, about 20 F/cm³ to about 100 F/cm³, about 30 F/cm³ to about 40 F/cm³, about 30 F/cm³ to about 50 F/cm³, about 30 F/cm³ to about 60 F/cm³, about 30 F/cm³ to about 70 F/cm³, about 30 F/cm³ to about 80 F/cm³, about 30 F/cm³ to about 90 F/cm³, about 30 F/cm³ to about 100 F/cm³, about 40 F/cm³ to about 50 F/cm³, about 40 F/cm³ to about 60 F/cm³, about 40 F/cm³ to about 70 F/cm³, about 40 F/cm³ to about 80 F/cm³, about 40 F/cm³ to about 90 F/cm³, about 40 F/cm³ to about 100 F/cm³, about 50 F/cm³ to about 60 F/cm³, about 50 F/cm³ to about 70 F/cm³, about 50 F/cm³ to about 80 F/cm³, about 50 F/cm³ to about 90 F/cm³, about 50 F/cm³ to about 100 F/cm³, about 60 F/cm³ to about 70 F/cm³, about 60 F/cm³ to about 80 F/cm³, about 60 F/cm³ to about 90 F/cm³, about 60 F/cm³ to about 100 F/cm³, about 70 F/cm³ to about 80 F/cm³, about 70 F/cm³ to about 90 F/cm³, about 70 F/cm³ to about 100 F/cm³, about 80 F/cm³ to about 90 F/cm³, about 80 F/cm³ to about 100 F/cm³ or about 90 F/cm³ to about 100 F/cm³.

In some embodiments the graphene oxide film has a gravimetric energy density of at least about 4 Wh/kg. In some embodiments, the graphene oxide film has a gravimetric energy density of at most about 18 Wh/kg. In some embodiments, the graphene oxide film has a gravimetric energy density of about 4 Wh/kg to about 18 Wh/kg. In some embodiments the graphene oxide film has a gravimetric energy density of about 4 Wh/kg to about 6 Wh/kg, about 4 Wh/kg to about 8 Wh/kg, about 4 Wh/kg to about 10 Wh/kg, about 4 Wh/kg to about 12 Wh/kg, about 4 Wh/kg to about 14 Wh/kg, about 4 Wh/kg to about 16 Wh/kg, about 4 Wh/kg to about 18 Wh/kg, about 6 Wh/kg to about 8 Wh/kg, about 6 Wh/kg to about 10 Wh/kg, about 6 Wh/kg to about 12 Wh/kg, about 6 Wh/kg to about 14 Wh/kg, about 6 Wh/kg to about 16 Wh/kg, about 6 Wh/kg to about 18 Wh/kg, about 8 Wh/kg to about 10 Wh/kg, about 8 Wh/kg to about 12 Wh/kg, about 8 Wh/kg to about 14 Wh/kg, about 8 Wh/kg to about 16 Wh/kg, about 8 Wh/kg to about 18 Wh/kg, about 10 Wh/kg to about 12 Wh/kg, about 10 Wh/kg to about 14 Wh/kg, about 10 Wh/kg to about 16 Wh/kg, about 10 Wh/kg to about 18 Wh/kg, about 12 Wh/kg to about 14 Wh/kg, about 12 Wh/kg to about 16 Wh/kg, about 12 Wh/kg to about 18 Wh/kg, about 14 Wh/kg to about 16 Wh/kg, about 14 Wh/kg to about 18 Wh/kg or about 16 Wh/kg to about 18 Wh/kg.

In some embodiments the graphene oxide film has a volumetric energy density of at least about 1 Wh/L. In some embodiments, the graphene oxide film has a volumetric energy density of at most about 4 Wh/L. In some embodiments, the graphene oxide film has a volumetric energy density of about 1 Wh/L to about 4 Wh/L. In some embodiments the graphene oxide film has a volumetric energy density of about 1 Wh/L to about 2 Wh/L, about 1 Wh/L to about 3 Wh/L, about 1 Wh/L to about 4 Wh/L, about 2 Wh/L to about 3 Wh/L, about 2 Wh/L to about 4 Wh/L or about 3 Wh/L to about 4 Wh/L.

In some embodiments the graphene oxide film has a gravimetric power density of at least about 25 kW/kg. In some embodiments, the graphene oxide film has a gravimetric power density of at most about 120 kW/kg. In some embodiments, the graphene oxide film has a gravimetric power density of about 25 kW/kg to about 120 kW/kg. In some embodiments the graphene oxide film has a gravimetric power density of about 25 kW/kg to about 50 kW/kg, about 25 kW/kg to about 75 kW/kg, about 25 kW/kg to about 100 kW/kg, about 25 kW/kg to about 120 kW/kg, about 50 kW/kg to about 75 kW/kg, about 50 kW/kg to about 100 kW/kg, about 50 kW/kg to about 120 kW/kg, about 75 kW/kg to about 100 kW/kg, about 75 kW/kg to about 120 kW/kg or about 100 kW/kg to about 120 kW/kg.

In some embodiments the graphene oxide film has a volumetric power density of at least about 6 kW/L. In some embodiments, the graphene oxide film has a volumetric power density of at most about 25 kW/L. In some embodiments, the graphene oxide film has a volumetric power density of about 6 kW/L to about 25 kW/L. In some embodiments the graphene oxide film has a volumetric power density of about 6 kW/L to about 10 kW/L, about 6 kW/L to about 15 kW/L, about 6 kW/L to about 20 kW/L, about 6 kW/L to about 25 kW/L, about 10 kW/L to about 15 kW/L, about 10 kW/L to about 20 kW/L, about 10 kW/L to about 25 kW/L, about 15 kW/L to about 20 kW/L, about 15 kW/L to about 25 kW/L or about 20 kW/L to about 25 kW/L.

In some embodiments the graphene oxide film has an areal capacitance of at least about 125 mF/cm$^2$. In some embodiments, the graphene oxide film has an areal capacitance of at most about 500 mF/cm$^2$. In some embodiments, the graphene oxide film has an areal capacitance of about 125 mF/cm$^2$ to about 500 mF/cm$^2$. In some embodiments the graphene oxide film has an areal capacitance of about 125 mF/cm$^2$ to about 150 mF/cm$^2$, about 125 mF/cm$^2$ to about 200 mF/cm$^2$, about 125 mF/cm$^2$ to about 250 mF/cm$^2$, about 125 mF/cm$^2$ to about 300 mF/cm$^2$, about 125 mF/cm$^2$ to about 350 mF/cm$^2$, about 125 mF/cm$^2$ to about 400 mF/cm$^2$, about 125 mF/cm$^2$ to about 450 mF/cm$^2$, about 125 mF/cm$^2$ to about 500 mF/cm$^2$, about 150 mF/cm$^2$ to about 200 mF/cm$^2$, about 150 mF/cm$^2$ to about 250 mF/cm$^2$, about 150 mF/cm$^2$ to about 300 mF/cm$^2$, about 150 mF/cm$^2$ to about 350 mF/cm$^2$, about 150 mF/cm$^2$ to about 400 mF/cm$^2$, about 150 mF/cm$^2$ to about 450 mF/cm$^2$, about 150 mF/cm$^2$ to about 500 mF/cm$^2$, about 200 mF/cm$^2$ to about 250 mF/cm$^2$, about 200 mF/cm$^2$ to about 300 mF/cm$^2$, about 200 mF/cm$^2$ to about 350 mF/cm$^2$, about 200 mF/cm$^2$ to about 400 mF/cm$^2$, about 200 mF/cm$^2$ to about 450 mF/cm$^2$, about 200 mF/cm$^2$ to about 500 mF/cm$^2$, about 250 mF/cm$^2$ to about 300 mF/cm$^2$, about 250 mF/cm$^2$ to about 350 mF/cm$^2$, about 250 mF/cm$^2$ to about 400 mF/cm$^2$, about 250 mF/cm$^2$ to about 450 mF/cm$^2$, about 250 mF/cm$^2$ to about 500 mF/cm$^2$, about 300 mF/cm$^2$ to about 350 mF/cm$^2$, about 300 mF/cm$^2$ to about 400 mF/cm$^2$, about 300 mF/cm$^2$ to about 450 mF/cm$^2$, about 300 mF/cm$^2$ to about 500 mF/cm$^2$, about 350 mF/cm$^2$ to about 400 mF/cm$^2$, about 350 mF/cm$^2$ to about 450 mF/cm$^2$, about 350 mF/cm$^2$ to about 500 mF/cm$^2$, about 400 mF/cm$^2$ to about 450 mF/cm$^2$, about 400 mF/cm$^2$ to about 500 mF/cm$^2$ or about 450 mF/cm$^2$ to about 500 mF/cm$^2$.

Another aspect provided herein is a superconductor device comprising two electrodes, wherein each electrode comprises a reduced graphene oxide film, further comprising an electrolyte further comprising a separator, further comprising a housing, further comprising an electrolyte, a separator, a housing or any combination thereof, wherein the electrolyte is aqueous, wherein the electrolyte comprises an acid, wherein the acid is a strong acid wherein the strong acid comprises perchloric acid, hydroiodic acid, hydrobromic acid, hydrochloric acid, sulfuric acid, p-toluenesulfonic acid methanesulfonic acid, or any combination thereof, wherein the electrolyte has a concentration of at least about 0.5 M wherein the electrolyte has a concentration of at most about 2 M, wherein the electrolyte has a concentration of about 0.5 M to about 2 M, wherein the separator is placed between the two electrodes wherein the separator is ion porous, wherein the separator is comprised of a polymer, wherein the separator is comprised of neoprene, nylon, polyvinyl chloride, polystyrene, polyethylene, polypropylene, polyacrylonitrile, PVB, silicone or any combination thereof, wherein the housing comprises a tape, a film, a bag, a resin, a casing or any combination thereof, wherein the housing is comprised of polyimide, Kapton, Teflon, plastic, epoxy, glue, cement, mucilage, paste, plastic, wood, carbon fiber, fiberglass, glass, metal or any combination thereof, wherein the electrodes each have a thickness of about 1 μm to about 4 μm.

In some embodiments the superconductor has a volumetric energy density of at least about 0.1 Wh/L. In some embodiments, the superconductor has a volumetric energy density of at most about 0.4 Wh/L. In some embodiments, the superconductor has a volumetric energy density of about 0.1 Wh/L to about 0.4 Wh/L. In some embodiments the superconductor has a volumetric energy density of about 0.1 Wh/L to about 0.2 Wh/L, about 0.1 Wh/L to about 0.3 Wh/L, about 0.1 Wh/L to about 0.4 Wh/L, about 0.2 Wh/L to about 0.3 Wh/L, about 0.2 Wh/L to about 0.4 Wh/L or about 0.3 Wh/L to about 0.4 Wh/L.

In some embodiments the superconductor has a volumetric power density of at least about 1 kW/L. In some embodiments, the superconductor has a volumetric power density of at most about 4 kW/L. In some embodiments, the superconductor has a volumetric power density of about 1 kW/L to about 4 kW/L. In some embodiments the superconductor has a volumetric power density of about 1 kW/L to about 2 kW/L, about 1 kW/L to about 3 kW/L, about 1 kW/L to about 4 kW/L, about 2 kW/L to about 3 kW/L, about 2 kW/L to about 4 kW/L or about 3 kW/L to about 4 kW/L.

In some embodiments, the reduced graphene oxide film of the superconductor contains a three-dimensional hierarchy of pores.

In some embodiments, the electrodes each have a thickness of about 6 μm to about 16 μm.

In some embodiments the superconductor has a volumetric energy density of at least about 0.5 Wh/L. In some embodiments, the superconductor has a volumetric energy density of at most about 2.25 Wh/L. In some embodiments, the superconductor has a volumetric energy density of about 0.5 Wh/L to about 2.25 Wh/L. In some embodiments the superconductor has a volumetric energy density of about 0.5 Wh/L to about 1 Wh/L, about 0.5 Wh/L to about 1.5 Wh/L, about 0.5 Wh/L to about 2 Wh/L, about 0.5 Wh/L to about 2.25 Wh/L, about 1 Wh/L to about 1.5 Wh/L, about 1 Wh/L to about 2 Wh/L, about 1 Wh/L to about 2.25 Wh/L, about 1.5 Wh/L to about 2 Wh/L, about 1.5 Wh/L to about 2.25 Wh/L or about 2 Wh/L to about 2.25 Wh/L.

In some embodiments the superconductor has a volumetric power density of at least about 3 kW/L. In some embodiments, the superconductor has a volumetric power density of at most about 16 kW/L. In some embodiments, the superconductor has a volumetric power density of about 3 kW/L to about 16 kW/L. In some embodiments the superconductor has a volumetric power density of about 3 kW/L to about 6 kW/L, about 3 kW/L to about 9 kW/L, about 3 kW/L to about 12 kW/L, about 3 kW/L to about 16 kW/L, about 6 kW/L to about 9 kW/L, about 6 kW/L to about 12 kW/L, about 6 kW/L to about 16 kW/L, about 9 kW/L to about 12 kW/L, about 9 kW/L to about 16 kW/L or about 12 kW/L to about 16 kW/L.

In some embodiments, the electrodes each have a thickness of about 16 μm to about 32 μm.

In some embodiments the superconductor has a volumetric energy density of at least about 0.25 Wh/L. In some embodiments, the superconductor has a volumetric energy density of at most about 1.5 Wh/L. In some embodiments, the superconductor has a volumetric energy density of about 0.25 Wh/L to about 1.5 Wh/L. In some embodiments the superconductor has a volumetric energy density of about 0.25 Wh/L to about 0.5 Wh/L, about 0.25 Wh/L to about 0.75 Wh/L, about 0.25 Wh/L to about 1 Wh/L, about 0.25

Wh/L to about 1.25 Wh/L, about 0.25 Wh/L to about 1.5 Wh/L, about 0.5 Wh/L to about 0.75 Wh/L, about 0.5 Wh/L to about 1 Wh/L, about 0.5 Wh/L to about 1.25 Wh/L, about 0.5 Wh/L to about 1.5 Wh/L, about 0.75 Wh/L to about 1 Wh/L, about 0.75 Wh/L to about 1.25 Wh/L, about 0.75 Wh/L to about 1.5 Wh/L, about 1 Wh/L to about 1.25 Wh/L, about 1 Wh/L to about 1.5 Wh/L or about 1.25 Wh/L to about 1.5 Wh/L.

In some embodiments the superconductor has a volumetric power density of at least about 5 kW/L. In some embodiments, the superconductor has a volumetric power density of at most about 20 kW/L. In some embodiments, the superconductor has a volumetric power density of about 5 kW/L to about 20 kW/L. In some embodiments the superconductor has a volumetric power density of about 5 kW/L to about 10 kW/L, about 5 kW/L to about 15 kW/L, about 5 kW/L to about 20 kW/L, about 10 kW/L to about 15 kW/L, about 10 kW/L to about 20 kW/L or about 15 kW/L to about 20 kW/L.

In some embodiments, the electrodes each have a thickness of about 32 μm to about 60 μm.

In some embodiments the superconductor has a volumetric energy density of at least about 0.1 Wh/L. In some embodiments, the superconductor has a volumetric energy density of at most about 0.5 Wh/L. In some embodiments, the superconductor has a volumetric energy density of about 0.1 Wh/L to about 0.5 Wh/L. In some embodiments the superconductor has a volumetric energy density of about 0.1 Wh/L to about 0.2 Wh/L, about 0.1 Wh/L to about 0.3 Wh/L, about 0.1 Wh/L to about 0.4 Wh/L, about 0.1 Wh/L to about 0.5 Wh/L, about 0.2 Wh/L to about 0.3 Wh/L, about 0.2 Wh/L to about 0.4 Wh/L, about 0.2 Wh/L to about 0.5 Wh/L, about 0.3 Wh/L to about 0.4 Wh/L, about 0.3 Wh/L to about 0.5 Wh/L or about 0.4 Wh/L to about 0.5 Wh/L.

In some embodiments the superconductor has a volumetric power density of at least about 7 kW/L. In some embodiments, the superconductor has a volumetric power density of at most about 30 kW/L. In some embodiments, the superconductor has a volumetric power density of about 7 kW/L to about 30 kW/L. In some embodiments the superconductor has a volumetric power density of about 7 kW/L to about 10 kW/L, about 7 kW/L to about 15 kW/L, about 7 kW/L to about 20 kW/L, about 7 kW/L to about 25 kW/L, about 7 kW/L to about 30 kW/L, about 10 kW/L to about 15 kW/L, about 10 kW/L to about 20 kW/L, about 10 kW/L to about 25 kW/L, about 10 kW/L to about 30 kW/L, about 15 kW/L to about 20 kW/L, about 15 kW/L to about 25 kW/L, about 15 kW/L to about 30 kW/L, about 20 kW/L to about 25 kW/L, about 20 kW/L to about 30 kW/L or about 25 kW/L to about 30 kW/L.

Another aspect provided herein is a method of fabricating a graphene oxide film, comprising: dispersing graphene oxide; filtering the graphene oxide through a membrane to form a graphene oxide film on the membrane; freeze-casting the graphene oxide film on the membrane; and peeling the graphene oxide film off the membrane.

In some embodiments, the graphene oxide film exhibits a thickness of about 6 μm to about 16 μm, about 16 μm to about 32 μm, or about 32 μm to about 60 μm.

In some embodiments, the graphene oxide is synthesized by a modified Hummer's method.

In some embodiments, the graphene oxide is prepared from natural graphite flakes.

In some embodiments, the process of dispersing graphene oxide comprises: suspending the graphene oxide in a fluid; and forming a solution of the suspended graphene oxide and an acid, wherein the fluid comprises water, formic acid, n-butanol, isopropanol, n-propanol, ethanol, methanol, acetic acid or any combination thereof.

In some embodiments the concentration of graphene oxide in the fluid is at least about 1 mg/ml. In some embodiments, the concentration of graphene oxide in the fluid is at most about 6 mg/ml. In some embodiments, the concentration of graphene oxide in the fluid is about 1 mg/ml to about 6 mg/ml. In some embodiments the concentration of graphene oxide in the fluid is about 1 mg/ml to about 2 mg/ml, about 1 mg/ml to about 3 mg/ml, about 1 mg/ml to about 4 mg/ml, about 1 mg/ml to about 5 mg/ml, about 1 mg/ml to about 6 mg/ml, about 2 mg/ml to about 3 mg/ml, about 2 mg/ml to about 4 mg/ml, about 2 mg/ml to about 5 mg/ml, about 2 mg/ml to about 6 mg/ml, about 3 mg/ml to about 4 mg/ml, about 3 mg/ml to about 5 mg/ml, about 3 mg/ml to about 6 mg/ml, about 4 mg/ml to about 5 mg/ml, about 4 mg/ml to about 6 mg/ml or about 5 mg/ml to about 6 mg/ml.

In some embodiments, the graphene oxide film has a thickness of about 16 m to about 32 μm.

In some embodiments the volume of suspended graphene oxide in the solution is at least about 0.5 ml. In some embodiments, the volume of suspended graphene oxide in the solution is at most about 2 ml. In some embodiments, the volume of suspended graphene oxide in the solution is about 0.5 ml to about 2 ml. In some embodiments the volume of suspended graphene oxide in the solution is about 0.5 ml to about 1 ml, about 0.5 ml to about 1.5 ml, about 0.5 ml to about 2 ml, about 1 ml to about 1.5 ml, about 1 ml to about 2 ml or about 1.5 ml to about 2 ml.

In some embodiments the mass of the acid in the solution is at least about 3 mg. In some embodiments, the mass of the acid in the solution is at most about 15 mg. In some embodiments, the mass of the acid in the solution is about 3 mg to about 15 mg. In some embodiments the mass of the acid in the solution is about 3 mg to about 6 mg, about 3 mg to about 9 mg, about 3 mg to about 12 mg, about 3 mg to about 15 mg, about 6 mg to about 9 mg, about 6 mg to about 12 mg, about 6 mg to about 15 mg, about 9 mg to about 12 mg, about 9 mg to about 15 mg or about 12 mg to about 15 mg.

In some embodiments, the graphene oxide film has a thickness of about 16 μm to about 32 μm.

In some embodiments the volume of suspended graphene oxide in the solution is at least about 1 ml. In some embodiments, the volume of suspended graphene oxide in the solution is at most about 4 ml. In some embodiments, the volume of suspended graphene oxide in the solution is about 1 ml to about 4 ml. In some embodiments the volume of suspended graphene oxide in the solution is about 1 ml to about 2 ml, about 1 ml to about 3 ml, about 1 ml to about 4 ml, about 2 ml to about 3 ml, about 2 ml to about 4 ml or about 3 ml to about 4 ml.

In some embodiments the mass of the acid in the solution is at least about 7 mg. In some embodiments, the mass of the acid in the solution is at most about 30 mg. In some embodiments, the mass of the acid in the solution is about 7 mg to about 30 mg. In some embodiments the mass of the acid in the solution is about 7 mg to about 10 mg, about 7 mg to about 15 mg, about 7 mg to about 20 mg, about 7 mg to about 25 mg, about 7 mg to about 30 mg, about 10 mg to about 15 mg, about 10 mg to about 20 mg, about 10 mg to about 25 mg, about 10 mg to about 30 mg, about 15 mg to about 20 mg, about 15 mg to about 25 mg, about 15 mg to about 30 mg, about 20 mg to about 25 mg, about 20 mg to about 30 mg or about 25 mg to about 30 mg.

In some embodiments, the graphene oxide film has a thickness of about 32 µm to about 60 µm.

In some embodiments the volume of suspended graphene oxide in the solution is at least about 2 ml. In some embodiments, the volume of suspended graphene oxide in the solution is at most about 10 ml. In some embodiments, the volume of suspended graphene oxide in the solution is about 2 ml to about 10 ml. In some embodiments the volume of suspended graphene oxide in the solution is about 2 ml to about 4 ml, about 2 ml to about 6 ml, about 2 ml to about 8 ml, about 2 ml to about 10 ml, about 4 ml to about 6 ml, about 4 ml to about 8 ml, about 4 ml to about 10 ml, about 6 ml to about 8 ml, about 6 ml to about 10 ml or about 8 ml to about 10 ml.

In some embodiments the mass of the acid in the solution is at least about 15 mg. In some embodiments, the mass of the acid in the solution is at most about 70 mg. In some embodiments, the mass of the acid in the solution is about 15 mg to about 70 mg. In some embodiments the mass of the acid in the solution is about 15 mg to about 30 mg, about 15 mg to about 45 mg, about 15 mg to about 60 mg, about 15 mg to about 70 mg, about 30 mg to about 45 mg, about 30 mg to about 60 mg, about 30 mg to about 70 mg, about 45 mg to about 60 mg, about 45 mg to about 70 mg or about 60 mg to about 70 mg.

In some embodiments, the acid comprises a weak acid, wherein the weak acid comprises formic acid, citric acid, acetic acid, ascorbic acid, malic acid, tartaric acid, propionic acid, butyric acid, valeric acid, caprioc acid, oxalic acid, benzoic acid, carbonic acid or any combination thereof.

In some embodiments, the method of fabricating a supercapacitor further comprises shaking the solution, wherein the shaking of the solution is vigorous.

In some embodiments the shaking of the solution occurs over a period of at least about 1 minute. In some embodiments, the shaking of the solution occurs over a period of at most about 10 minutes. In some embodiments, the shaking of the solution occurs over a period of about 1 minute to about 10 minutes. In some embodiments the shaking of the solution occurs over a period of about 1 minute to about 2 minutes, about 1 minute to about 4 minutes, about 1 minute to about 6 minutes, about 1 minute to about 8 minutes, about 1 minute to about 10 minutes, about 2 minutes to about 4 minutes, about 2 minutes to about 6 minutes, about 2 minutes to about 8 minutes, about 2 minutes to about 10 minutes, about 4 minutes to about 6 minutes, about 4 minutes to about 8 minutes, about 4 minutes to about 10 minutes, about 6 minutes to about 8 minutes, about 6 minutes to about 10 minutes or about 8 minutes to about 10 minutes.

In some embodiments, the method of fabricating a supercapacitor further comprises a step of partially reducing the graphene oxide, wherein the step of partially reducing the graphene oxide occurs before the step of step of filtering the graphene oxide, wherein the step of partially reducing the graphene oxide comprises heating the dispersed graphene oxide.

In some embodiments the heating of the solution occurs at a temperature of at least about 25° C. In some embodiments, the heating of the solution occurs at a temperature of at most about 100° C. In some embodiments, the heating of the solution occurs at a temperature of about 25° C. to about 100° C. In some embodiments the heating of the solution occurs at a temperature of about 25° C. to about 50° C., about 25° C. to about 75° C., about 25° C. to about 100° C., about 50° C. to about 75° C., about 50° C. to about 100° C. or about 75° C. to about 100° C.

In some embodiments the heating of the solution occurs over a period of at least about 1 minute. In some embodiments, the heating of the solution occurs over a period of at most about 100 minutes. In some embodiments, the heating of the solution occurs over a period of about 1 minute to about 100 minutes. In some embodiments the heating of the solution occurs over a period of about 1 minute to about 10 minutes, about 1 minute to about 20 minutes, about 1 minute to about 50 minutes, about 1 minute to about 75 minutes, about 1 minute to about 100 minutes, about 10 minutes to about 20 minutes, about 10 minutes to about 50 minutes, about 10 minutes to about 75 minutes, about 10 minutes to about 100 minutes, about 20 minutes to about 50 minutes, about 20 minutes to about 75 minutes, about 20 minutes to about 100 minutes, about 50 minutes to about 75 minutes, about 50 minutes to about 100 minutes or about 75 minutes to about 100 minutes.

In some embodiments, the membrane comprises cellulose, cellulose ester, cellulose acetate, polysulfone, polyethersulfone, etched polycarbonate, collagen or any combination thereof.

In some embodiments the membrane has a pore size of at least about 0.1 µm. In some embodiments, the membrane has a pore size of at most about 0.5 µm. In some embodiments, the membrane has a pore size of about 0.1 µm to about 0.5 µm. In some embodiments the membrane has a pore size of about 0.1 µm to about 0.2 µm, about 0.1 µm to about 0.3 µm, about 0.1 µm to about 0.4 µm, about 0.1 µm to about 0.5 µm, about 0.2 µm to about 0.3 µm, about 0.2 µm to about 0.4 µm, about 0.2 µm to about 0.5 µm, about 0.3 µm to about 0.4 µm, about 0.3 µm to about 0.5 µm or about 0.4 µm to about 0.5 µm.

Some embodiments, further comprise terminating the filtration once the membrane contains no visible dispersed graphene oxide.

In some embodiments, the step of freeze-casting the graphene oxide film on the membrane comprises: freezing the graphene oxide film on the membrane, and immersing the graphene oxide film on the membrane in a fluid.

In some embodiments, the freezing of the graphene oxide film on the membrane is performed by liquid nitrogen, dry ice, ethanol or any combination thereof.

In some embodiments the freezing occurs over a period of time of at least about 15 minutes. In some embodiments, the freezing occurs over a period of time of at most about 60 minutes. In some embodiments, the freezing occurs over a period of time of about 15 minutes to about 60 minutes. In some embodiments the freezing occurs over a period of time of about 15 minutes to about 20 minutes, about 15 minutes to about 25 minutes, about 15 minutes to about 30 minutes, about 15 minutes to about 35 minutes, about 15 minutes to about 40 minutes, about 15 minutes to about 45 minutes, about 15 minutes to about 50 minutes, about 15 minutes to about 55 minutes, about 15 minutes to about 60 minutes, about 20 minutes to about 25 minutes, about 20 minutes to about 30 minutes, about 20 minutes to about 35 minutes, about 20 minutes to about 40 minutes, about 20 minutes to about 45 minutes, about 20 minutes to about 50 minutes, about 20 minutes to about 55 minutes, about 20 minutes to about 60 minutes, about 25 minutes to about 30 minutes, about 25 minutes to about 35 minutes, about 25 minutes to about 40 minutes, about 25 minutes to about 45 minutes, about 25 minutes to about 50 minutes, about 25 minutes to about 55 minutes, about 25 minutes to about 60 minutes, about 30 minutes to about 35 minutes, about 30 minutes to about 40 minutes, about 30 minutes to about 45 minutes, about 30 minutes to about 50 minutes, about 30 minutes to about 55 minutes, about 30 minutes to about 60 minutes, about 35 minutes to about 40 minutes, about 35 minutes to about 45 minutes, about 35 minutes to about 50 minutes, about 35 minutes to about 55 minutes, about 35 minutes to about 60 minutes, about 40 minutes to about 45 minutes, about 40 minutes to about 50 minutes, about 40 minutes to about 55 minutes, about 40 minutes to about 60 minutes, about 45 minutes to about 50 minutes, about 45 minutes to about 55 minutes, about 45 minutes to about 60 minutes, about 50 minutes to about 55 minutes, about 50 minutes to about 60 minutes or about 55 minutes to about 60 minutes.

In some embodiments, freezing of the graphene oxide film on the membrane is performed by vertical immersion.

In some embodiments, freezing of the graphene oxide film on the membrane is performed by horizontal immersion.

Some embodiments further comprise thawing the graphene oxide film on the membrane.

In some embodiments, thawing of the graphene oxide film on the membrane occurs at room temperature.

In some embodiments, thawing of the graphene oxide film on the membrane is performed after the freezing of the graphene oxide film on the membrane.

Some embodiments further comprise transferring the graphene oxide film on the membrane into a container.

In some embodiments, transferring of the graphene oxide film on the membrane into a container is performed after the thawing of the graphene oxide film on the membrane.

In some embodiments, the container comprises a vial, a cup, a jar, a bowl, a dish, a flask, a beaker or any combination thereof.

In some embodiments, the container is comprised of glass, plastic, metal, wood, carbon fiber, fiberglass or any combination thereof.

Some embodiments further comprise heating the graphene oxide film on the membrane.

In some embodiments, the heating of the graphene oxide film on the membrane is performed after the thawing of the graphene oxide film on the membrane.

In some embodiments, the heating of the graphene oxide film on the membrane is performed after the transferring of the graphene oxide film on the membrane into a container.

In some embodiments the heating the graphene oxide film on the membrane occurs at a temperature of at least about 50° C. In some embodiments, the heating the graphene oxide film on the membrane occurs at a temperature of at most about 200° C. In some embodiments, the heating the graphene oxide film on the membrane occurs at a temperature of about 50° C. to about 200° C. In some embodiments the heating the graphene oxide film on the membrane occurs at a temperature of about 50° C. to about 75° C., about 50° C. to about 100° C., about 50° C. to about 125° C., about 50° C. to about 150° C., about 50° C. to about 175° C., about 50° C. to about 200° C., about 75° C. to about 100° C., about 75° C. to about 125° C., about 75° C. to about 150° C., about 75° C. to about 175° C., about 75° C. to about 200° C., about 100° C. to about 125° C., about 100° C. to about 150° C., about 100° C. to about 175° C., about 100° C. to about 200° C., about 125° C. to about 150° C., about 125° C. to about 175° C., about 125° C. to about 200° C., about 150° C. to about 175° C., about 150° C. to about 200° C. or about 175° C. to about 200° C.

In some embodiments the heating the graphene oxide film on the membrane occurs over a period of time of at least about 5 hours. In some embodiments, the heating the graphene oxide film on the membrane occurs over a period of time of at most about 30 hours. In some embodiments, the heating the graphene oxide film on the membrane occurs over a period of time of about 5 hours to about 30 hours. In some embodiments the heating the graphene oxide film on the membrane occurs over a period of time of about 5 hours to about 10 hours, about 5 hours to about 15 hours, about 5 hours to about 20 hours, about 5 hours to about 25 hours, about 5 hours to about 30 hours, about 10 hours to about 15 hours, about 10 hours to about 20 hours, about 10 hours to about 25 hours, about 10 hours to about 30 hours, about 15 hours to about 20 hours, about 15 hours to about 25 hours, about 15 hours to about 30 hours, about 20 hours to about 25 hours, about 20 hours to about 30 hours or about 25 hours to about 30 hours.

In some embodiments, the fluid comprises a solvent, wherein the solvent comprises tetrahydrofuran, ethyl acetate, dimethylformamide, acetonitrile, acetone, dimethyl sulfoxide, nitromethane, propylene carbonate, ethanol, formic acid, n-butanol, methanol, acetic acid, water, deionized water or any combination thereof.

In some embodiments the immersing of the membrane and the partially reduced graphene occurs over a period of time of at least about 5 hours. In some embodiments, the immersing of the membrane and the partially reduced graphene occurs over a period of time of at most about 30 hours. In some embodiments, the immersing of the membrane and the partially reduced graphene occurs over a period of time of about 5 hours to about 30 hours. In some embodiments the immersing of the membrane and the partially reduced graphene occurs over a period of time of about 5 hours to about 10 hours, about 5 hours to about 15 hours, about 5 hours to about 20 hours, about 5 hours to about 25 hours, about 5 hours to about 30 hours, about 10 hours to about 15 hours, about 10 hours to about 20 hours, about 10 hours to about 25 hours, about 10 hours to about 30 hours, about 15 hours to about 20 hours, about 15 hours to about 25 hours, about 15 hours to about 30 hours, about 20 hours to about 25 hours, about 20 hours to about 30 hours or about 25 hours to about 30 hours.

Some embodiments further comprise cutting the graphene oxide film on the membrane into pieces.

In some embodiments the pieces of graphene oxide film have a surface area of at least about 0.5 cm$^2$. In some embodiments, the pieces of graphene oxide film have a surface area of at most about 2 cm$^2$. In some embodiments, the pieces of graphene oxide film have a surface area of about 0.5 cm$^2$ to about 2 cm$^2$. In some embodiments the pieces of graphene oxide film have a surface area of about 0.5 cm$^2$ to about 1 cm$^2$, about 0.5 cm$^2$ to about 1.5 cm$^2$, about 0.5 cm$^2$ to about 2 cm$^2$, about 1 cm$^2$ to about 1.5 cm$^2$, about 1 cm$^2$ to about 2 cm$^2$ or about 1.5 cm$^2$ to about 2 cm$^2$.

Some embodiments further comprise immersing the graphene oxide films in an electrolyte.

In some embodiments, the electrolyte is aqueous, wherein the electrolyte comprises an acid, wherein the acid is a strong acid, wherein the strong acid comprises perchloric acid, hydroiodic acid, hydrobromic acid, hydrochloric acid, sulfuric acid, p-toluenesulfonic acid methanesulfonic acid, or any combination thereof.

In some embodiments the electrolyte has a concentration of at least about 0.5 M. In some embodiments, the electrolyte has a concentration of at most about 2 M. In some embodiments, the electrolyte has a concentration of about 0.5 M to about 2 M. In some embodiments the electrolyte has a concentration of about 0.5 M to about 1 M, about 0.5 M to about 1.5 M, about 0.5 M to about 2 M, about 1 M to about 1.5 M, about 1 M to about 2 M or about 1.5 M to about 2 M.

In some embodiments the immersing of the graphene oxide film occurs over a period of time of at least about 5 hours. In some embodiments, the immersing of the graphene oxide film occurs over a period of time of at most about 30 hours. In some embodiments, the immersing of the graphene oxide film occurs over a period of time of about 5 hours to about 30 hours. In some embodiments the immersing of the graphene oxide film occurs over a period of time of about 5 hours to about 10 hours, about 5 hours to about 15 hours, about 5 hours to about 20 hours, about 5 hours to about 25 hours, about 5 hours to about 30 hours, about 10 hours to about 15 hours, about 10 hours to about 20 hours, about 10 hours to about 25 hours, about 10 hours to about 30 hours, about 15 hours to about 20 hours, about 15 hours to about 25 hours, about 15 hours to about 30 hours, about 20 hours to about 25 hours, about 20 hours to about 30 hours or about 25 hours to about 30 hours.

Some embodiments further comprise placing the graphene oxide films on a metallic foil, wherein the metallic foil comprises Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury or any combination thereof.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications may be made within the scope of the invention without departing from the spirit thereof.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

DETAILED DESCRIPTION

Figure 1:
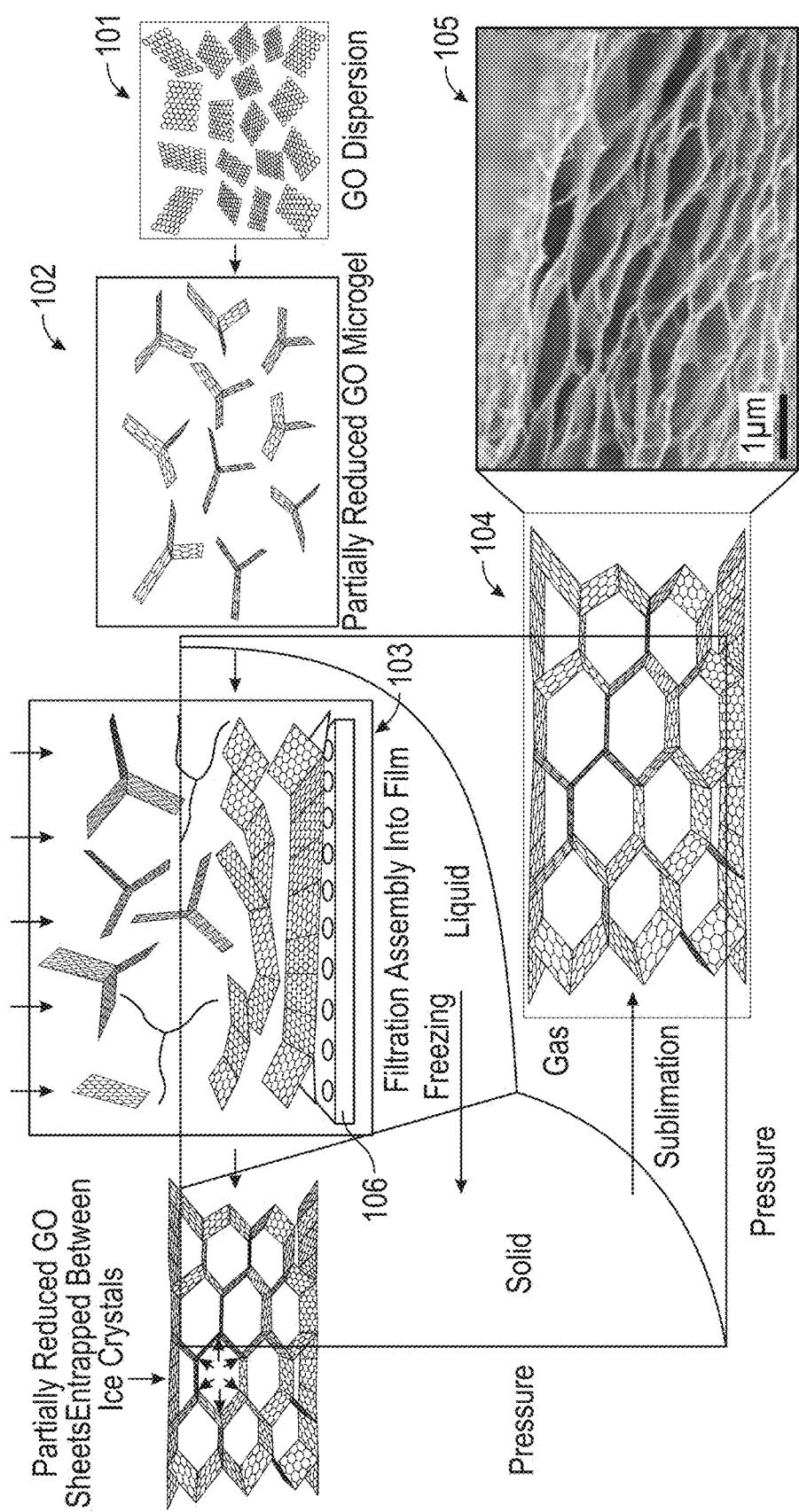
FIG. 1 shows an exemplary schematic illustration of the formation of a porous graphene film through pre-reduction, filtration and freeze-casting, an exemplary water phase diagram, and an exemplary cross-section Scanning Electron Microscope (SEM) image of a porous graphene film.

Provided herein are graphene materials, fabrication processes and devices with improved performance. In some embodiments, the present disclosure provides supercapacitors comprising a graphene material and their fabrication processes. Such supercapacitors may avoid the shortcomings of current energy storage technologies. A supercapacitor of the present disclosure may comprise one or more supercapacitor cells. A supercapacitor may comprise a positive electrode and a negative electrode separated by a separator comprising an electrolyte. The positive electrode may be a cathode during discharge. The negative electrode may be an anode during discharge. In some embodiments, a plurality of supercapacitor cells may be arranged (e.g., interconnected) in a pack.

Provided herein are supercapacitor devices and methods for fabrication thereof. The supercapacitor devices may be electrochemical devices. The supercapacitor devices may be configured for high energy and/or power density. The supercapacitor devices of the disclosure may include an electrode composed of three-dimensional (3D) hierarchical porous film(s). The supercapacitor devices of the disclosure may comprise interconnected devices.

Provided herein are methods, devices and systems for the preparation and processing of graphene into three-dimensional hierarchical porous electrode films. Some embodiments provide systems and methods for fabricating electrode films with a controlled porosity and a high surface area. Some embodiments provide systems and methods for fabricating 3D hierarchical porous films through filtering and freeze-casting partially reduced graphene oxide. The processes described herein may include the manufacture (or synthesis) of graphene oxide; the manufacture (or synthesis) of reduced graphene oxide; and/or the manufacture (or synthesis) of three-dimensional reduced graphene oxide.

Various aspects of the disclosure described herein may be applied to any of the particular applications set forth below or in any other type of manufacturing, synthesis or processing setting. Other manufacturing, synthesis or processing of materials may equally benefit from features described herein. For example, the methods, devices and systems herein may be advantageously applied to manufacture (or synthesis) of various forms of graphene oxide. The invention may be applied as a standalone method, device or system, or as part of an integrated manufacturing or materials (e.g., chemicals) processing system. It shall be understood that different aspects of the invention may be appreciated individually, collectively, or in combination with each other.

An aspect of the invention provides supercapacitor devices comprising one or more electrodes, each composed of three-dimensional hierarchical porous film(s), and electrolytes disposed between the electrodes.

Reference will now be made to the figures. It will be appreciated that the figures and features therein are not necessarily drawn to scale. The schematic illustrations, images, formulas, charts and graphs referred to herein represent fabricated exemplary devices that serve as a representation of the appearance, characteristics and functionality of the devices produced by the exemplary methods described herein.

Device Capabilities

An energy storage device (e.g., supercapacitor) of the present disclosure may have a power density at least about 1.5, 2, 5, 10, 20, 50, 100, 200 or 300 times greater than a supercapacitor available in the market (e.g., a supercapacitor with a power density of 1-10 kW/kg). An energy storage device (e.g., supercapacitor) of the present disclosure may have cycling stability or cycle life at least about 1.5, 2 or 2.5 times greater than a supercapacitor available in the market (e.g., a supercapacitor with a cycling stability or cycle life of 500 cycles). For example, an energy storage device (e.g., supercapacitor) of the present disclosure may run electronic device(s) for twice as long and may be used for more than 5000 cycles compared to only 500 cycles for competitive technologies.

The supercapacitors described herein may play an important role in one or more applications or areas, such as, for example, portable electronics (e.g., cellphones, computers, cameras, etc.), medical devices (e.g., life-sustaining and life-enhancing medical devices, including pacemakers, defibrillators, hearing aids, pain management devices, and drug pumps, electric vehicles (e.g., energy storage devices with long lifetime are needed to improve the electric vehicles industry, space (e.g., the energy storage devices may be used in space to power space systems including rovers, landers, spacesuits and electronic equipment), military energy storage devices (e.g., the military uses special energy storage devices for powering a large number of electronics and equipment; reduced mass/volume of the energy storage devices described herein are highly preferred), electric aircraft (e.g., an aircraft that runs on electric motors rather than internal combustion engines, with electricity coming from solar cells or energy storage devices), grid scale energy storage (e.g., energy storage devices may be used to store electrical energy during times when production (from power plants) exceeds consumption and the stored energy may be used at times when consumption exceeds production), renewable energy (e.g., since the sun does not shine at night and the wind does not blow at all times, energy storage devices in off-the-grid power systems may store excess electricity from renewable energy sources for use during hours after sunset and when the wind is not blowing; high power energy storage devices may harvest energy from solar cells with higher efficiency than current state-of-the-art energy storage devices), power tools (e.g., the energy storage devices described herein may enable fast-charging cordless power tools such as drills, screwdrivers, saws, wrenches and grinders; current energy storage devices have a long recharging time), or any combination thereof.

Energy Storage Devices

Energy storage devices of the present disclosure may comprise at least one electrode (e.g., a positive electrode and a negative electrode). The graphene material of the present disclosure may be provided in the positive electrode (cathode during discharge), the negative electrode (anode during discharge) or both. In certain embodiments, the energy storage device may be a supercapacitor.

In some embodiments, supercapacitors, otherwise called electrochemical capacitors, are solid-state energy storage devices with a much higher capacitance, and which may recharged a hundred to a thousand times faster, than normal capacitors. Some supercapacitors may contain power densities in excess of 10 kW/kg; 10 times larger than current lithium-ion batteries. Unlike batteries, whose charging and discharging speed may be limited by chemical reactions, supercapacitors store charge through highly reversible ion absorption and/or redox reactions, which enable fast energy capture and delivery.

In some embodiments, supercapacitors may exhibit a high power density and excellent low-temperature performance, and as such, have been increasingly employed as energy storage resources in such applications as portable electronic devices, medical devices, back-up power devices, flash cameras, factories, regenerative braking systems and hybrid electric vehicles. Although some current supercapacitors have shown significant gains in energy density, these devices may exhibit a loss of power and/or cycling capability over time. High power density may continue to attract increasing attention, especially for conditions in which huge amounts of energy need to be input or output in a limited time, such as load-leveling the emerging smart electrical grid, flash charging electronics and quick acceleration for electric vehicles.

In some embodiments, supercapacitors are flexible and able to bend and flex over a certain range of motion without breaking or degrading. Such flexible electronics, also known as flex circuits, may be composed of electronic circuits mounted to, or printed on, flexible substrates to produce portable and rugged products.

In some embodiments, supercapacitors are comprised of two or more electrodes, each separated by an ion-permeable membrane (separator), and an electrolyte ionically connecting the electrodes, whereas ions in the electrolyte form electric double layers of opposite polarity to the electrodes' polarities when the electrodes are polarized by an applied voltage.

Supercapacitors may be divided into two main categories depending on the mechanism of charge storage: redox supercapacitors, and electric double-layer capacitors. Additionally, a supercapacitor may be symmetric or asymmetric with electrodes that are identical or dissimilar, respectively.

In some embodiments, a supercapacitor electrode may comprise an active material and/or a substrate. The active material of a supercapacitor electrode may comprise a transition-metal oxide, a conducting polymer, a high-surface carbon or any combination thereof. As active materials are typically porous and thus brittle and poor conductors, a substrate, or current collector, may be employed as a support structure and a conducting path to decrease the resistance of the supercapacitor. Current collectors may be comprised of carbon cloth silicon, metal oxide, gallium arsenide, glass, steel, stainless steel or any combination thereof. Some supercapacitor electrode collectors may be designed to flex and bend under stress. An electrode of an electrochemical cell in which electrons leave the active material within cell and oxidation occurs may be referred to as an anode. An electrode of an electrochemical cell in which the electrons enter the active material within cell and reduction occurs may be referred to as a cathode. Each electrode may become either an anode or a cathode depending on the direction of current through the cell.

In some embodiments, the electrode material may strongly affect the energy storage performance of a supercapacitor. Electrode materials with high surface areas allow for increased charge quantity and speed of charge storage. Some currently available supercapacitors exhibit a limited power density because their activated carbon electrodes contain a limited microporous structure. There is a current unmet need for an electrode with a controllable pore size, electronic conductivity, and loading mass for supercapacitor devices with high energy density.

Figure 2A:
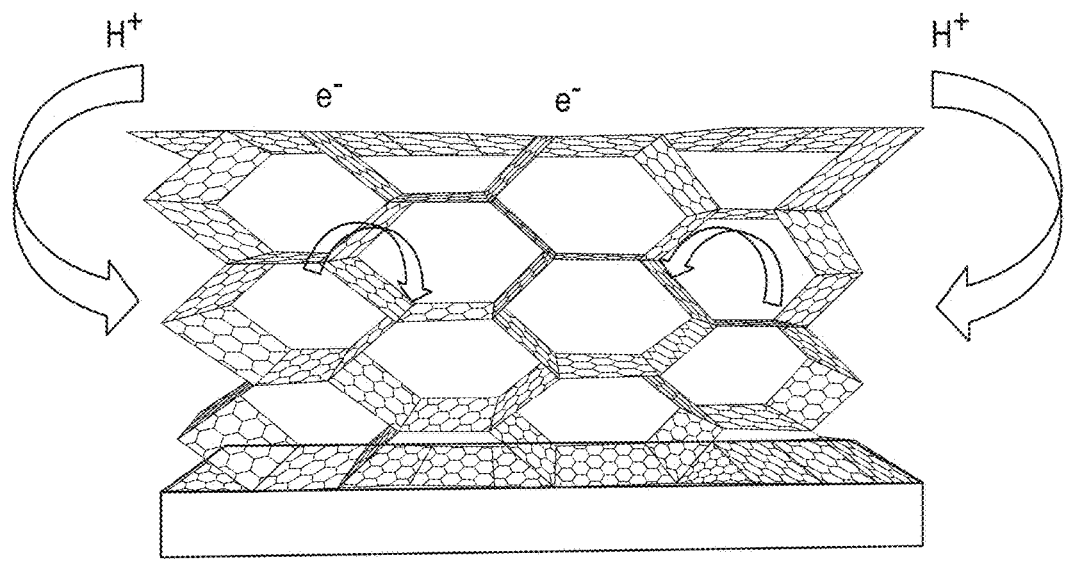
FIGS. 2A-B show an exemplary schematic illustration of ion and electron transport in a three dimensional (3D) porous reduced graphene oxide (RGO) film and an RGO film.
Figure 2B:
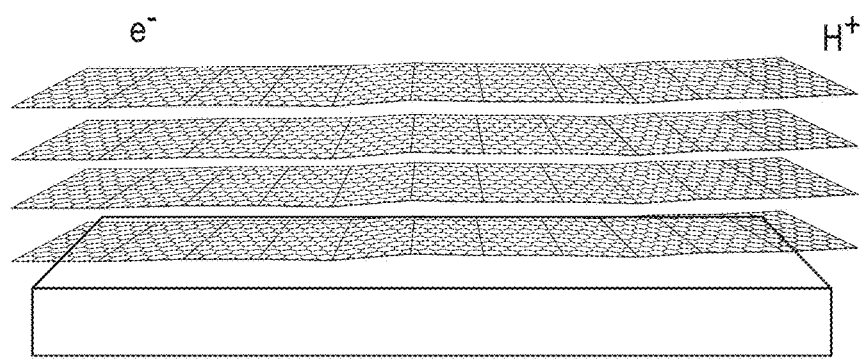

In some embodiments, electrodes are composed of graphene, a one atom-thin two-dimensional flake of carbon that may exhibit a high electrical conductivity, a high surface area-to-weight ratio, and a wide stable potential window. Graphene film, an important macroscopic structure of graphene alternatively called graphene paper, may be produced by a number of methods comprising blade-coating, spray-coating, layer-by-layer assembly, interfacial self-assembly, filtration assembly or any combination thereof. The shear stress, interfacial tension or vacuum compression methods inherent in the current graphene film manufacturing methods, however, may often restack the two-dimensional layered graphene sheets to form dense layered graphene films, whose lamellar microstructures exhibit less surface area than graphene flakes. The dense layered graphene films produced by the current methods may lack a sufficiently open continuous hierarchical of pores that serve as ion-buffering reservoirs and high speed ion transport channels for effective electrochemical kinetic processes. As such, supercapacitor devices employing dense layered graphene films may exhibit poor electro-capacitive performance capabilities including low power densities and long charging times. In some embodiments, application of 3D hierarchical porous films within supercapacitors may result in supercapacitors with high power densities. The schematic illustrations presented in FIGS. 2A-B shows the easier ion diffusion and minimized electron transport resistance for an exemplary 3D porous RGO film compared with an exemplary RGO film. The unique properties of 3D porous RGO films may enable their excellent performance as supercapacitor electrodes.

In some embodiments, a supercapacitor device contains an electrolyte. Electrolytes may include, for example, aqueous, organic and/or ionic liquid-based electrolytes. The electrolyte may be liquid, solid or a gel. In some embodiments, the performance of supercapacitors with graphene electrodes may be improved by employing a nonvolatile liquid electrolyte that may serve as an effective "spacer" to prevent the irreversible n-n stacking between graphene sheets.

In some embodiments, the energy storage device may comprise a separator. For example, the energy storage device may comprise a polyethylene separator (e.g., an ultra-high molecular weight polyethylene separator). The separator may have a thickness of less than or equal to about 16 µm, 15 µm, 14 µm, 13 µm, 12 µm, 11 µm, 10 µm, 9 µm or 8 µm (e.g., about 12±2.0 µm). The separator may have a given permeability. The separator may have a permeability (e.g., Gurley type) of greater than or equal to about 150 sec/100 ml, 160 sec/100 ml. 170 sec/100 ml, 180 sec/100 ml, 190 sec/100 ml, 200 sec/100 ml, 210 sec/100 ml, 220 sec/100 ml, 230 sec/100 ml, 240 sec/100 ml, 250 sec/100 ml, 260 sec/100 ml, 270 sec/100 ml, 280 sec/100 ml, 290 sec/100 ml or 300 sec/100 ml (e.g., 180±50 sec/100 ml). Alternatively, the separator may have a permeability (e.g., Gurley type) of less than about 150 sec/100 ml, 160 sec/100 ml. 170 sec/100 ml, 180 sec/100 ml, 190 sec/100 ml, 200 sec/100 ml, 210 sec/100 ml, 220 sec/100 ml, 230 sec/100 ml, 240 sec/100 ml, 250 sec/100 ml, 260 sec/100 ml, 270 sec/100 ml, 280 sec/100 ml, 290 sec/100 ml or 300 sec/100 ml. The separator may have a given porosity. The separator may have a porosity of greater than or equal to about 35%, 40%, 45% or 50% (e.g., 40±5%). Alternatively, the separator may have a porosity of less than about 35%, 40%, 45% or 50%. The separator may have a given shut-down temperature (e.g., above the shut-down temperature, the separator may not function normally). In some embodiments, the separator may have a shut-down temperature (actual) of less than or equal to about 150° C., 140° C., 130° C., 120° C., 110° C. or 100° C. In some embodiments, the separator may have a shut-down temperature (DSC) between about 130° C. and 150° C., 130° C. and 140° C., or 136° C. and 140° C.

Figure 5:
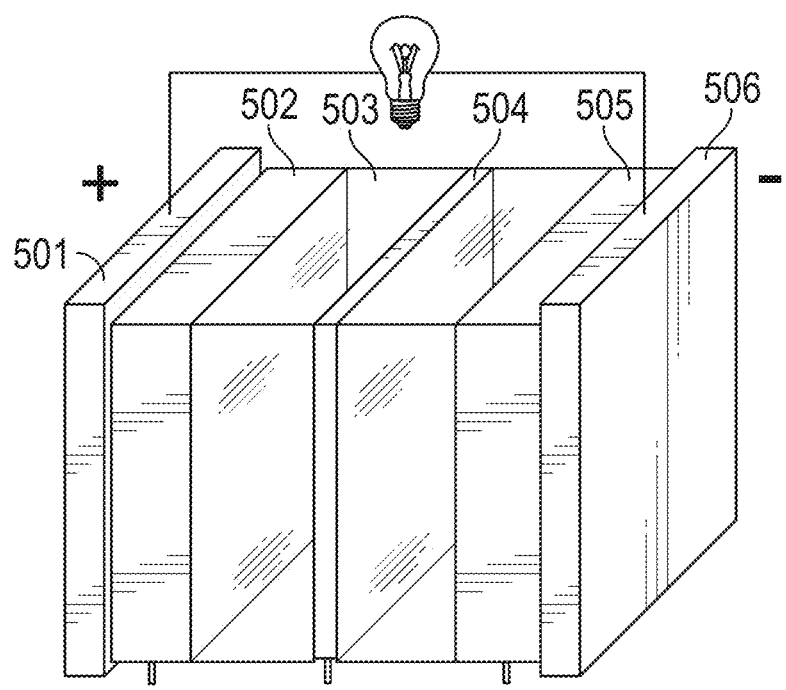
FIG. 5 shows a schematic illustration of an exemplary structure of a symmetric two-electrode supercapacitor.
Figure 6A:
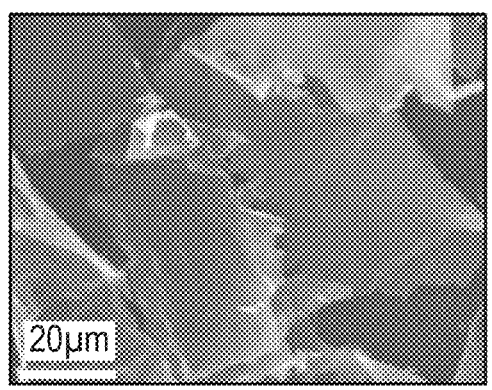
FIGS. 6A-D show scanning electron microscope (SEM) images of exemplary partially reduced GO samples with different reduction times.
Figure 6B:
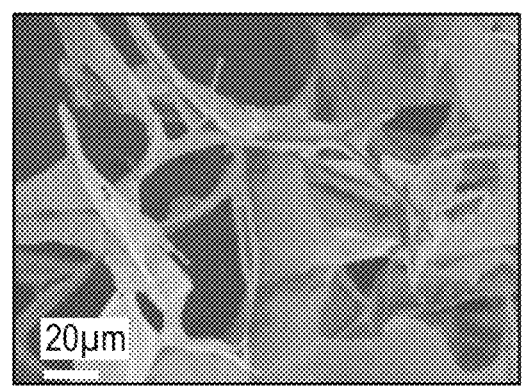
Figure 6C:
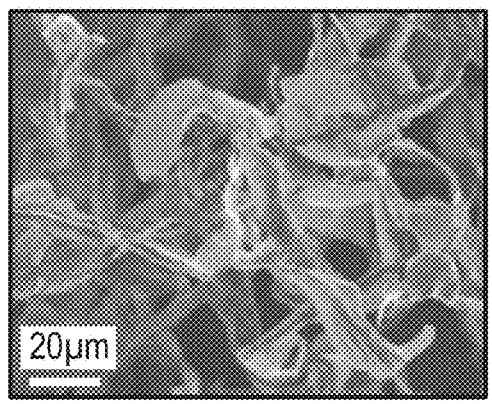
Figure 6D:
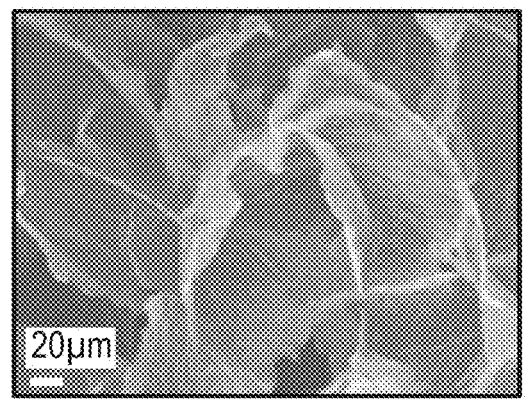
Figure 7A:
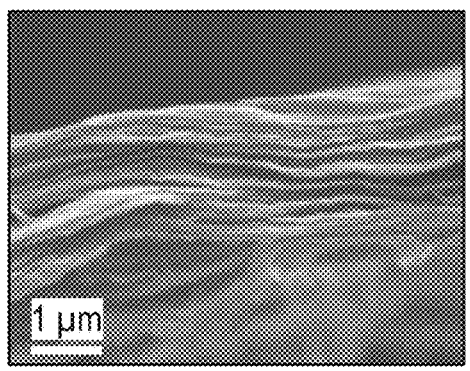
FIGS. 7A-D show cross-section SEM images of exemplary 3D porous RGO films with different pre-reduction times.
Figure 7B:
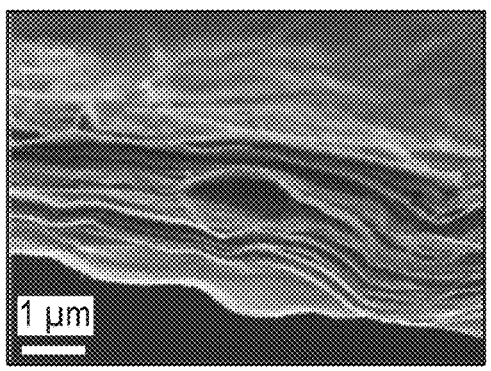
Figure 7C:
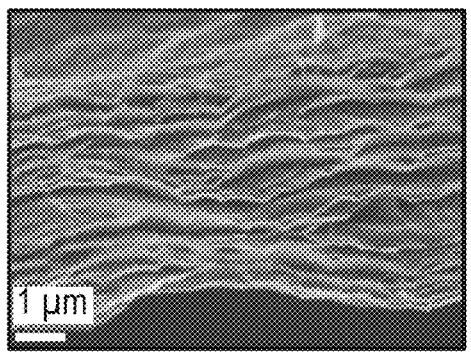
Figure 7D:
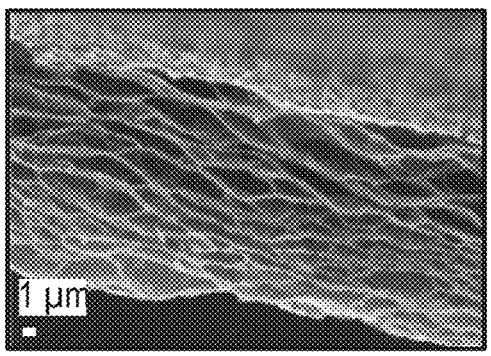

FIG. 5, schematically illustrates the architecture of an exemplary supercapacitor, comprising a first current collector 501, a first electrode 502, an electrolyte 503, a separator 504, a second electrode 505 and a second current collector 506. Per the exemplary illustration in FIG. 5, a first electrode 502 serves as a cathode and the second electrode 505 serves as an anode.

Methods of Formulating Supercapacitor Electrodes

FIG. 1 schematically illustrates the formation of a porous graphene film 105 comprising the steps of graphite oxide (GO) dispersion 101, partial pre-reduction of the GO 102, reduced GO filtering 103, and freeze-casting. The water phase diagram shows the status of the aqueous solution during the different procedures and a typical cross-section SEM image of an exemplary porous graphene film.

Figure 11:
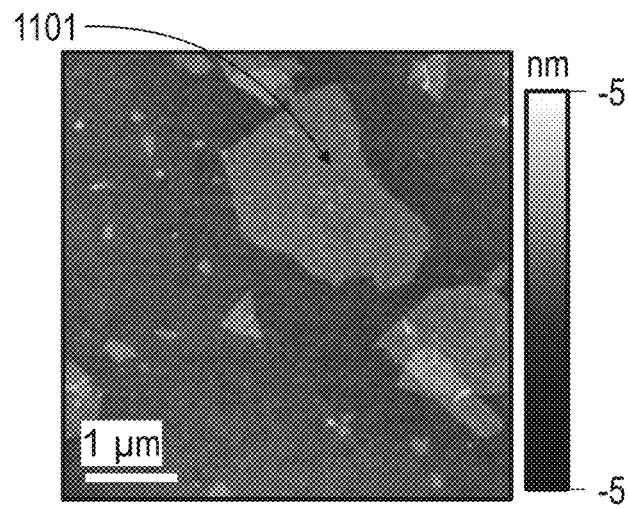
FIG. 11 shows an exemplary atomic-force microscopy (AFM) image of GO sheets.
Figure 12A:
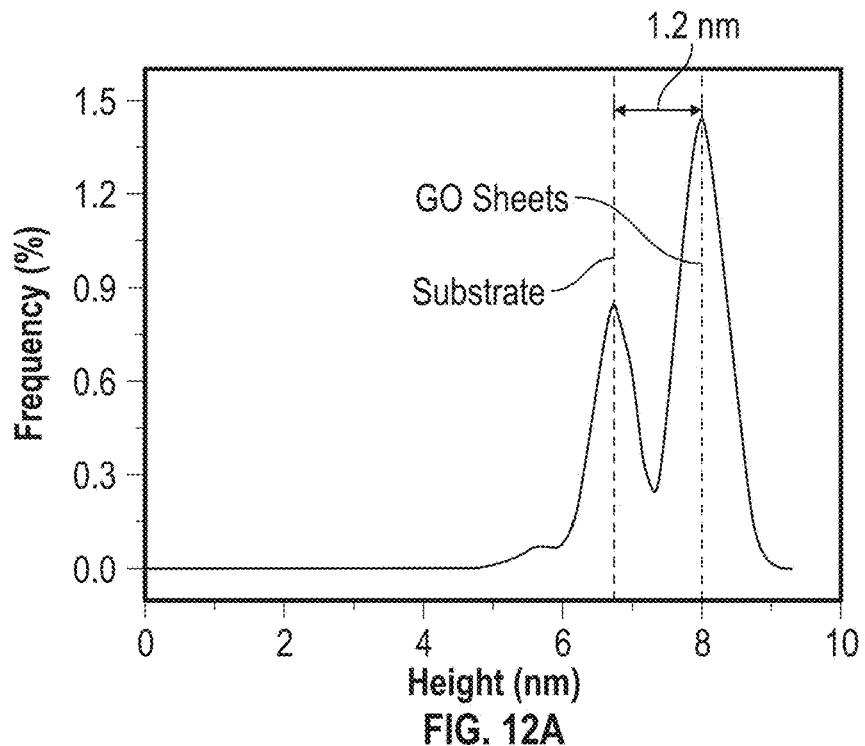
FIGS. 12A-B show an exemplary height distribution diagram and an exemplary line scan profile.
Figure 12B:
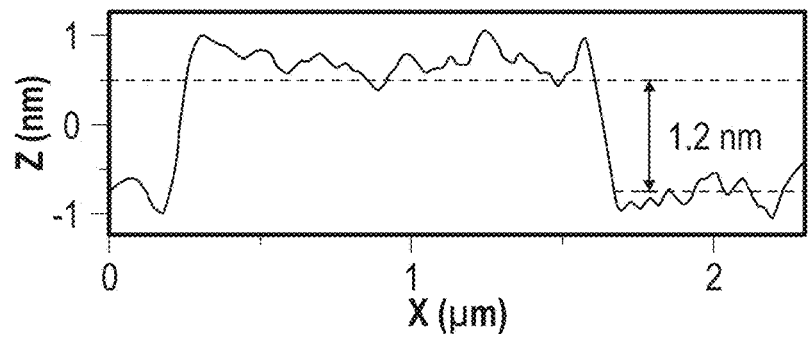

In some embodiments, graphene oxide (GO), may be produced in bulk from graphite at low cost, as a precursor to fabricate porous graphene films. FIG. 11 shows an exemplary atomic-force microscopy (AFM) image of GO sheets, FIGS. 12A-B show an exemplary height distribution diagram and the profile of the line scan from the exemplary AFM image in FIG. 11, whereas GO sheets may be several micrometers thick, and are typically approximately 1.2 nm thick.

In some embodiments, a GO monolayer exhibits a thickness of approximately 1-1.4 nm thick, larger than an ideal monolayer of graphene (thickness ~0.34 nm), due to the presence of functional groups and adsorbed molecules. Since the functional groups may make GO strongly hydrophilic and negatively charged, the single layer GO sheets may be homogeneously dispersed 101 in an aqueous solution.

Figure 4A:
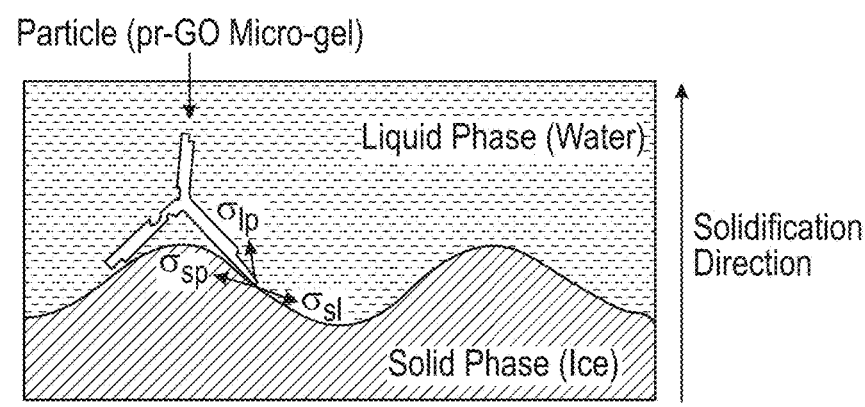
FIGS. 4A-B show an exemplary schematic illustration of the interfacial free energies between the solvent solidification front and the particles in suspension.
Figure 4B:
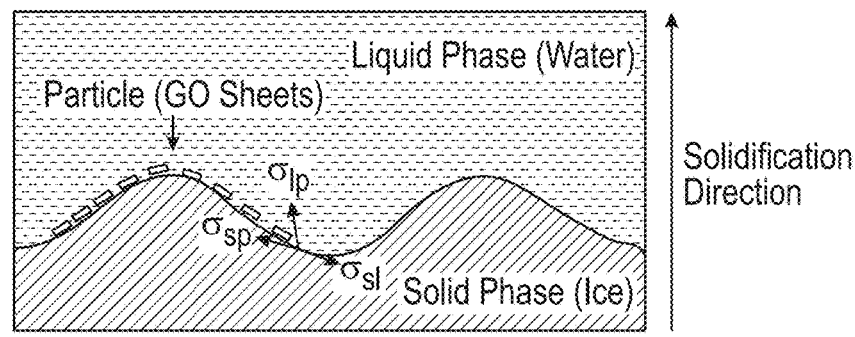

The requisite for a pre-reduction step 102 before freeze casting to form a hierarchy of pores within a graphene film may stem from two properties of GO. First, the 3D micro-gel structures may effectively resist the aggregation of the GO sheets during the filtration assembly and leave sufficient space for the solidification of water. In contrast, the compact configuration of filtered 2D GO sheets may jam the redistribution during the freezing procedure. Second, during the growth of GO sheets into micro-gels, the particle size may increase, and the 2D lamellar sheets may become 3D micro networks. In order to assemble into an integral porous graphene film, the GO particles in suspension may be rejected from the advancing solidification front during freezing. The thermodynamic condition for a GO particle to be rejected by the solidification front is that the interfacial free energies satisfying this following criterion:

$$\Delta\sigma = \Delta\sigma_{SP} - (\Delta\sigma_{LP} + \Delta\sigma_{SL}) > 0$$

where $\sigma_{SP}$, $\sigma_{LP}$, and $\sigma_{SL}$ are the interfacial free energies associated with the solid (ice)-particle (pre-reduced GO micro-gel or GO sheets), liquid (water)-particle and solid-liquid interface respectively. As illustrated in FIGS. 4A-B, the size increase and morphology change may reduce the contact interface area between the GO particles and the solid phase, and provide more contact interface area between liquid and solid phases, possibly resulting in the augmentation of $\sigma_{SP}$ and drop of $\sigma_{SL}$. Additionally, the filtration assembly process may be a useful way to increase the density of the particles in the suspension that approach the percolation threshold, to form continuous 3D porous network during the freeze-casting process.

In an exemplary method, as shown in FIGS. 6A-D and FIG. 24 the pre-reduced lamellar graphene oxide sheets 601, 602, 603, 604 gradually convert to partially reduced GO micro-gels during pre-reduction times of 5 minutes, 10 minutes, 20 minutes and 30 minutes, respectively.

Vacuum filtration 103 is a common method for preparing graphene or graphene-based films due to its easy manipulation. One of the advantages of the filtration method is the convenience in controlling the thickness and mass loading of an as-filtered film by adjusting the volume of the dispersion.

Per the exemplary method in FIG. 1, after the pre-reduced GO dispersion is filtered 103, the film is immersed into liquid nitrogen to solidify the water molecule inside and between the micro gels, when, continuous ice crystals may form and grow into the pre-reduced GO networks. The pre-reduced GO sheets may be rejected from the advancing solidification front and collected between the gaps of growing ice crystals. The framework may accommodate the 9% positive solidification volume expansion for liquid water changed to solidified ice crystal.

In some embodiments, freeze-casting may be a versatile, readily accessible and inexpensive solution-phase technique to control crystallization of a suspension and induce ordered hierarchical porous architectures. In some embodiments, freeze-casting is a phase segregation process, wherein, as a liquid suspension freezes, spontaneous phase segregation gather the dispersed particles to the space between the solvent crystals, and wherein subsequent sublimation of the solidified frozen solvent template under reduced pressure creates a three-dimensional network, where the pores become a replica of the solvent crystals.

Directly freeze-casting a GO dispersion may only result in a randomly oriented porous brittle monolith. A number of parameters, including the size, shape, density and size distribution of the GO particles, may affect their interaction and reaction with the solution, which may modify the solidification kinetics of the freezing procedure and the resulting pore structure. Only the fraction of GO particles in suspension may achieve a specific percolation threshold, and become "entrapped," during the freezing process to form a continuous 3D porous network. Therefore, the introduction of a pre-reduction step 102 to adjust the size, shape, and size distribution of the GO particles, and a filtration step 103 may increase the density of the dispersion capable of achieving the percolation threshold.

The morphology of the solidified ice crystal may largely dictate the porous characteristics of the final graphene films. Once complete solidification of hydro-film is achieved, pores may be created where the ice crystals were. Finally, per the exemplary method, the subsequent higher temperature long-term reduction may strengthen the connection between pre-reduced GO gels and further increase the degree of reduction.

The assembly of two-dimensional graphene sheets described herein, may be performed using simple benchtop chemistry to form electrodes that comprise cellular graphene films which may be used in supercapacitors without the need for binders, a conductive additive required for the assembly of traditional supercapacitors.

The exemplary 3D porous RGO films described herein may satisfy the main requirements for high power density supercapacitor electrodes. The open and connected pores provide high-speed electrolyte ion transport and freely accessible graphene surfaces for forming electrical double layers. The high electrical conductivity and robust mechanical strength may ensure high efficiency in exporting electrons to an outside load. Furthermore, these exemplary 3D porous RGO networks may be further scaled-up in their loading mass and/or thickness due to the controllable filtration process.

Device Characteristics

FIGS. 7A-D show SEM images of the exemplary reduced GO 3D porous graphene films 701, 702, 703, 704, which were pre-reduced for 5, 10, 20 and 30 minutes respectively.

Figure 8A:
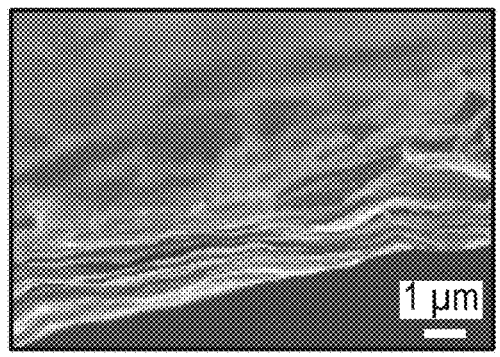
FIGS. 8A-B show cross-section SEM images of exemplary RGO films under low and high magnifications.
Figure 8B:
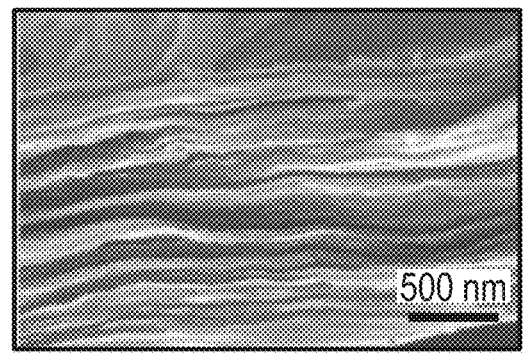

FIGS. 8A-B show low and high magnification SEM images of the exemplary reduced GO 3D porous graphene films, respectively, whereas the exemplary RGO films consists of stacked lamellar graphene sheets.

Figure 10A:
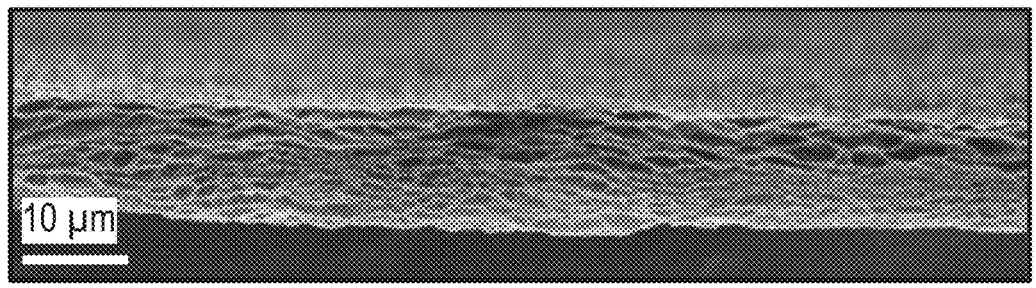
FIGS. 10A-H show SEM images of exemplary 3D porous RGO films after long-term reduction, a photograph of an exemplary bent 3D porous RGO film, and transmission electron microscope (TEM) images of exemplary graphene films and pores.
Figure 10B:
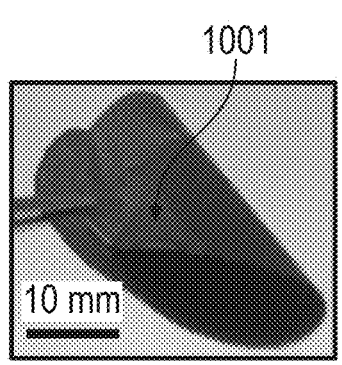
Figure 10C:
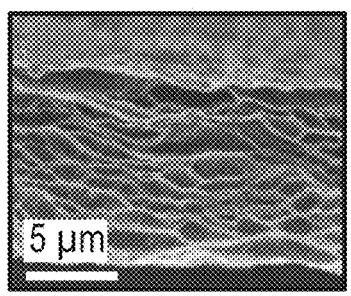
Figure 10D:
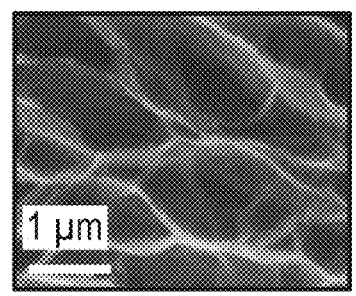
Figure 10E:
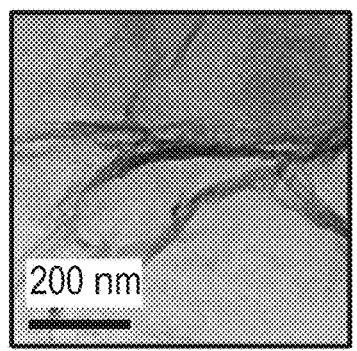
Figure 10F:
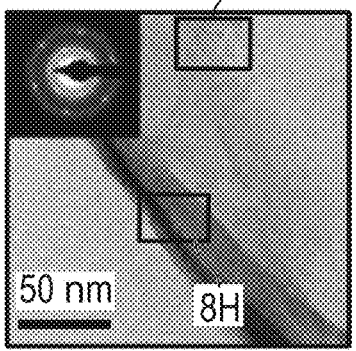
Figure 10G:
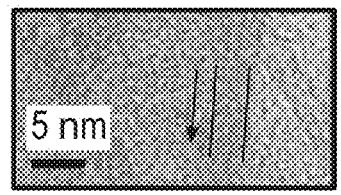
Figure 10H:
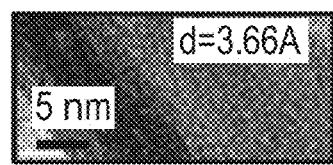

FIG. 10A presents a typical cross-section scanning electron microscope (SEM) image of an exemplary 3D porous RGO film 1001 under low magnification, which may exhibit a continuous open network with a uniform thickness of about 12.6 μm. The honeycomb-like structures may indicate that the pores are a replica of the ice crystals. As shown in the high magnification SEM images in FIG. 10A-D, the pore sizes of the exemplary 3D porous RGO film 1001 are in the range of hundreds nanometers to several micrometers and the pore walls consist of thin layers of graphene sheets, which is consistent with exemplary transmission electron microscopy (TEM) results per FIG. 10E. The exemplary TEM images, per FIGS. 10E and 10F, also reveal several crumpled 5-10 nm graphene sheets stacked on the surface of graphene walls that are several tens of nanometers thick; possibly due to rejection from the solidification front that pushes the dispersed pre-reduced GO sheets into the gaps between the ice crystals formed during the freezing process. The exemplary clear lattice fringes, per FIGS. 10G and 10H, and the exemplary typical six-fold symmetry diffraction pattern may provide further evidence for the nearly complete reduction of the 3D porous RGO film 1001. The reduction process may be associated with significant changes in the electrical properties of the film.

Figure 9A:
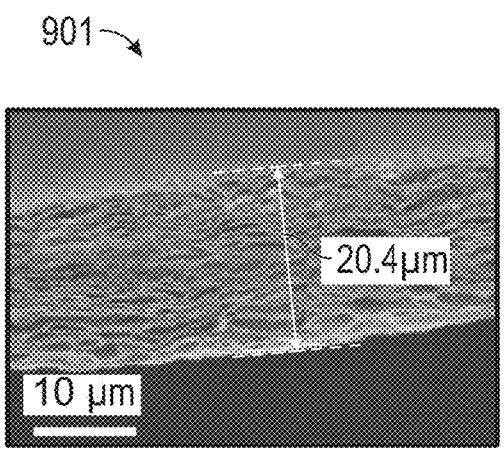
FIGS. 9A-B show cross-section SEM images of exemplary 3D porous RGO films with different loading masses.
Figure 9B:
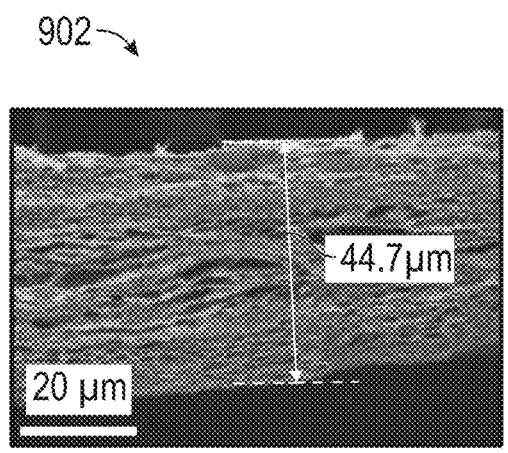

Exemplary supercapacitor devices with increased electrochemical performance were prepared by increasing the dispersion volume to increase the loading mass. As seen in cross-sectional SEM images, per FIG. 9A-B, the exemplary as-prepared high loading mass films may maintain their highly porous microstructure when the thickness is increased to 20.4 µm, i.e. twice the loading, and to 44.7 µm, a five-fold increase in the loading.

Figure 13:
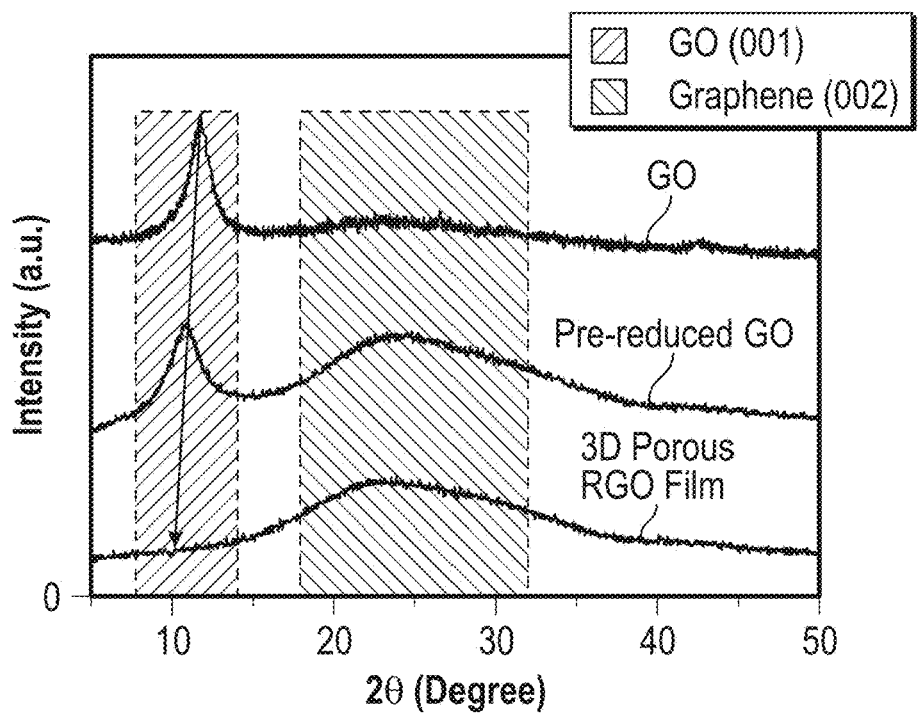
FIG. 13 shows x-ray power diffraction (XRD) patterns for the exemplary samples of GO, pre-reduced GO, and 3D porous RGO film under different reduction procedures.
Figure 14A:
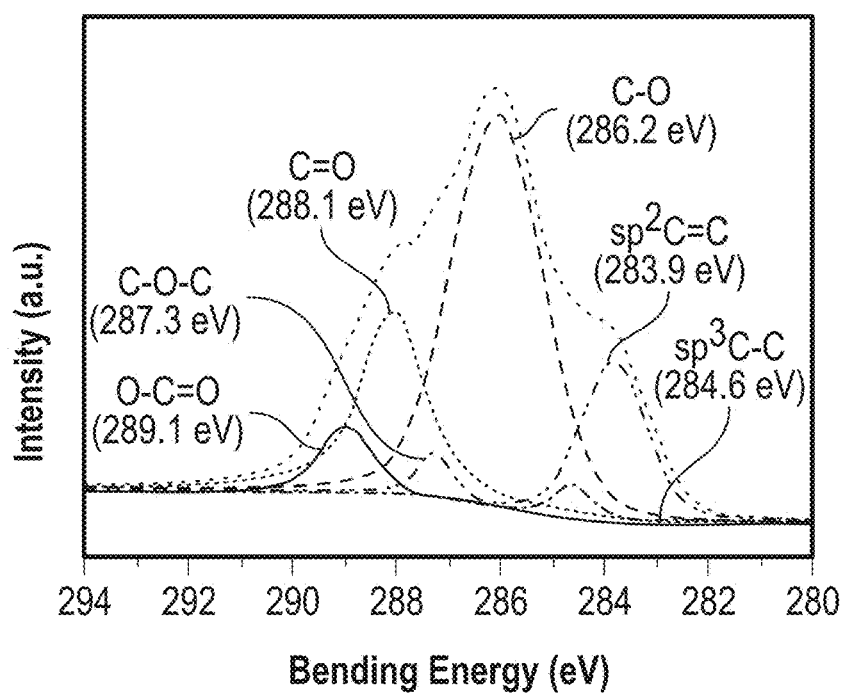
FIGS. 14A-C show exemplary x-ray photoelectric spectroscopy (XPS) $C_{is}$ transition profiles for GO, pre-reduced GO and 3D porous RGO films.
Figure 14B:
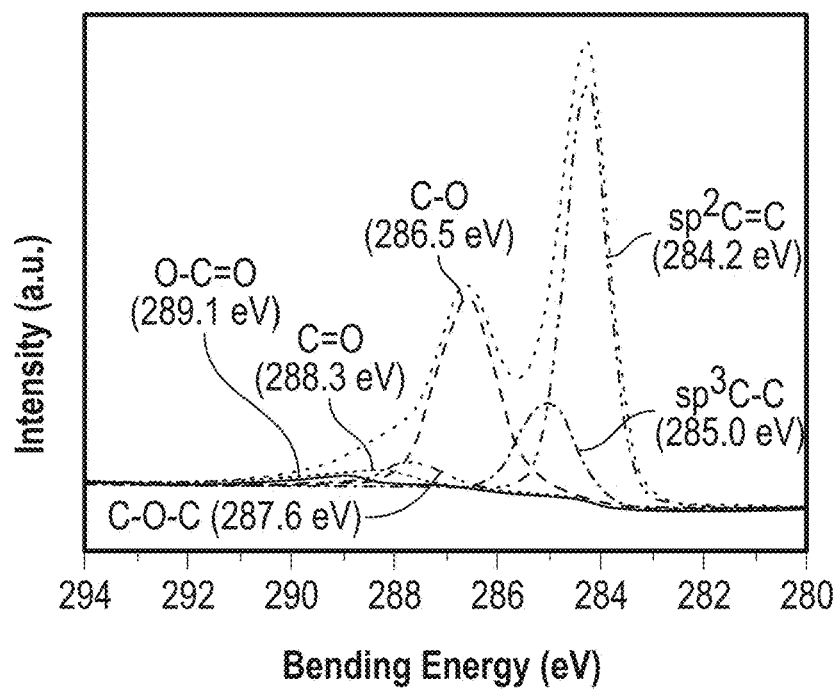
Figure 14C:
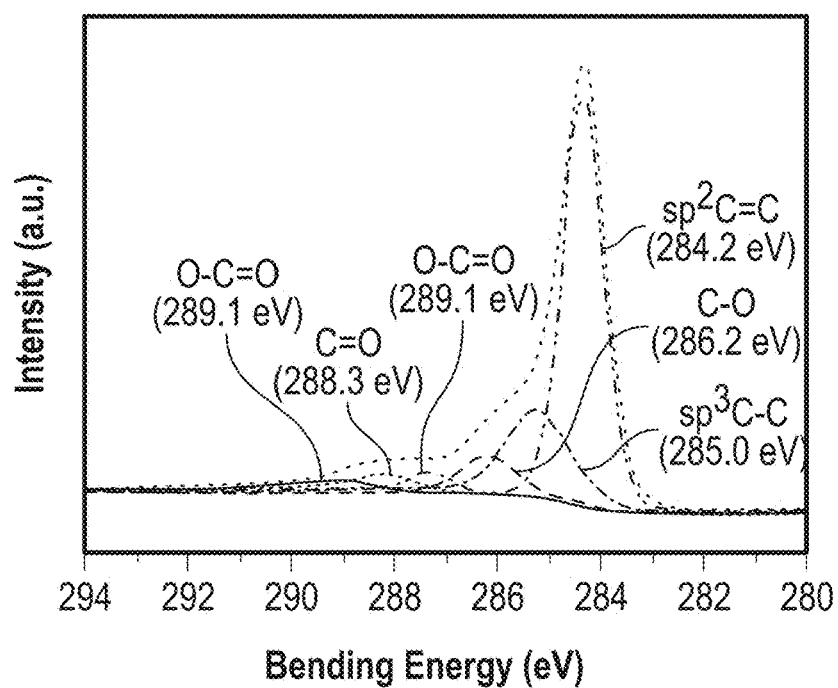
Figure 15:
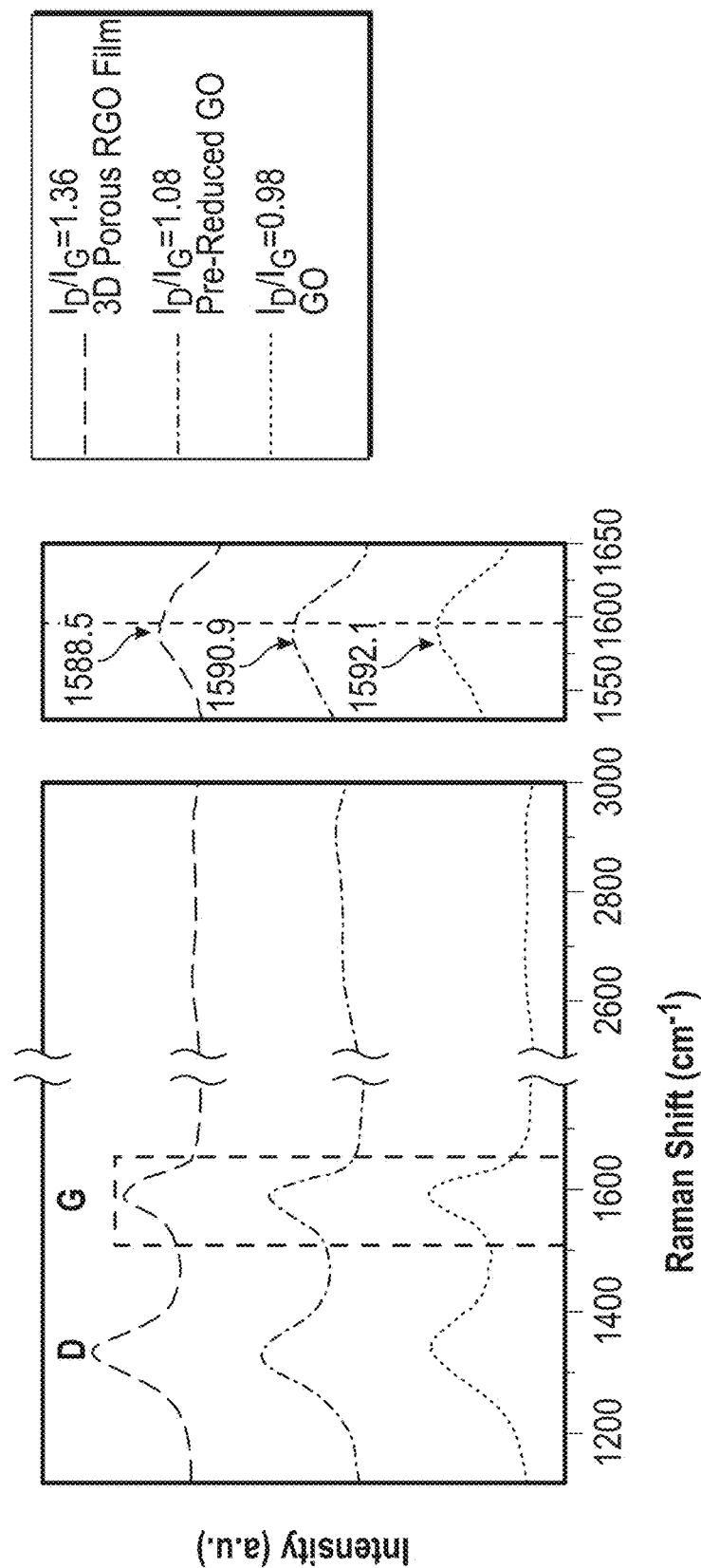
FIG. 15 shows Raman spectra for exemplary GO, pre-reduced GO and 3D porous RGO films.

The exemplary X-ray diffraction (XRD) pattern, per FIG. 13 of GO is characterized by a strong peak at 2θ=11.7°. The exemplary pre-reduced GO exhibits a significant decline in the intensity of the "GO" peak at 10.8° and the development of a broad peak at 24°, which may indicate the partial reduction of GO and the creation of extended graphene sheets. The XRD pattern of the exemplary 3D porous RGO film is comprised mainly of a broad "graphene" peak, which suggests that a high degree of reduction of the exemplary 3D porous RGO film has occurred. The XPS $C_{1s}$ spectrum, per FIGS. 14A-C, confirms the exemplary results in FIG. 13, wherein changes are observed in the peaks corresponding to oxygen containing groups C and by the intensity ratio of the D and G peaks in Raman spectroscopy per FIG. 15.

FIGS. 17A-D present I-V conductivity tests of exemplary GO, pre-reduced GO and 3D porous RGO films. The exemplary GO film exhibits nonlinear and asymmetric behavior, with a differential conductivity value ranging from x to y depending on the gate voltage. The exemplary pre-reduced GO films display a more linear and symmetric I-V curve, with a stable conductivity of about 10.3 S/m. The I-V curve of the exemplary 3D porous RGO film is almost linear, which may be associated with a high conductivity of about 1,905 S/m. As such, the fabricated graphene films may hold promise as high performance supercapacitor electrodes.

The cyclic voltammetry (CV) curves taken at scan rates from 0.2-20 V/s shown in FIG. 21A FIGS. 20A-D demonstrate that the exemplary 3D porous RGO electrodes retain their rectangular shape and high current densities even at an extremely high scan rate of 20 V/s. The rectangular nature of the CV curves may indicate a good electrical double-layer capacitor (EDLC) behavior for the exemplary 3D porous RGO films.

Figure 23:
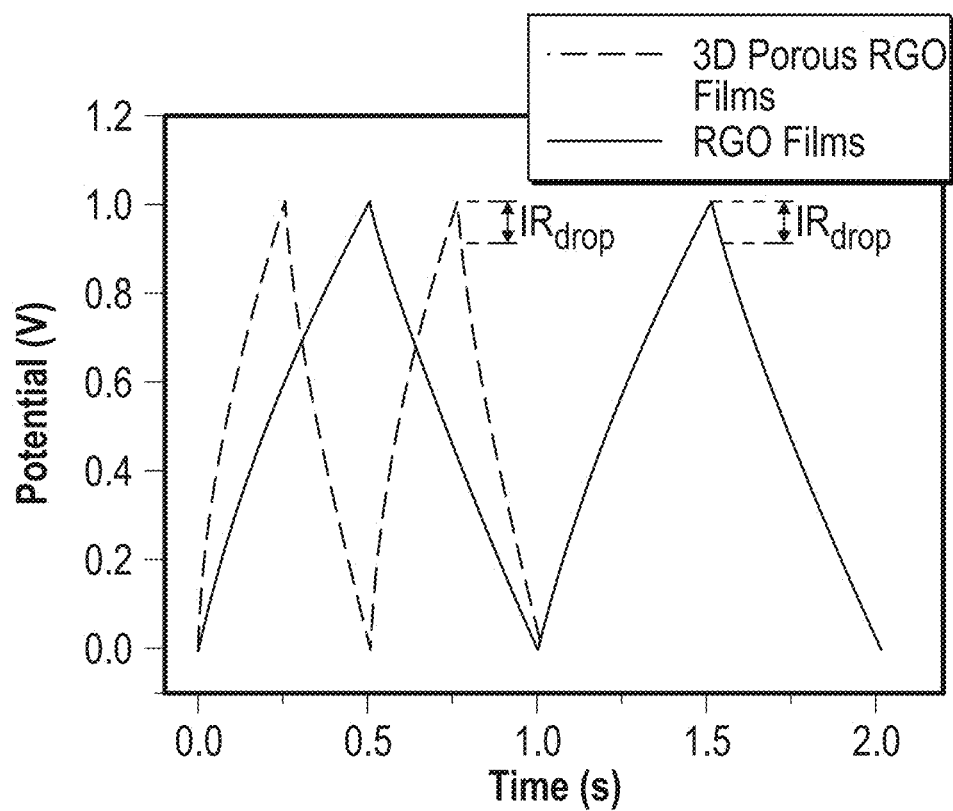
FIG. 23 shows galvanostatic charge/discharge profiles for exemplary RGO and 3D porous RGO films at a current density of 100 A/g.
Figure 24:
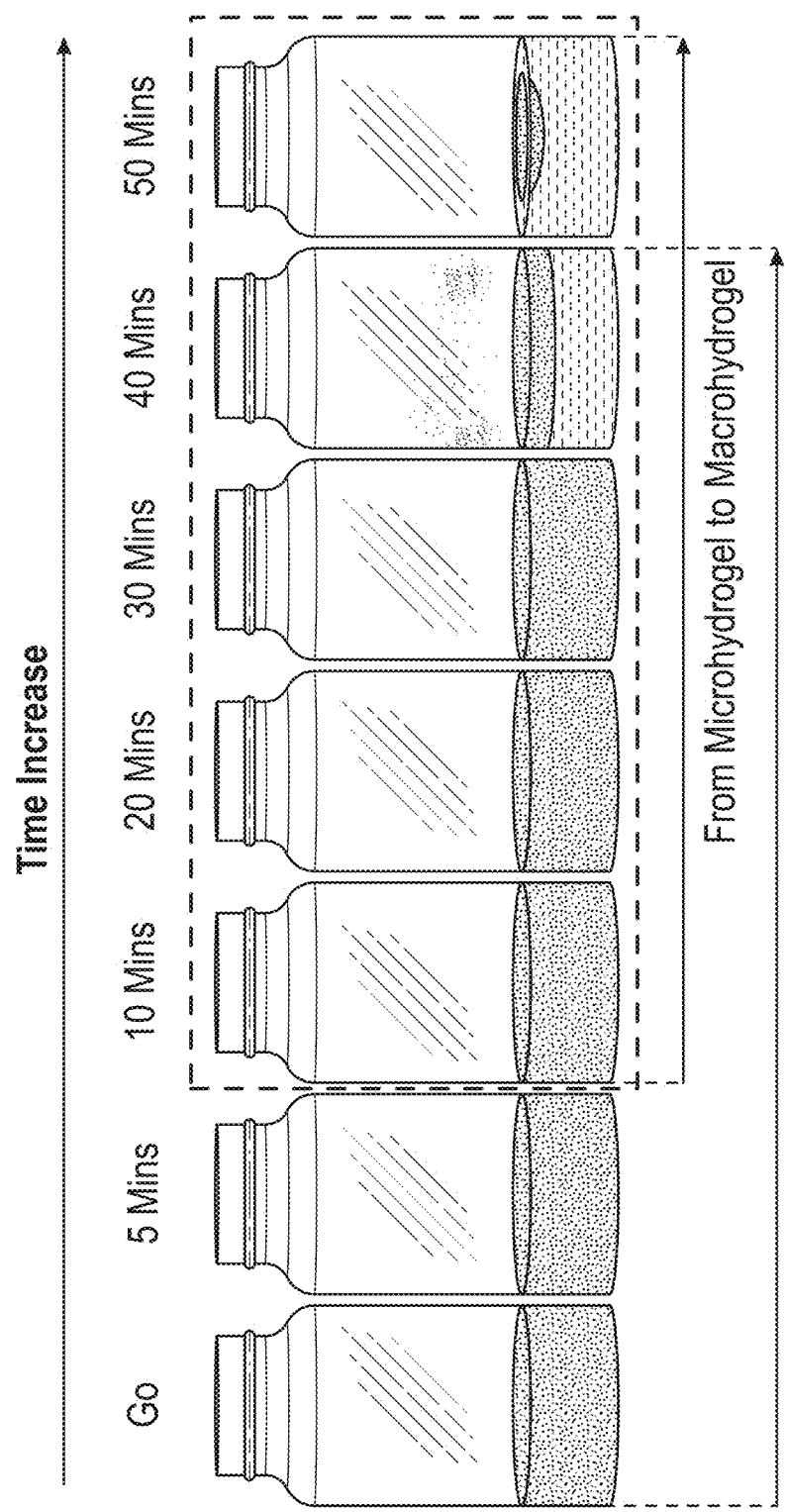
FIG. 24 shows exemplary illustrations of GO dispersions after being subjected to pre-reduction by ascorbic acid for different times.

The CV curves, per FIGS. 19A-D, 20A-D, and 21B, and the galvanostatic charge/discharge FIG. 23 curves may show a significant electrochemical performance enhancement for exemplary 3D porous RGO films, when compared with the exemplary RGO films. The more rectangular shape of the CV curves, at a high scan rate of 1,000 mV/s, and more triangular shape of the galvanostatic charge/discharge curves, at a high current density of 100 A/g, may indicate a better capacitive performance and electrolyte ion transport of the exemplary 3D porous RGO electrode. The larger area of the CV curve and the longer discharge time may also dictate a higher capacitance of the exemplary 3D porous RGO electrode. The high linear dependence (R2=0.9986) of the discharge current on the scan rate, up to high scan rates, may indicate an ultra-high power capability of the exemplary porous RGO electrode. The specific capacitance based on the active materials of these two exemplary supercapacitor electrodes was derived from the galvanostatic charge/discharge data and is summarized in FIG. 21C.

Figure 22A:
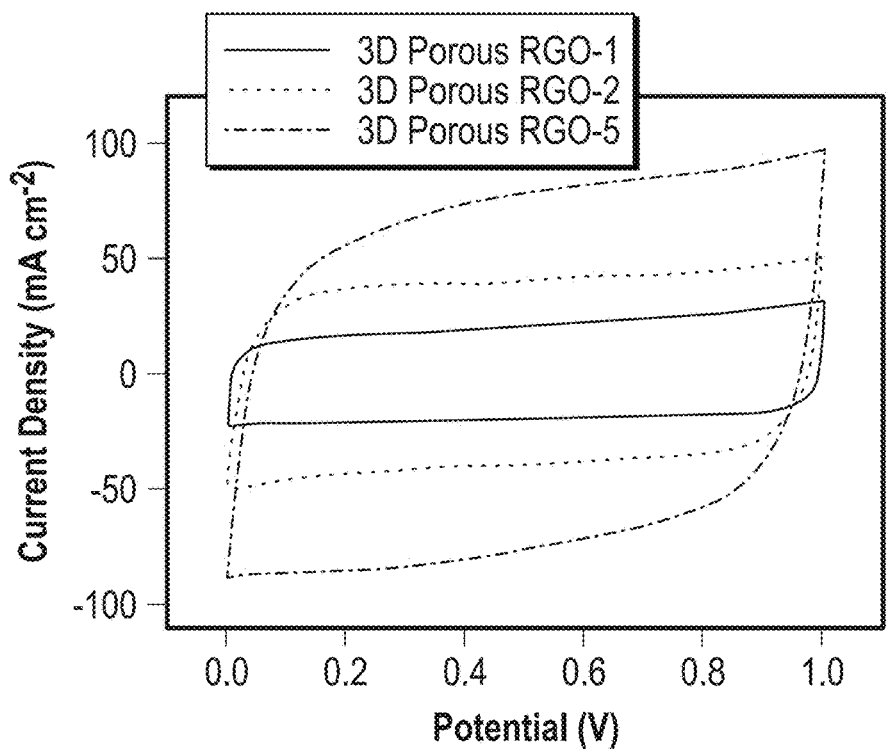
FIGS. 22A-D show comparative cyclic voltammetry curves of exemplary 3D porous RGO, the gravimetric and areal capacitance of exemplary 3D porous RGO electrodes with different mass loadings at various current densities, and a Ragone plot of the volumetric power density versus energy density for exemplary 3D porous RGO supercapacitors.
Figure 22B:
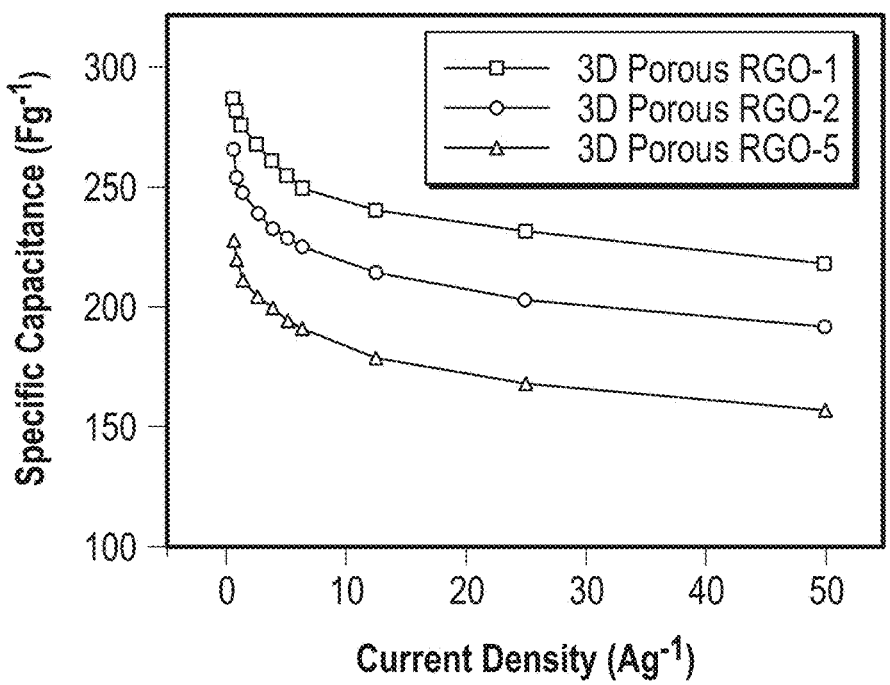
Figure 22C:
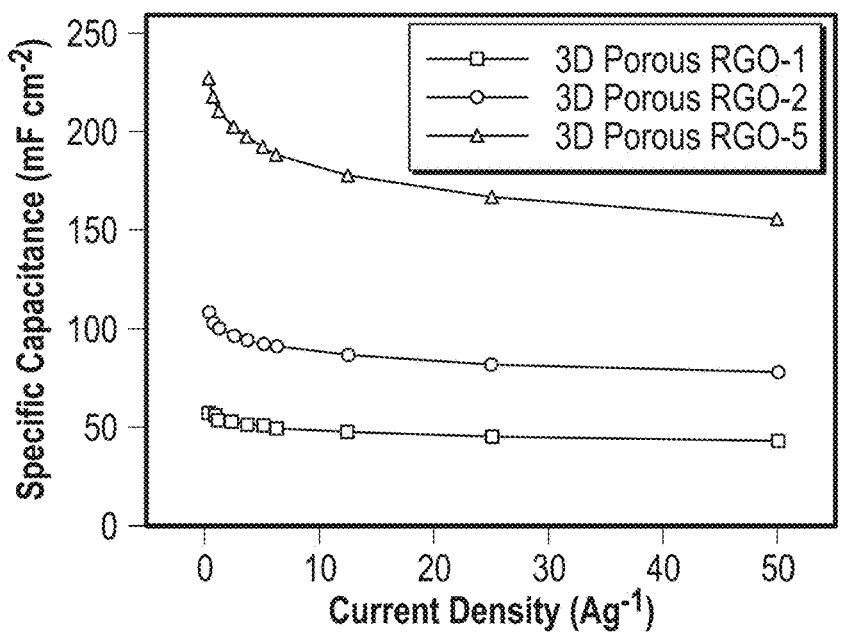

Because of the high electrical conductivity and excellent ion transport inside the exemplary porous high loading mass films, the CV curves, per FIG. 22A, maintain their rectangular shapes even when the scan rate is increased up to 1.0 V/s. The current density increases significantly as the loading mass of the exemplary 3D porous RGO film is increased. As a result, the gravimetric capacitance of the exemplary 3D porous RGO film only decreased by 6.6% (to 265.5 F/g) and 15% (to 241.5 F/g) at the mass loadings of twice and five-fold, respectively, per FIG. 22B. Meanwhile, the areal capacitance increases from 56.8 mF/cm$^2$ to 109 mF/cm$^2$ and 246 mF/cm$^2$, per FIG. 22C respectively.

Figure 21A:
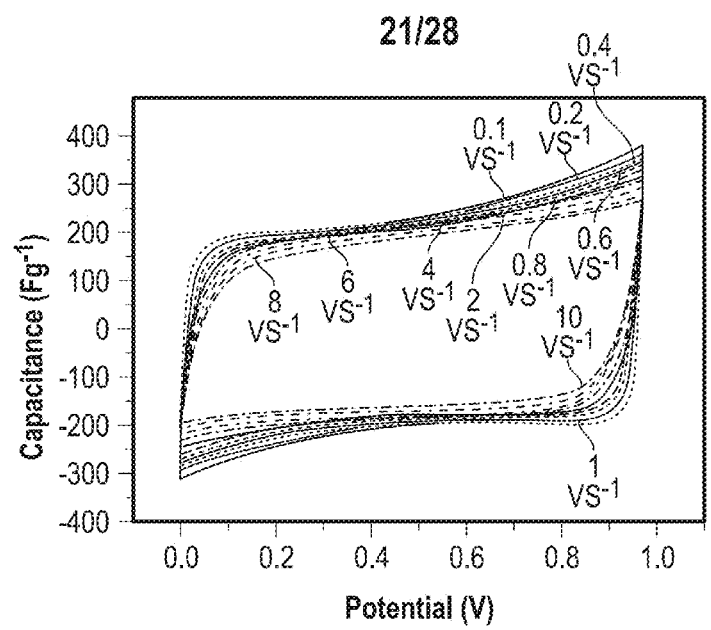
FIGS. 21A-F show cyclic voltammetry profiles at different scan rates for an exemplary 3D porous RGO film in 1.0 M $H_2SO_4$ electrolyte and performance comparisons of an exemplary 3D porous RGO film and an exemplary RGO film based supercapacitor.
Figure 21B:
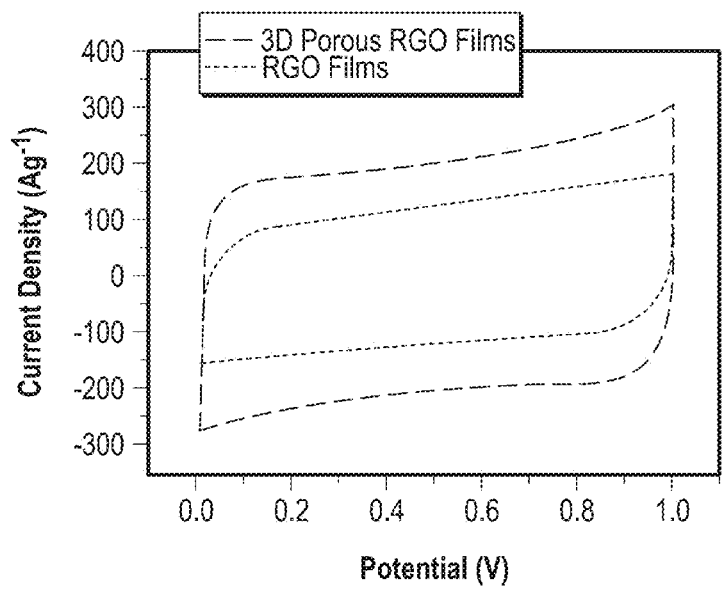
Figure 21C:
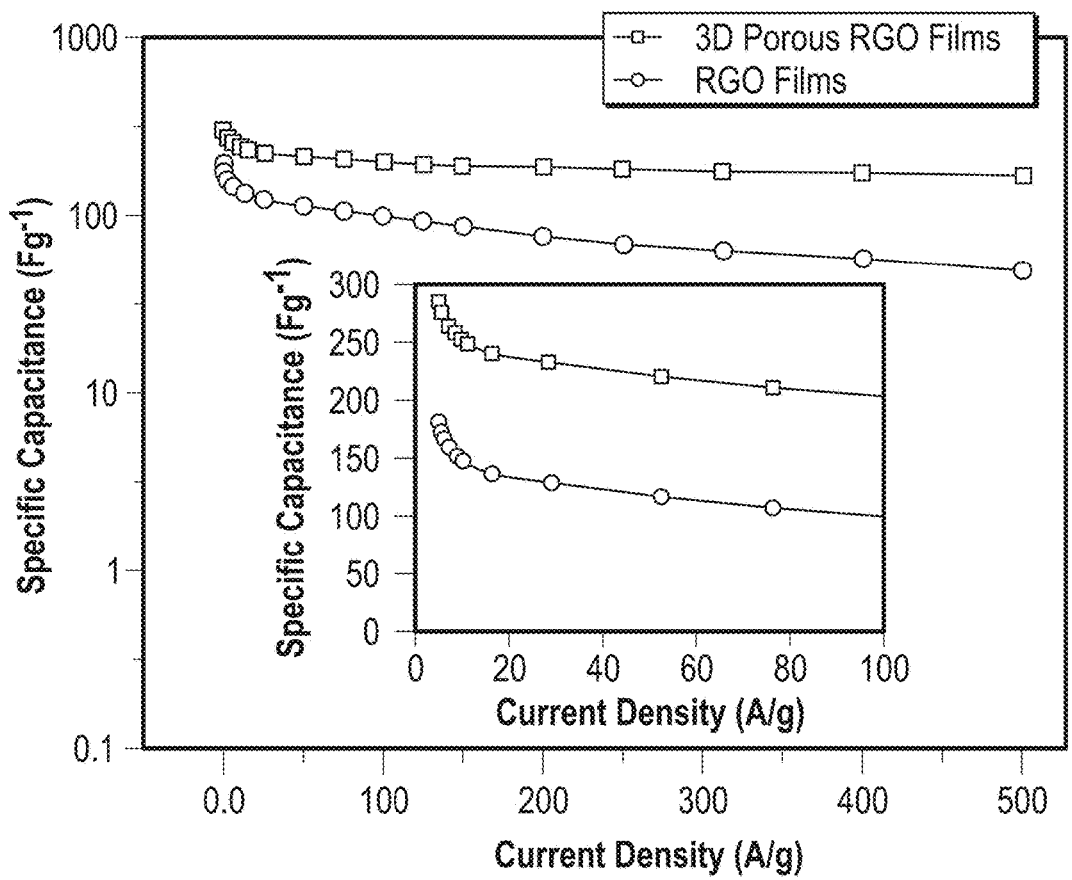
Figure 21D:
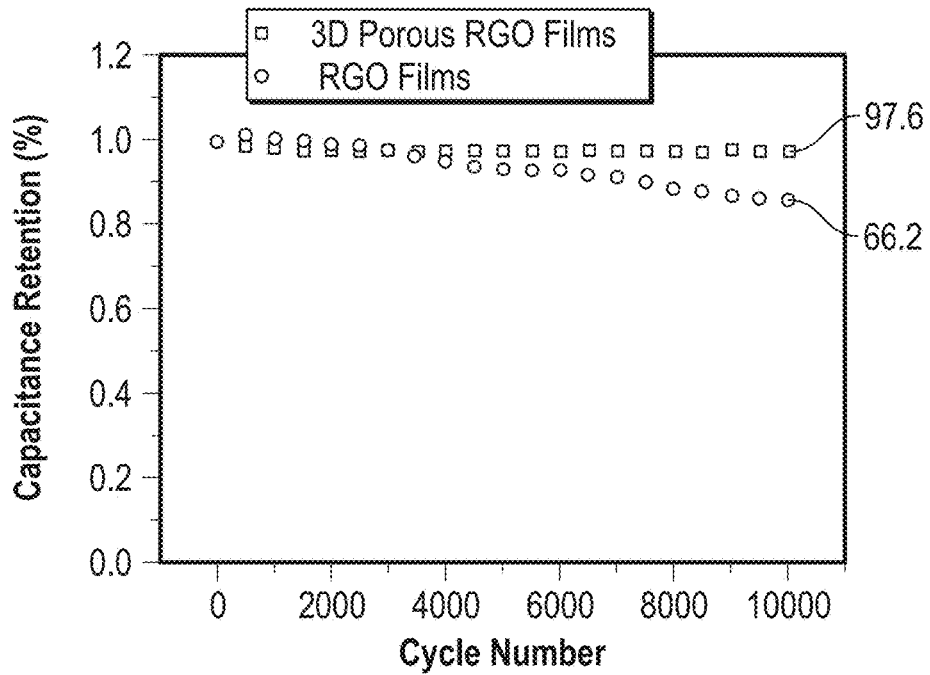

The exemplary 3D porous RGO film exhibited an ultra-high gravimetric capacitance of about 284.2 F/g at a current density of about 1 A/g, and retained about 61.2% (173.8 F/g) of its initial capacitance when the current density was increased up to 500 A/g. In contrast, the exemplary RGO had a gravimetric capacitance of 181.3 F/g at 1 A/g and a capacitance retention of only 27.8% (50.4 F/g) at 500 A/g. FIG. 21C displays the cycling stability of the exemplary electrodes during 10,000 charge/discharge cycles at a current of 25 A/g. The exemplary 3D porous RGO films exhibited a capacitive retention of 97.6%, compared to the 86.2% shown by the exemplary RGO films in FIG. 21D.

Figure 18:
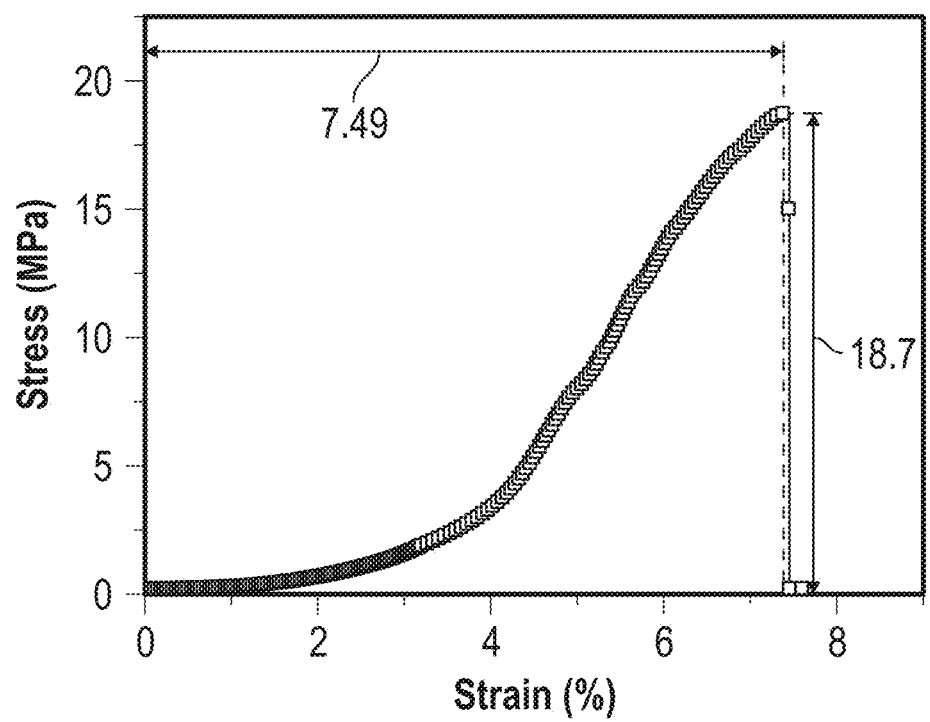
FIG. 18 shows the strain-stress curve of an exemplary 3D porous RGO film.
Figure 19A:
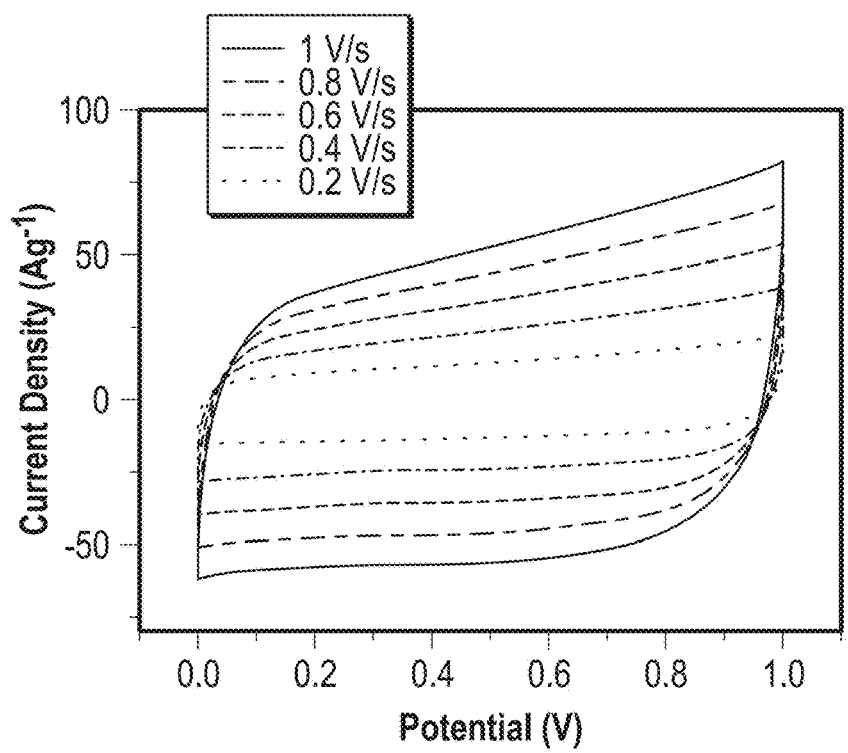
FIGS. 19A-D show cyclic voltammetry profiles and the dependence of the discharge current on voltage scan rates, of an exemplary RGO film supercapacitor in 1.0 M $H_2SO_4$ aqueous electrolyte.
Figure 19B:
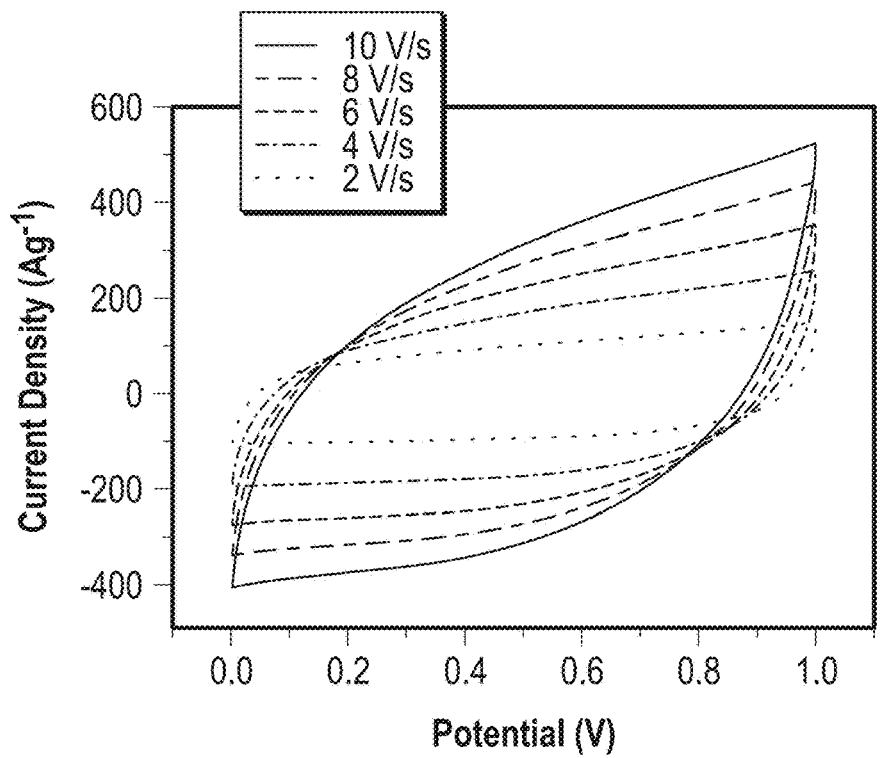
Figure 19C:
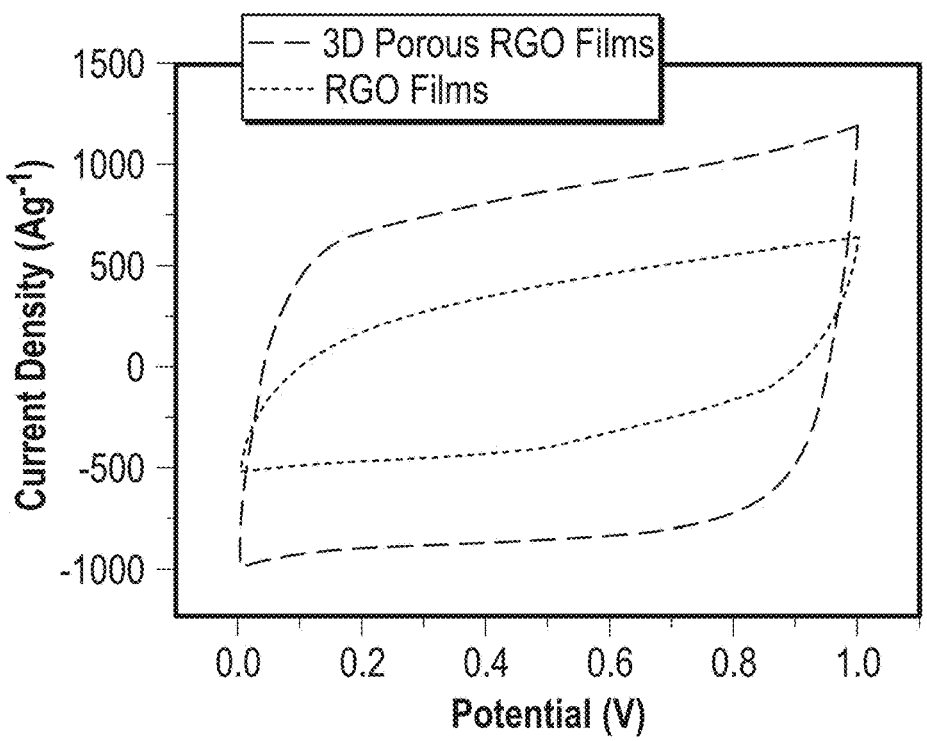
Figure 19D:
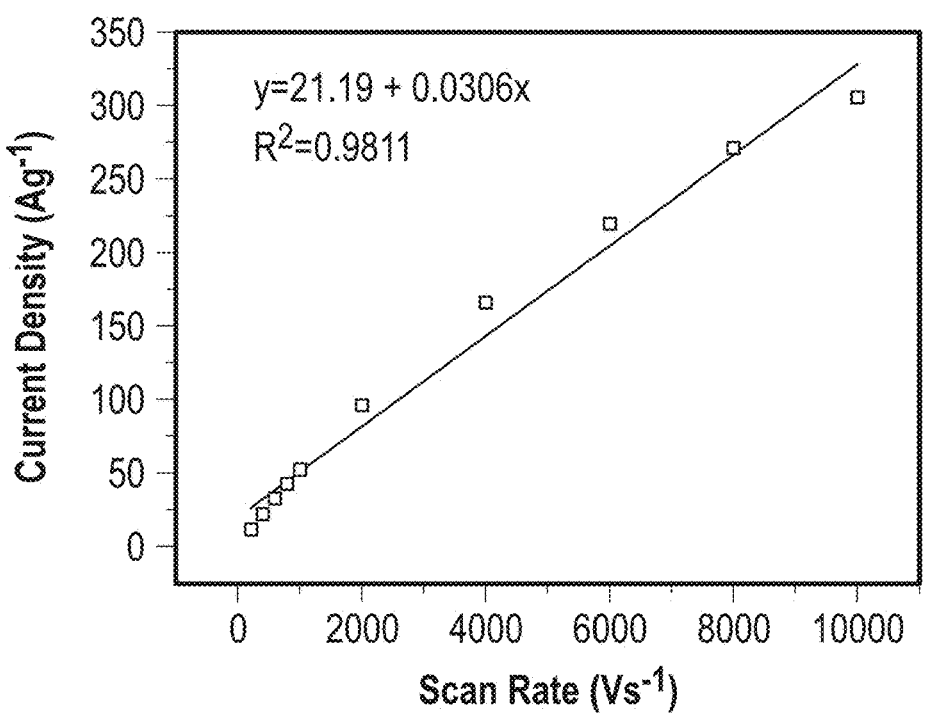
Figure 20A:
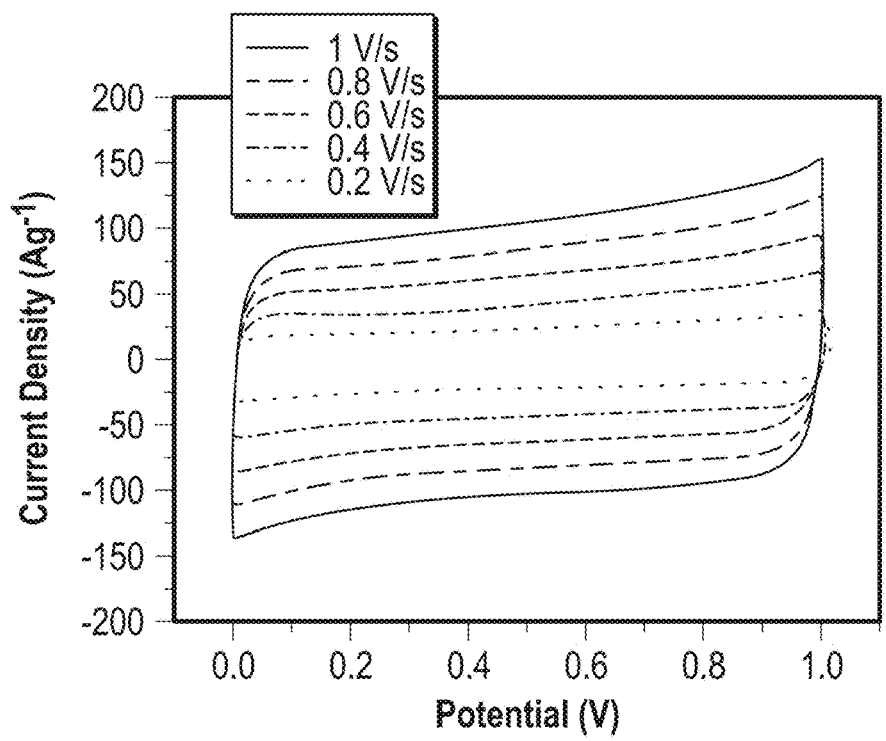
FIGS. 20A-D show cyclic voltammetry profiles and the dependence of the discharge current on voltage scan rates for an exemplary 3D porous RGO film supercapacitor in 1.0 M $H_2SO_4$ aqueous electrolyte.
Figure 20B:
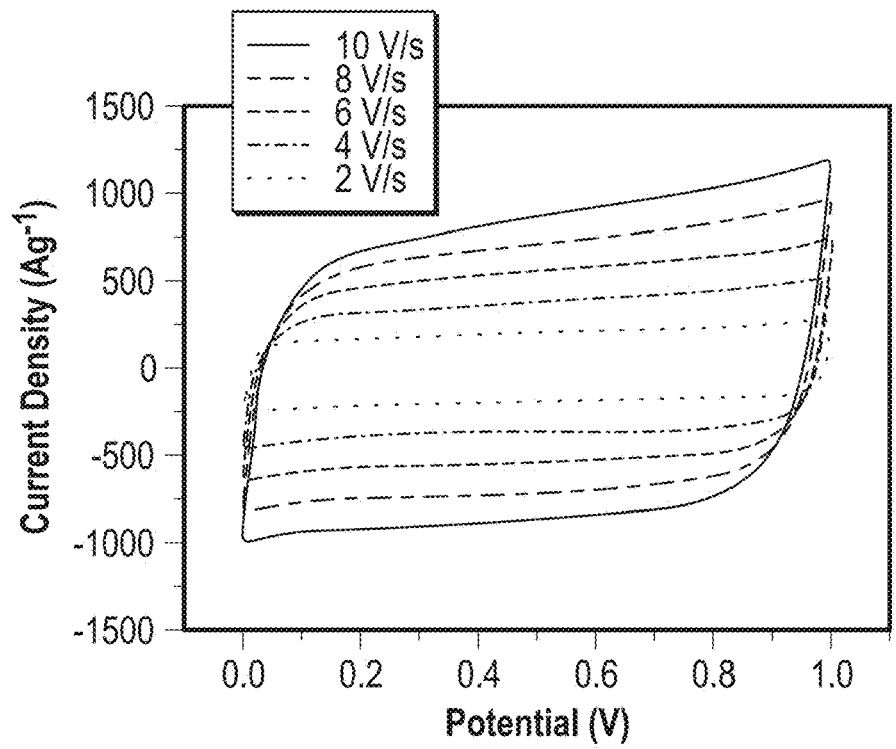
Figure 20C:
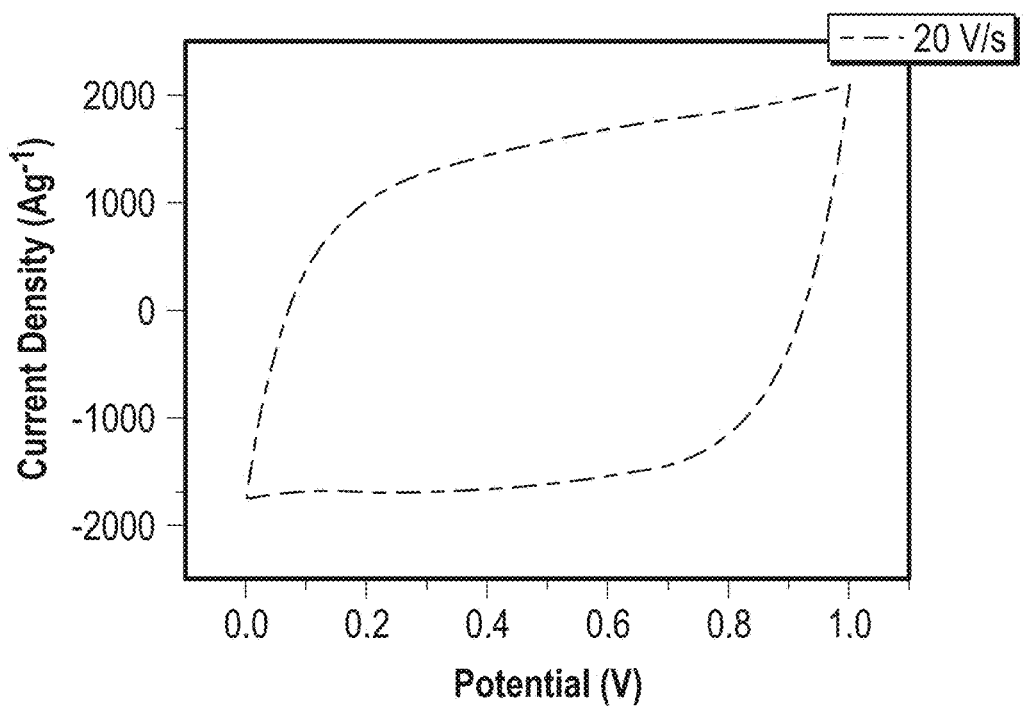
Figure 20D:
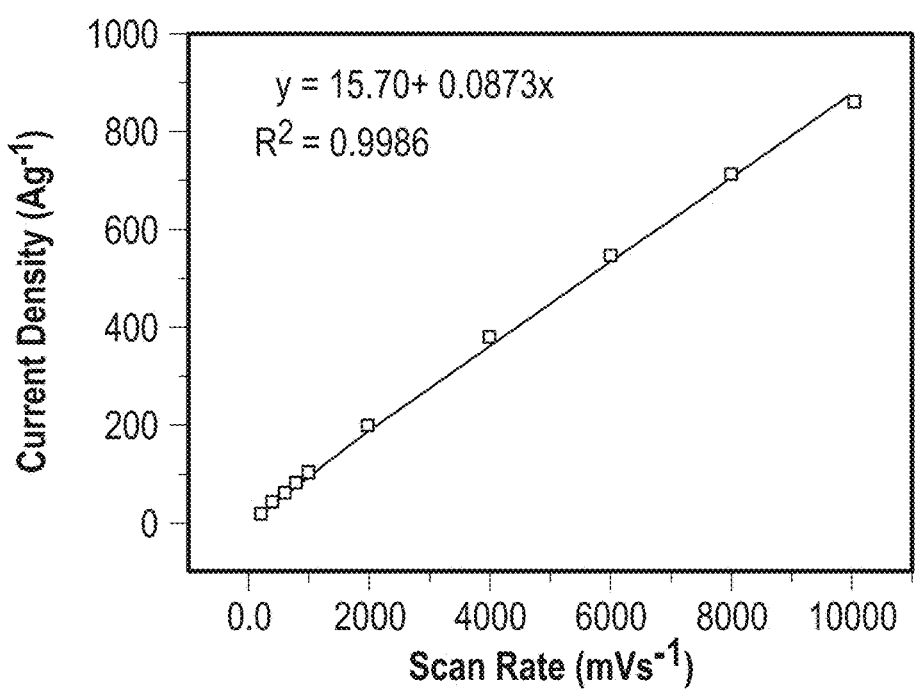

Furthermore, per FIG. 18, in spite of their highly porous microstructure, the as-prepared exemplary 3D porous RGO films exhibited good tensile strength of about 18.7 MPa, which is higher than previous reports for porous graphene films.

Calculation Methods

The capacitance of a supercapacitor ($C_{cell}$) in a two-electrode system is calculated from its galvanostatic charge/discharge curves at different current densities using:

$$C_{cell} = i_{discharge}/(dV/dt)$$

wherein $i_{discharge}$ is the discharge current, t is the discharge time, the potential range of V is the voltage drop upon discharge excluding the JR drop, and dV/dt is the slope of the discharge curve (in volts per second, V/s).

Alternatively, $C_{cell}$ may be calculated from CV curves by integrating the discharge current (i) vs. potential (V) plots using the following equation:

$$C_{cell} = \int_{V_{min}}^{V_{max}} i\,dV/Vv$$

where i is the current in the negative CV curve, v is the scan rate, and V ($V=V_{max}-V_1$) represents the potential window.

Specific capacitances of single electrode active materials were calculated based on their mass and area or volume. Since a symmetric two-electrode supercapacitor consists of two equivalent single-electrode capacitors in series, the total capacitance of the two electrodes and the capacitances of the positive and negative electrodes may be calculated using the equation below:

$$C_{positive} = C_{negative}$$

$$\frac{1}{C_{cell}} = \frac{1}{C_{positive}} + \frac{1}{C_{negative}}$$

Thus $C_{positive} = C_{negative} = 2C_{cell}$

In addition, the mass and volume of a single electrode accounts for half of the total mass and volume of the two electrode system ($M_{single-electrode} = \frac{1}{2} M_{two-electrode}$, $V_{single-electrode} = \frac{1}{2} V_{two-electrode}$). The area of a single electrode is equivalent to the area of the two-electrode system ($S_{single-electrode} = S_{two-electrode}$) with specific capacitances of the active material calculated according to the following equations:

$$C_{specific\ capacitance,M} = \frac{C_{single\ electrode}}{M_{single\ electrode}} = 4\frac{C_{cell}}{M_{two\ electrode}}$$

$$C_{specific\ capacitance,M} = \frac{C_{single\ electrode}}{S_{single\ electrode}} = 2\frac{C_{cell}}{S_{two\ electrode}}$$

$$C_{specific\ capacitance,M} = \frac{C_{single\ electrode}}{V_{single\ electrode}} = 4\frac{C_{cell}}{V_{two\ electrode}}$$

Analogously, specific capacitances of the two-electrode system are calculated based on the mass and area or volume of the two electrodes according to the following formulae:

$$C_{two\ electrodes,M} = \frac{C_{cell}}{M_{two\ electrode}}$$

$$C_{two\ electrodes,S} = \frac{C_{cell}}{S_{two\ electrode}}$$

$$C_{two\ electrodes,V} = \frac{C_{cell}}{V_{two\ electrode}}$$

Thus, $$C_{specific\ capacitance,M} = 4C_{two-electrode,M}$$

$$C_{specific\ capacitance,S} = 2C_{two-electrode,M}$$

$$C_{specific\ capacitance,V} = 4C_{two-electrode,V}$$

The specific energy densities of the electrode films based on the mass and area or volume of the active materials were obtained from the equations:

$$E_{electrodes,x} = \frac{1}{2}C_{two\ electrodes,x} \times (V - V_{IRdrop})^2$$

where $E_{electrode,x}$ and $C_{two-electrode,x}$ represent the energy densities and specific capacitance of the two electrodes based on different evaluating units (mass, area or volume), the V is the potential window in volts, and $V_{IRdrop}$ is the voltage IR drop at the beginning of the discharge part of the galvanostatic charge/discharge curves.

The energy density and power density based were calculated for the total exemplary devices by normalizing by the total volume including the two electrodes, current collectors, electrolyte and separator. The power densities of the electrode materials based on different units were calculated using the following equation:

$$P_{electrodes,x} = \frac{E_{electrodes,x}}{t_{discharge}}$$

where $t_{discharge}$ is the discharge time from the galvanostatic curves at different charge/discharge current densities.

As the calculations made herein are based on the power density obtained by dividing the energy density by the discharging time, the noted exemplary power density values has actually been achieved. Some reported device power densities are calculated from the square of the potential window divided by 4 times the ESR, which is the theoretical ideal maximum power density of a supercapacitor. The actual highest power density achieved by a supercapacitor is generally much lower than this ideal maximum value.

The specific capacitance of each exemplary devices was calculated by taking into account the entire (mass, area or volume) of the stacked device. This includes the active materials, current collector, separator, and electrolyte. Thus, the specific capacitances of the device were calculated from the equations:

$$C_{device,M} = \frac{C_{cell}}{M_{device}}$$

$$C_{device,S} = \frac{C_{cell}}{S_{device}}$$

$$C_{device,V} = \frac{C_{cell}}{V_{device}}$$

Therefore, the energy densities and power densities of the total device were calculated by the following equations:

$$E_{device,x} = \frac{1}{2}C_{device,x} \times (V - V_{IRdrop})^2$$

$$C_{device,x} = \frac{E_{device,x}}{t_{discharge}}$$

Figure 22D:
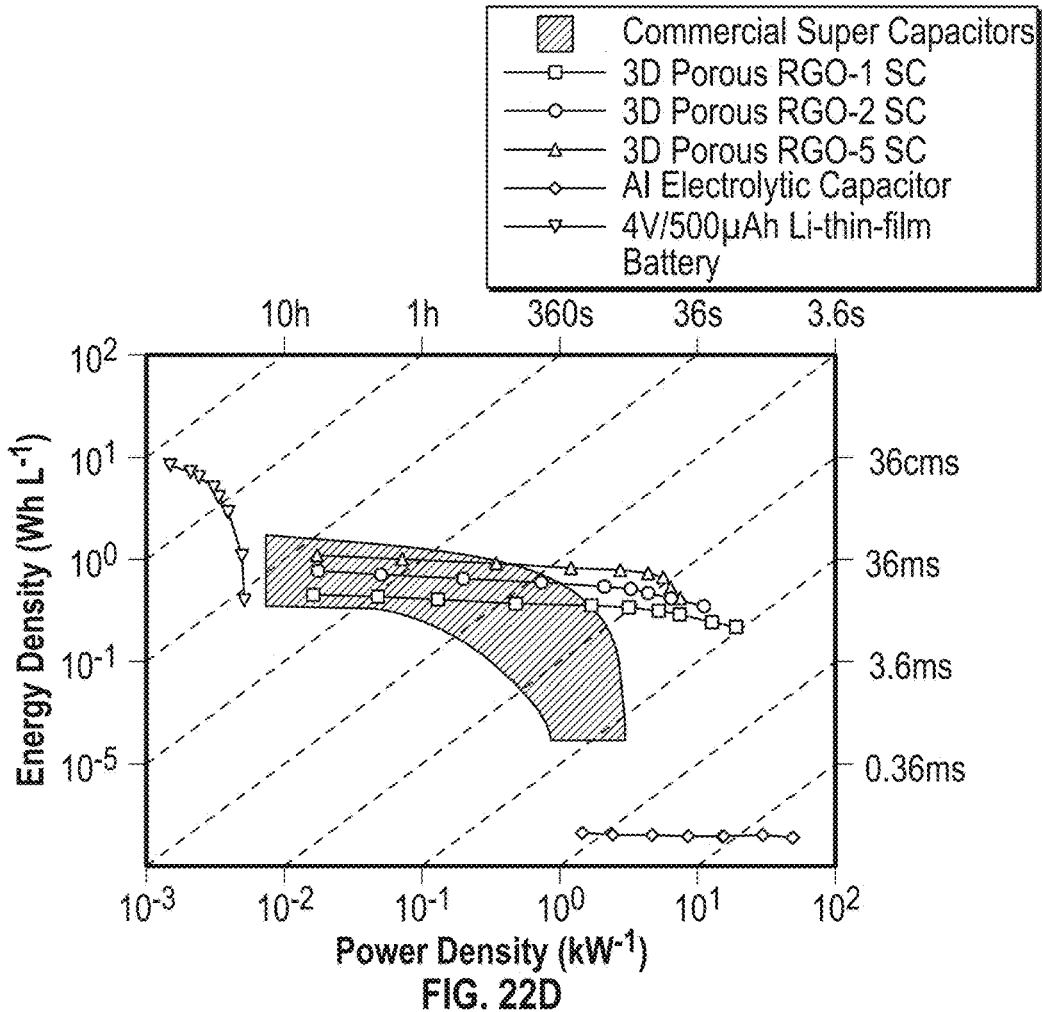

As summarized in a Ragone plot, per FIG. 22D, the exemplary 3D porous RGO supercapacitors exhibits high power densities of about (7.8-14.3 kW/kg). Furthermore, by increasing the mass loading of the active materials, the exemplary 3D porous RGO supercapacitor may store a high energy density up to 1.11 Wh/L, which is comparable to supercapacitors based on organic electrolytes or ionic liquids.

Figure 3:
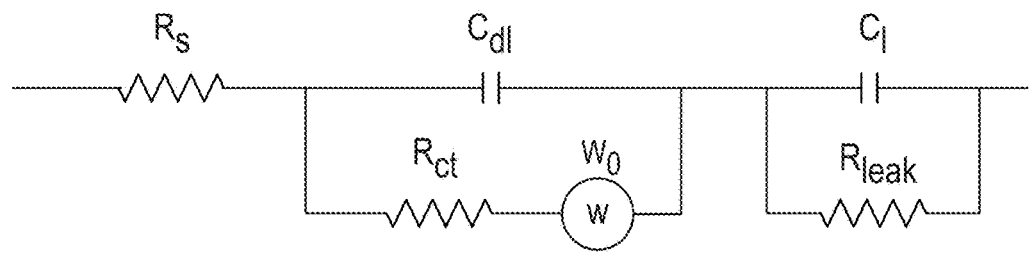
FIG. 3 shows an exemplary Randles equivalent circuit of a superconductor.

The schematic illustration presented in FIG. 3 displays a Randles circuit of the exemplary device. In some embodiments, a Randles circuit is an equivalent electrical circuit that consists of an active electrolyte resistance RS in series with the parallel combination of the double-layer capacitance and an impedance of a faradaic reaction. A Randles circuit is commonly used in Electrochemical Impedance Spectroscopy (EIS) for interpretation of impedance spectra.

Electrochemical impedance spectroscopy (EIS), alternatively named impedance spectroscopy or dielectric spectroscopy, is an experimental method of characterizing the energy storage and dissipation properties of electrochemical systems. EIS measures the impedance of a system as a function of frequency, based on the interaction of an external field with the electric dipole moment of the sample, often expressed by permittivity. Data obtained by EIS may be expressed graphically in Bode or Nyquist plots.

Figure 21E:
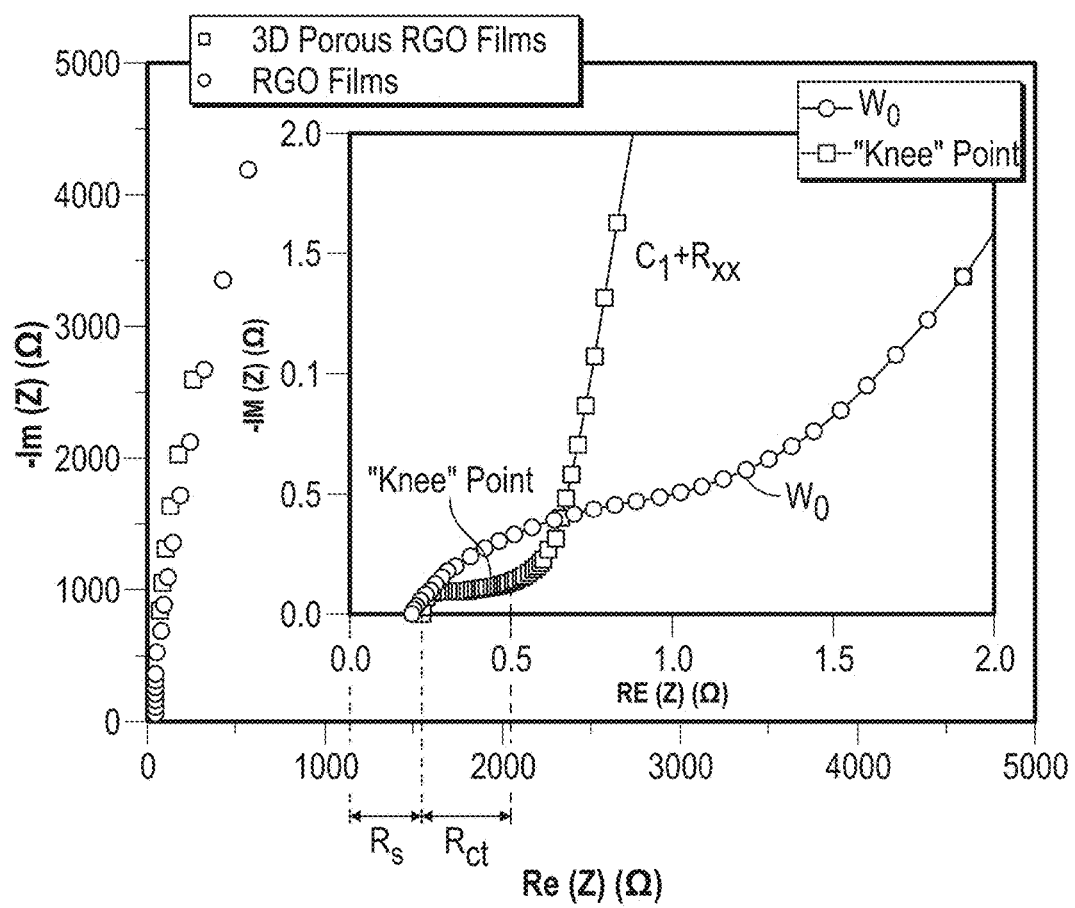
Figure 21F:
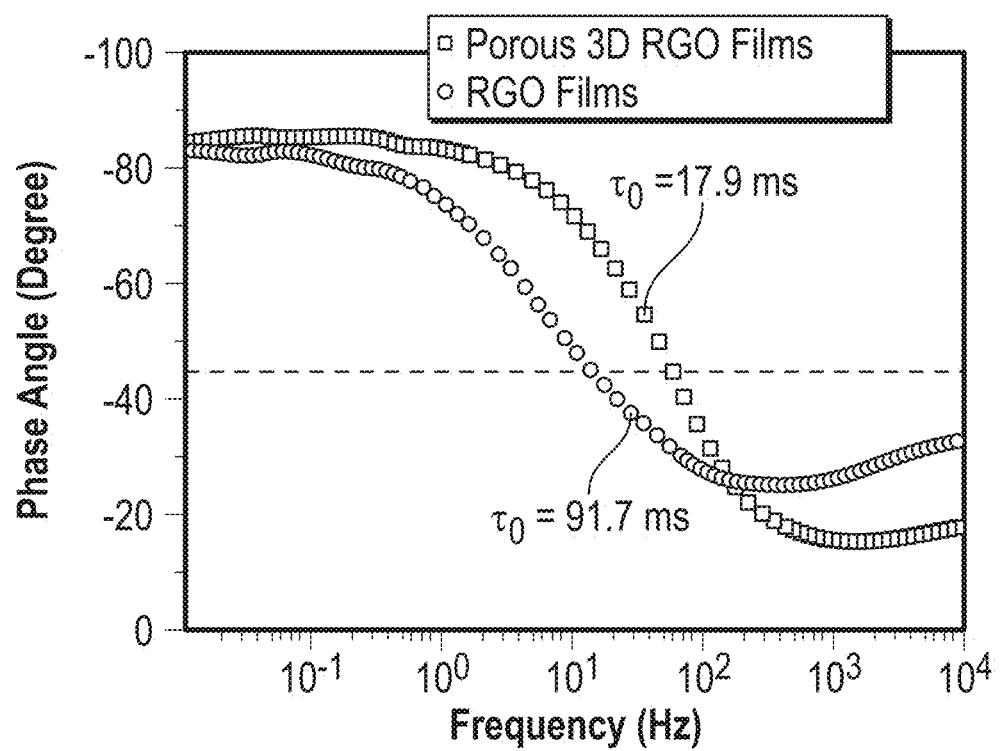

The measured Nyquist plots were fit on the basis of an equivalent Randles circuit in FIG. 3 by using the following equation:

$$Z = R_s + \frac{1}{j\omega C_{dl} + 1/R_{ct} + W_o} + \frac{1}{j\omega C_l + 1/R_{leak}}$$

where $R_s$ is the cell internal resistance, $C_{dl}$ is the double layer capacitance, $R_{ct}$ is the charge transfer resistance, $W_o$ is the Warburg element, $C_1$ is the low frequency mass capacitance, and $R_{leak}$ is the low frequency leakage resistance. These resistor and capacitor elements in the equivalent circuit may be related to specific parts in the Nyquist plot. At high frequency, the point of intersection on the real axis represents the internal resistance $R_s$, which includes the intrinsic electronic resistance of the electrode material, the ohmic resistance of the electrolyte, and the interfacial resistance between the electrode and the current collector. The semicircular in the high frequency region provides the behavior of the interfacial charge transfer resistance $R_{ct}$ and the double layer capacitance $C_{dl}$. After the semicircle, the exemplary Nyquist plot exhibits a straight long tail almost perpendicular to the x-axis and stretching to the low frequency region. This vertical line may represent the mass capacitance Cl, and the inclined angle suggests a resistive element, which is the leakage resistance $R_{leak}$. The transmission line with an angle of nearly 45 degrees to the x-axis from high frequency to the mid frequency may represent the Warburg element Wo, which is expressed as:

$$W_{ox} = \frac{A}{j\omega^n}$$

Where A is the Warburg coefficient, w is the angular frequency, and n is the constant phase element. Exponent Electrochemical Impedance Spectroscopy (EIS) may be a very useful method to analyze electrolyte ion transport and other electrochemical behavior. FIG. 21E shows the comparison of the Nyquist plots of the exemplary 3D porous RGO film and the exemplary RGO film electrodes. The Nyquist plot of the exemplary 3D porous RGO film features a nearly vertical curve, possibly indicating a good capacitive performance. A close-up observation of the high frequency regime reveals a semicircle with a ~45° Warburg region. The Nyquist plot of the exemplary 3D porous RGO electrode shows a shorter Warburg region and a smaller semicircle, which may indicate a lower charge transfer resistance and a more efficient electrolyte ion diffusion, when compared to the exemplary RGO electrode. The Nyquist plots are fitted to an equivalent circuit per FIG. 3. The internal resistances (Rs) are about 0.202Ω and about 0.244Ω; with charge transport resistances (Rct) of about 0.181Ω and about 1.04Ω obtained by fitting the exemplary 3D porous RGO film and exemplary RGO film supercapacitors, respectively. These low resistance values may indicate a high electron conductivity along the graphene walls, and a high-speed ion migration through the 3D open pores. The open surfaces of the 3D porous RGO films may be easily accessed by electrolyte ions without a diffusion limit, which may guarantee a large capacitance at high current density/scan rate. In contrast, the condensed layer structure of RGO films may only provide a narrow neck-like channel and confined pores for electrolyte ion transport, which may result in increased resistance and reduced capacitances. The exemplary Bode plots per FIG. 21F display a characteristic frequency $f_0$ at the phase angle of −45°, which marks the transition point from resistive behavior to capacitive behavior. The exemplary 3D porous RGO supercapacitor exhibits an $f_0$ of about 55.7 Hz, which corresponds to a time constant (τ0=1/f0) of 17.8 ms, which is significantly lower than 91.7 ms exhibited by the exemplary RGO supercapacitor. This time constant for the exemplary 3D porous RGO supercapacitor is lower than some pure carbon based micro-supercapacitors (e.g. 26 ms) for onion-like carbon, and 700 ms for activated carbon. This extremely low time constant may provide further evidence for the high-speed ion diffusion and transport inside the 3D porous RGO electrodes. The sum of Rs and Rct may be the chief contributors to the equivalent series resistance (ESR), which mainly limits the specific power density of a supercapacitor. Thus, the low ESR, high capacitance and nearly ideal electrolyte ion transport of the exemplary 3D porous RGO electrodes provide the extremely high power density of 282 kW/kg and high energy density of 9.9 Wh/kg, even with only a 1.0 V potential window using an aqueous electrolyte. This high power density from the exemplary 3D porous RGO supercapacitor is close to that of an aluminum electrolytic capacitor and much higher than most previously reported EDLCs, pseudo-capacitors, and even asymmetric supercapacitors.

Exemplary Measurement Devices

The morphology and microstructure of the exemplary prepared films were characterized using a field emission scanning electron microscope (FE-SEM, JEOL 6701F) and a transmission electron microscopy (TEM, FEI TF20). X-ray diffraction patterns were collected using a Panalytical X'Pert Pro X-ray Powder Diffractometer with Cu-Ka radiation (/c=1.54184 A). Exemplary Raman spectroscopy measurements were performed using a laser micro-Raman system (Renishaw) at an excitation wavelength of 633 nm. Atomic force microscopy images were recorded using a scanning probe microscope (Bruker Dimension 5000). The tensile strength of the each film was tested by a tensile testing machine (Q800 DMA (Dynamic Mechanical Analyzer)). X-ray photoelectron spectroscopy data was collected with a spectrometer (Kratos AXIS Ultra DLD) using a monochromatic AlKa X-ray source (hv 1486.6 eV).

Figure 16:
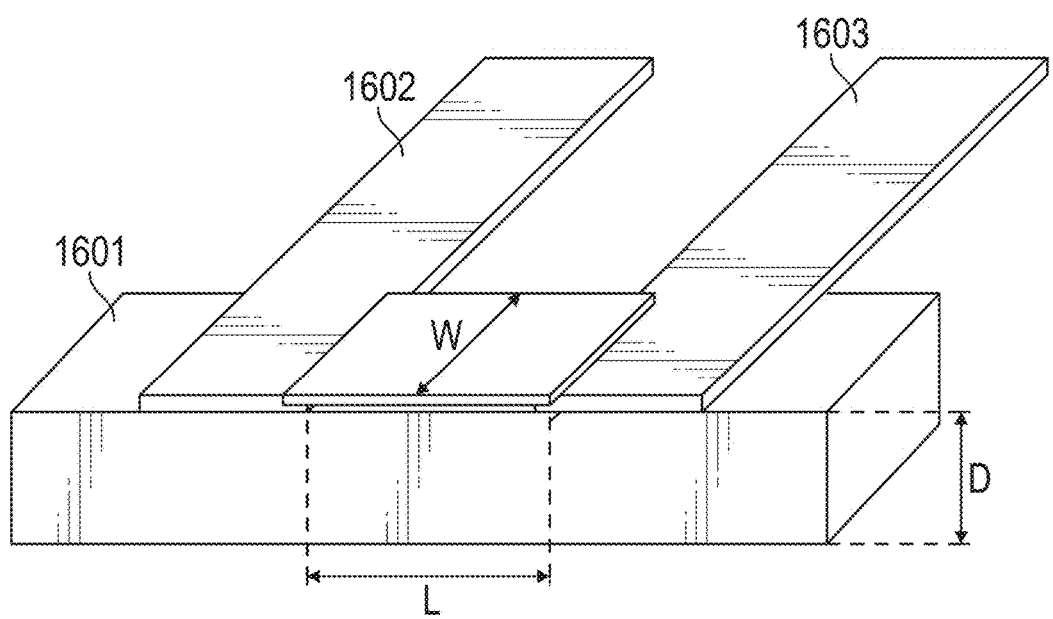
FIG. 16 shows an exemplary schematic illustration of a two-electrode measurement system.
Figure 17A:
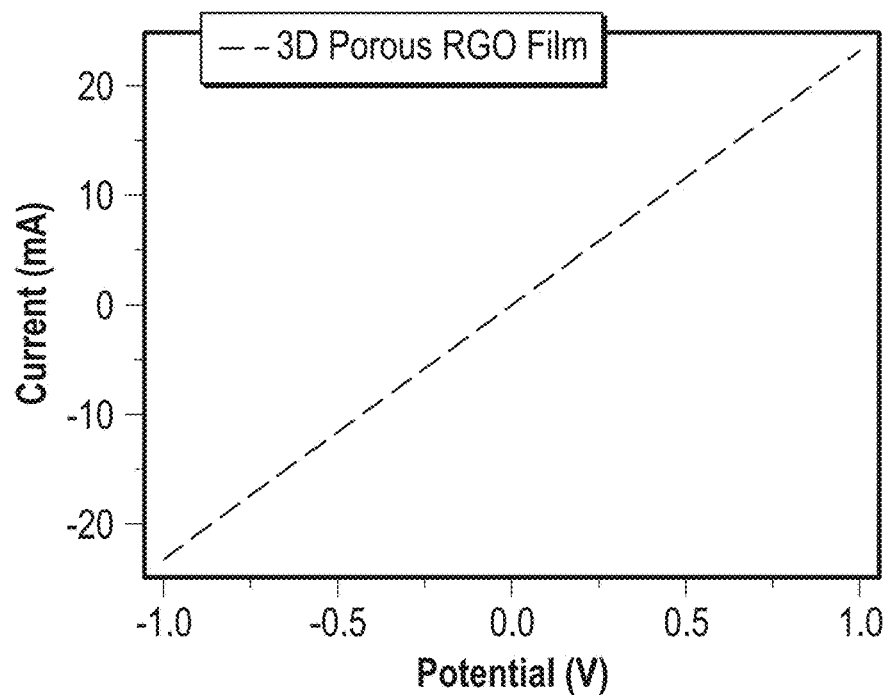
FIGS. 17A-D show the I-V curves, and a comparison of electrical conductivity values of exemplary 3D porous RGO, partial reduced GO, and GO films
Figure 17B:
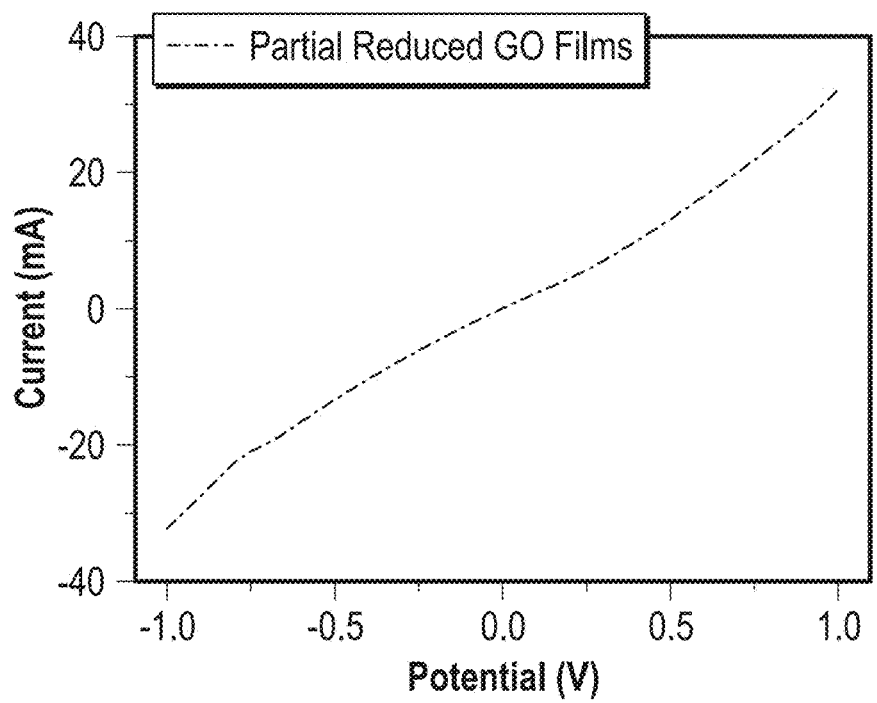
Figure 17C:
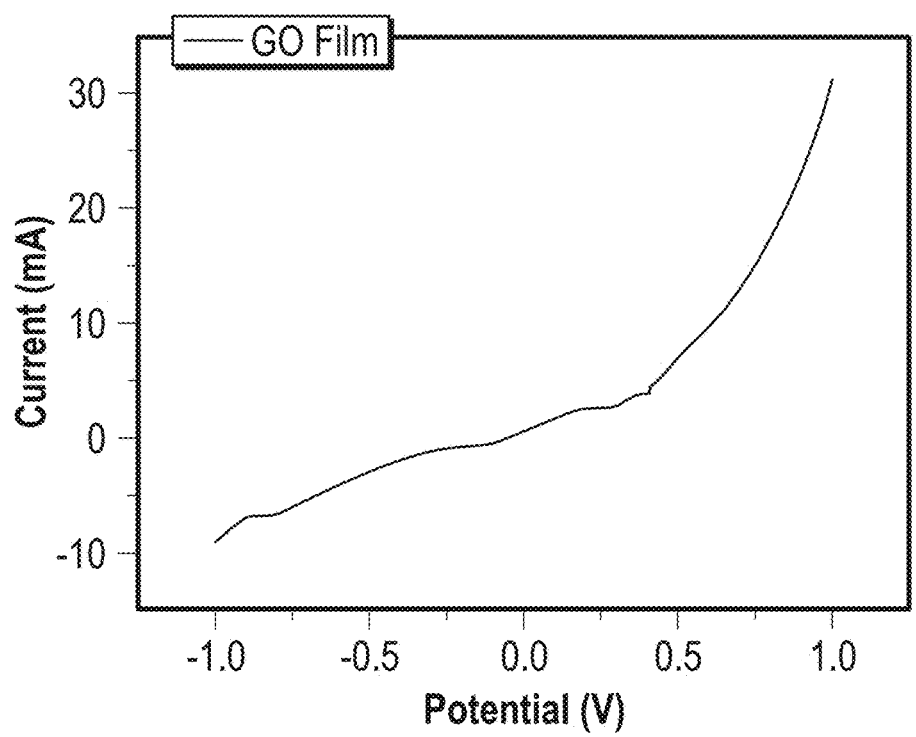
Figure 17D:
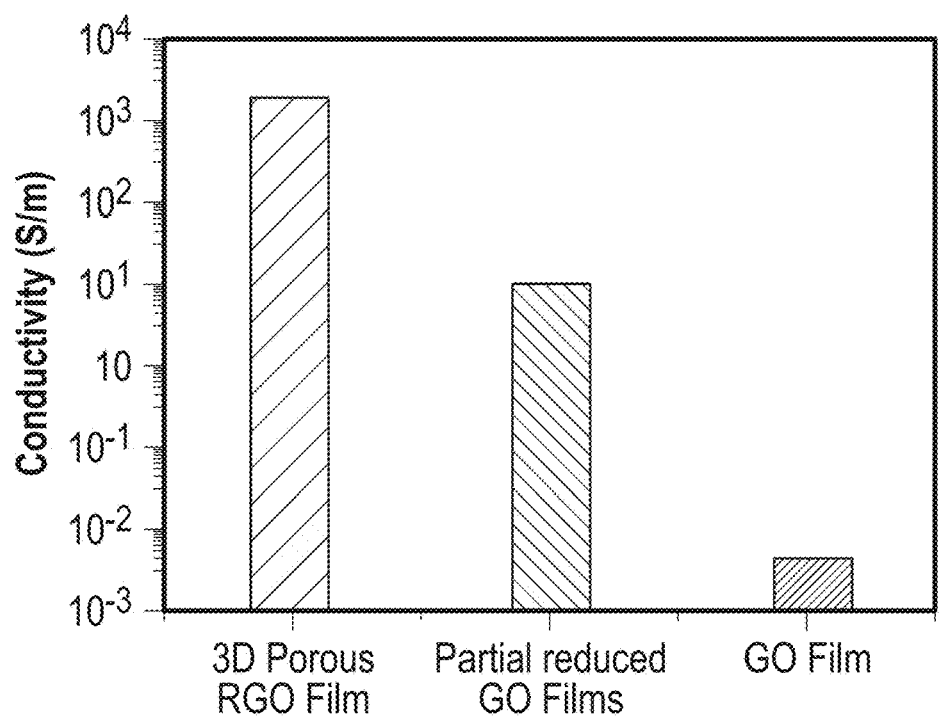

All the electrochemical experiments were carried out using a two-electrode, per FIG. 16, system with a potentiostat (Bio-Logic VMP3). The EIS measurements were performed at open circuit potential with a sinusoidal signal over a frequency range from 1 MHz to 10 MHz at an amplitude of 10 mV. The cycle life tests were conducted by galvanostatic charge/discharge measurements.

The devices described herein can alternatively be measured, characterized and tested by any alternative equivalent means, devices and equipment.

Terms and Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, and unless otherwise specified, the term GO refers to graphene oxide.

As used herein, and unless otherwise specified, the term RGO refers to reduced graphene oxide.

As used herein, and unless otherwise specified, the term 3D refers to three dimensional.

As used herein, and unless otherwise specified, the term SEM refers to a scanning electron microscope.

As used herein, and unless otherwise specified, the term TEM refers to a transmission electron microscope.

As used herein, and unless otherwise specified, the term AFM refers to an atomic-force microscope.

As used herein, and unless otherwise specified, CV chart refers to a cyclic voltammogram chart.

As used herein, and unless otherwise specified, EIS refers to electrochemical impedance spectroscopy.

As used herein, and unless otherwise specified, EDLC refers to electrical double-layer capacitor.

As used herein, and unless otherwise specified, XRD refers to X-Ray Power Diffraction.

As used herein, and unless otherwise specified, XPS refers to X-Ray Photoelectric Spectroscopy.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 grams, 30.0 grams, 20.0 grams, 10.0 grams, 5.0 grams, 1.0 grams, 0.9 grams, 0.8 grams, 0.7 grams, 0.6 grams, 0.5 grams, 0.4 grams, 0.3 grams, 0.2 grams or 0.1 grams, 0.05 grams, 0.01 grams of a given value or range. In certain embodiments, the term "about" or "approximately" means within 60 F/g, 50 F/g, 40 F/g, 30 F/g, 20 F/g, 10 F/g, 9 F/g, F/g, 8 F/g, 7 F/g, 6 F/g, 5 F/g, 4 F/g, 3 F/g, 2 F/g, 1 F/g of a given value or range. In certain embodiments, the term "about" or "approximately" means within 30.0 A/g, 20.0 A/g, 10.0 A/g 5.0 A/g 1.0 A/g, 0.9 A/g, 0.8 A/g, 0.7 A/g, 0.6 A/g, 0.5 A/g, 0.4 A/g, 0.3 A/g, 0.2 A/g or 0.1 A/g of a given value or range. In certain embodiments, the term "about" or "approximately" means within 20 kW/kg, 15 kW/kg, 10 kW/kg, 9 kW/kg, 8 kW/kg, 7 kW/kg, 6 kW/kg, 5 kW/kg, 4 kW/kg, 3 kW/kg, 2 kW/kg, 1 kW/kg, 0.5 kW/kg, 0.1 kW/kg, or 0.05 kW/kg of a given value or range. In certain embodiments, the term "about" or "approximately" means within 20 Wh/kg, 15 Wh/kg, 10 Wh/kg, 9 Wh/kg, 8 Wh/kg, 7 Wh/kg, 6 Wh/kg, 5 Wh/kg, 4 Wh/kg, 3 Wh/kg, 2 Wh/kg, 1 Wh/kg, 0.5 Wh/kg, 0.1 Wh/kg, or 0.05 Wh/kg of a given value or range. In certain embodiments, the term "about" or "approximately" means within 5V, 4V, 3V, 2V, 1V, 0.5V, 0.1V, or 0.05V of a given value or range. In certain embodiments, the term "about" or "approximately" means within 100 nm, 90 nm, 80 nm, 70 nm, 60 nm, 50 nm, 40 nm, 30 nm, 20 nm, 10 nm, 9 nm, nm, 8 nm, 7 nm, 6 nm, 5 nm, 4 nm, 3 nm, 2 nm, 1 nm of a given value or range. In certain embodiments, the term "about" or "approximately" means within 40° C., 30° C., 20° C., 10° C., 9° C., ° C., 8° C., 7° C., 6° C., 5° C., 4° C., 3° C., 2° C., 1° C. of a given value or range. In certain embodiments, the term "about" or "approximately" means within 50 minutes, 60 minutes, 40 minutes, 30 minutes, 20 minutes, 10 minutes, 9 minutes, minutes, 8 minutes, 7 minutes, 6 minutes, 5 minutes, 4 minutes, 3 minutes, 2 minutes, 1 minutes of a given value or range. In certain embodiments, the term "about" or "approximately" means within 50 hours, 60 hours, 40 hours, 30 hours, 20 hours, 10 hours, 9 hours, hours, 8 hours, 7 hours, 6 hours, 5 hours, 4 hours, 3 hours, 2 hours, 1 hours of a given value or range. In certain embodiments, the term "about" or "approximately" means within 5 L, 4 L, 3 L, 2 L, 1 L, 0.5 L, 0.1 L, or 0.05 L. In certain embodiments, the term "about" or "approximately" means within 5 $cm^2$, 4 $cm^2$, 3 $cm^2$, 2 $cm^2$, 1 $cm^2$, 0.5 $cm^2$, 0.1 $cm^2$, or 0.05 $cm^2$. In certain embodiments, the term "about" or "approximately" Means within 5 M, 4 M, 3 M, 2 M, 1 M, 0.5 M, 0.1 M, or 0.05 M of a given value or range.

OTHER NON-LIMITING EMBODIMENTS

Ever since the discovery of graphene a decade ago, researchers have proposed dozens of potential uses, from faster computer chips and flexible touchscreens to hyperefficient solar cells and desalination membranes. One exciting application that has sparked significant interest is the ability of graphene to store electrical charge. A single sheet of graphene sufficient in size to cover an entire soccer field would weigh only about 6 grams. This huge surface area associated with this small amount of graphene can be squeezed inside an AA size battery, enabling new energy storage devices with the ability to store massive amounts of charge. However, current three-dimensional (3D) graphene films suffer from poor electrical conductivity, weak mechanical strength, and chaotic porosity.

The inventors have recognized a need and have provided solutions to develop new methods for the preparation and processing of graphene into electrodes with controlled porosity and high surface area for use in a variety of applications.

The present disclosure relates to an approach for the fabrication of three-dimensional (3D) hierarchical porous films through filtration assembly of partially reduced graphene oxide and a subsequent freeze-casting process. This fabrication process provides an effective means for controlling the pore size, electronic conductivity, and loading mass of the electrode materials and provides an opportunity for designing devices with high energy density. These outstanding properties result in supercapacitors with a power density in excess of 280 kW/kg, which is among the highest values reported thus far.

Those skilled in the art will appreciate the scope of the present disclosure and realize additional aspects thereof after reading the following detailed description in association with the accompanying drawings.

The present disclosure relates to an approach for the fabrication of three-dimensional (3D) hierarchical porous films through filtration assembly of partially reduced graphene oxide and a subsequent freeze-casting process. This fabrication process provides an effective means for controlling the pore size, electronic conductivity, and loading mass of the electrode materials and provides an opportunity for designing devices with high energy density. These outstanding properties result in supercapacitors with a power density in excess of 280 kW/kg, which is among the highest values reported thus far.

Electrochemical capacitors, also known as supercapacitors, are energy storage devices like batteries, yet they can be recharged a hundred to a thousand times faster. Their high power density and excellent low-temperature performance have made them the technology of choice for back-up power, cold starting, flash cameras, and regenerative braking. They also play an important role in the progress of hybrid and electric vehicles. With all the progress in the past decades, commercial supercapacitors currently provide a power densities below 10 kW/kg. We have developed supercapacitors using cellular graphene films that are capable of providing power densities in excess of 280 kW/kg. This tremendous improvement in the power density of graphene supercapacitors enables them to compete not only with the existing supercapacitor technology but also with batteries and capacitors in a large number of applications. In addition, we envision these 3D porous films to be useful in a broad range of applications, including energy conversion and storage (e.g., capacitors and/or batteries), catalysis, sensing, environmental remediation, and scaffolds for electronic and medical applications.

Other possible, non-limiting applications for cellular 3D graphene are the following: Portable electronics: cell phones, computers, cameras. Medical devices: life-sustaining and life-enhancing medical devices, including pacemakers, defibrillators, hearing aids, pain management devices, and drug pumps. Electric vehicles: High-power batteries with long lifetime are needed to improve the electric vehicles industry. Space: Cellular graphene supercapacitors can be used in space to power space systems including rovers, landers, spacesuits, and electronic equipment. Military batteries: The military uses special batteries for powering a huge number of electronics and equipment. Of course, reduced mass/volume is highly preferred. Electric aircraft: an aircraft that runs on electric motors rather than internal combustion engines, with electricity coming from solar cells or batteries. Grid-scale energy storage: Batteries are widely used to store electrical energy during times when production (from power plants) exceeds consumption, and the stored energy is used at times when consumption exceeds production. Renewable energy: Since the sun does not shine at night and the wind does not blow at all times, batteries have found their way to off-the-grid power systems to store excess electricity from renewable energy sources for use during hours after sunset and when the wind is not blowing. Of course, high-power batteries can harvest energy from solar cells with higher efficiency than the current state-of-the-art batteries. Power tools: Cellular 30 graphene supercapacitors would enable fast-charging cordless power tools such as drills, screwdrivers, saws, wrenches, and grinders. The trouble with current batteries is long recharging time. Batteries, including lithium ion batteries: In certain applications, supercapacitors may in some cases be used instead of, or in combination with, batteries.

The state-of-the-art supercapacitors use electrodes made of activated carbons that are limited by complex microporous structure, which limits their power density. The technology based on activated carbon has been in use over the past 40 years, and the maximum power density is still limited at 10 kW/kg. The assembly of two-dimensional graphene sheets using simple benchtop chemistry results in cellular graphene films that can be directly used in supercapacitors without the need for binders, a conductive additive required for the assembly of traditional supercapacitors. These films demonstrate ultrahigh power and very fast frequency response (about 0.017 seconds compared with ~1 second for commercial technology). The present disclosure further provides advantages over conventional capacitors in the following aspects: The process described in the present disclosure is an improvement lending itself to more efficient scale up. The power density achieved with the graphene films (>280 kW/kg) is much higher than previously reported with other forms of graphene.

Those skilled in the art will recognize improvements and modifications to the present disclosure. All such improvements and modifications are considered within the scope of the concepts disclosed herein.

GO was prepared from natural graphite flakes by a modified Hummers' method, as previously described. In a typical procedure, as-synthesized GO was suspended in water to give a homogeneous aqueous dispersion with a concentration of 3 mg ml-1. Then 1 ml of GO dispersion was mixed with 7 mg ascorbic acid in a 20 ml cylindrical glass vial. After being vigorously shaken for a few minutes, the mixture was then placed in a 50° C. oven for 5 to 50 minutes to obtain different degrees of reduction, i.e. partially reduced GO. The partially reduced GO dispersion was next vacuum filtered through a cellulose membrane (0.22 μm pore size). The vacuum was disconnected immediately once no free dispersion was left on the filter paper. Both the filter membrane and partially reduced GO film were vertically immersed into a liquid nitrogen bath to freeze them for 30 minutes. After being thawed at room temperature, the film was transferred into a cylindrical glass vial and placed in a 100° C. oven overnight to obtain further reduction. The 3D porous RGO films were then transferred to a Petri dish and immersed in deionized water for one day to remove any remaining ascorbic acid. Thicker 3D porous RGO films were prepared by simply increasing the amount of GO to 2 or 5 ml and ascorbic acid to 14 or 35 mg. The thickness of the 3D porous RGO films, as measured from cross-sectional SEM images, were found to be ~12.6, 20.4 and 44.7 μm, respectively. The areal loading mass of the 3D porous RGO films are ~0.2, 0.41 and 1.02 mg cm-2, respectively. As a control, chemically reduced graphene film was fabricated by vacuum filtering chemically reduced GO sheets. The loading mass and the thickness of this RGO is ~0.2 mg cm-2 and ~2.1 μm, respectively.

Fabrication of 3D porous RGO- and RGO-supercapacitors. 3D porous RGO and RGO films were cut into 1 cm×1 cm square pieces and then carefully peeled off from the filter membrane. Next, the freestanding electrode films were immersed into 1.0 M $H_2SO_4$ aqueous electrolyte overnight to exchange their interior water with electrolyte. Subsequently, the 3D porous RGO film slices were placed onto platinum foils. Two similar 3D porous RGO films on separate metal foils were directly used as electrodes without adding any other additives or further treatments. These two electrodes were separated by an ion-porous separator (polypropylene membrane, NKK MPF30AC100) and assembled into a sandwich architecture supercapacitor and tightly sealed with Kapton tape.

The morphology and microstructure of the prepared films were investigated by means of field emission scanning electron microscopy (FE-SEM, JEOL 6701F) and transmission electron microscopy (TEM, FEI TF20). X-ray diffraction patterns were collected on a Panalytical X'Pert Pro X-ray Powder Diffractometer with Cu-Kα radiation (λ=1.54184 Å). Raman spectroscopy measurements were performed using a Renishaw Via laser micro-Raman system (Renishaw) at an excitation wavelength of 633 nm. Atomic force microscopy images were recorded using a Bruker Dimension 5000 Scanning Probe Microscope in tapping mode (Bruker Dimension 5000). Tensile strength of the each film was tested on a tensile testing machine (Q800 DMA (Dynamic Mechanical Analyzer)). X-ray photoelectron spectroscopy data were collected with a Kratos AXIS Ultra DLD spectrometer using a monochromatic AlKα X-ray source (hv=1486.6 eV).

All the electrochemical experiments were carried out using a two-electrode system with a Bio-Logic VMP3 potentiostat. The EIS measurements were performed at open circuit potential with a sinusoidal signal over a frequency range from 1 MHz to 10 MHz at an amplitude of 10 mV. The cycle life tests were conducted by galvanostatic charge/discharge measurements. Calculations of the specific capacitance and the energy and power densities are discussed in detail in the following sections.

Despite the impressive developments achieved during the last decade in the field of supercapacitor research, inconsistent calculations have led to misunderstandings and make comparing results from different research groups difficult. Thus, here we carefully illustrate in detail our calculation methods for determining the different parameters needed for evaluating the performance of the supercapacitors.

The capacitance of a supercapacitor (Ccell) in a two-electrode system was calculated from its galvanostatic charge/discharge curves at different current densities using:

$$C_{cell} = i_{discharge}/(dV/dt)$$

wherein $i_{discharge}$ is the discharge current, t is the discharge time, the potential range of V is the voltage drop upon discharge excluding the JR drop, and dV/dt is the slope of the discharge curve (in volts per second, V/s).

Alternatively, $C_{cell}$ may be calculated from CV curves by integrating the discharge current (i) vs. potential (V) plots using the following equation:

$$C_{cell} = \int_{V_{min}}^{V_{max}} i\, dv/V_v$$

where i is the current in the negative CV curve, v is the scan rate, and V ($V = V_{max} - V_1$) represents the potential window.

Specific capacitances of single electrode active materials were calculated based on their mass and area or volume. Since a symmetric two-electrode supercapacitor consists of two equivalent single-electrode capacitors in series, the total capacitance of the two electrodes and the capacitances of the positive and negative electrodes may be calculated using the equation below:

$$C_{positive} = C_{negative}$$

$$\frac{1}{C_{cell}} = \frac{1}{C_{positive}} + \frac{1}{C_{negative}}$$

Thus $C_{positive} = C_{negative} = 2 C_{cell}$.

In addition, the mass and volume of a single electrode accounts for half of the total mass and volume of the two electrode system ($M_{single\text{-}electrode} = \frac{1}{2} M_{two\text{-}electrode}$, $V_{single\text{-}electrode} = \frac{1}{2} V_{two\text{-}electrode}$). The area of a single electrode is equivalent to the area of the two-electrode system (S single-electrode=$S_{two\text{-}electrode}$) with specific capacitances of the active material calculated according to the following equations:

$$C_{specific\ capacitance, M} = \frac{C_{single\ electrode}}{M_{single\ electrode}} = 4\frac{C_{cell}}{M_{two\ electrode}}$$

$$C_{specific\ capacitance, M} = \frac{C_{single\ electrode}}{S_{single\ electrode}} = 2\frac{C_{cell}}{S_{two\ electrode}}$$

-continued $$C_{specific\ capacitance, M} = \frac{C_{single\ electrode}}{V_{single\ electrode}} = 4\frac{C_{cell}}{V_{two\ electrode}}$$

Analogously, specific capacitances of the two-electrode system are calculated based on the mass and area or volume of the two electrodes according to the following formulae:

$$C_{two\ electrodes, M} = \frac{C_{cell}}{M_{two\ electrode}}$$

$$C_{two\ electrodes, S} = \frac{C_{cell}}{S_{two\ electrode}}$$

$$C_{two\ electrodes, V} = \frac{C_{cell}}{V_{two\ electrode}}$$

Thus, $$C_{specific\ capacitance, M} = 4 C_{two\text{-}electrode, M}$$

$$C_{specific\ capacitance, S} = 2 C_{two\text{-}electrode, M}$$

$$C_{specific\ capacitance, V} = 4 C_{two\text{-}electrode, V}$$

Therefore, the energy densities and power densities of the total device were calculated by the following equations:

$$E_{device, x} = \frac{1}{2} C_{device, x} \times (V - V_{IRdrop})^2$$

$$C_{device, x} = \frac{E_{device, x}}{t_{discharge}}$$

The measured Nyquist plots was well fit on the basis of an equivalent Randles circuit in FIG. 3 by using the following equation:

$$Z = R_s + \frac{1}{j\omega C_{dl} + 1/R_{ct} + W_o} + \frac{1}{j\omega C_l + 1/R_{leak}}$$

where Rs is the cell internal resistance, Cdl is the double layer capacitance, Rct is the charge transfer resistance, Wo is the Warburg element, Cl is the low frequency mass capacitance, and Rleak is the low frequency leakage resistance. As illustrated in FIG. 3, these resistor and capacitor elements in the equivalent circuit are related to specific parts in the Nyquist plot. At high frequency, the point of intersection on the real axis represents the internal resistance Rs, which includes the intrinsic electronic resistance of the electrode material, the ohmic resistance of the electrolyte, and the interfacial resistance between the electrode and the current collector. The semicircular in the high frequency region provides the behavior of the interfacial charge transfer resistance Rct and the double layer capacitance Cdl. After the semicircle, the Nyquist plot exhibits a straight long tail almost perpendicular to the x-axis and stretching to the low frequency region. This almost ideal vertical line represents the mass capacitance Cl, and the inclined angle suggests a resistive element, which is the leakage resistance Rleak. The transmission line with an angle of nearly 45 degrees to the x-axis from high frequency to the mid-frequency represents the Warburg element Wo, which is expressed as:

$$W_{ox} = \frac{A}{j\omega^n}$$

Where A is the Warburg coefficient, w is the angular frequency, and n is an exponent.

Building three-dimensional porous microstructures is an effective way to make use of the extraordinary nanoscale properties of individual graphene sheets. However, current 3D graphene films suffer from poor electrical conductivity, weak mechanical strength, and chaotic porosity. Here, we demonstrate a method combining freeze-casting and filtration to synthesize 3D reduced graphene oxide (RGO) films with open porosity, high electrical conductivity (>1900 S m-1), and good tensile strength (18.7 MPa). Taking advantage of the abundant interconnected pathways for electrolyte/ion transport, the resulting supercapacitors based on the 3D porous RGO film exhibit extremely high specific power densities (>280 kW kg-1) and high energy densities (up to 9.9 Wh kg-1) in aqueous electrolyte. The fabrication process provides an effective means for controlling the pore size, electronic conductivity and loading mass of the electrode materials, providing an opportunity for designing devices with high energy density. We envision these 3D porous films to be useful in a broad range of applications including energy conversion and storage, catalysis, sensing and environmental remediation.

Due to the large fluctuations in electricity generation from renewable sources, energy storage devices with high power density are urgently needed for storing energy and supplying electricity on demand. Electrochemical capacitors, known as supercapacitors, have attracted a great deal of attention because of their high power densities, long life spans and fast charging capabilities. Supercapacitors can provide power density in excess of 10 kW kg-1, which is 10 times larger than currently possible with lithium-ion batteries. They are ideal energy storage candidates in applications where high power densities are needed such as for energy recapture and delivery in hybrid vehicles, electric vehicles, smart grids, and backup power for electric utilities and factories. Unlike batteries that are limited by slow chemical reactions, supercapacitors store charge through highly reversible ion adsorption or fast redox reactions, which enables fast energy capture and delivery.

Recently, significant research efforts have focused on increasing energy densities of supercapacitors. Unfortunately, these energy density enhancements usually come at the cost of losses in power or cycling capability, which are the most important characteristics of supercapacitors. Without high power density and long cycling capability, supercapacitors are reduced to mediocre battery-like energy storage devices. In practice, high power supercapacitors are desirable for numerous applications, including heavy-duty loading applications, harvesting regenerative braking energy, and load leveling in a smart electric grid. In these situations, a large amount of energy needs to be either stored or delivered in high power density energy storage devices. Therefore, high power density is still an essential property for the practical applications of supercapacitors.

The electrode material is the central component of supercapacitors and largely dictates their ultimate energy storage performances. Owing to its extraordinary properties, such as high electrical conductivity as well as high specific surface area, and a wide stable potential window, graphene, a one atom-thin two-dimensional flake of carbon, holds great promise as a high performance electrode material for supercapacitors.

Graphene film, often called graphene paper, is an important macroscopic structure of graphene. A number of methods, such as blade-coating, spray-coating, layer-by-layer assembly, interfacial self-assembly and filtration assembly have been developed to fabricate graphene films. However, due to the shear stress, interfacial tension or vacuum compression during the fabrication process, the two-dimensional (2D) layered graphene sheets can easily restack to form dense lamellar microstructures, which lose most of the surface area of the original graphene sheets. Recently, Li and coworkers demonstrated that the presence of a nonvolatile liquid electrolyte that can serve as an effective "spacer" to prevent the irreversible π-π stacking between graphene sheets. However, these fabricated dense layered graphene films lack sufficient open hierarchical pores, which serve as ion-buffering reservoirs and high speed ion transport channels for effective electrochemical kinetic processes. The presence of these hierarchical pores is a critical factor for obtaining high power densities and short charging times. Therefore, it is important to fabricate graphene film electrodes with continuous hierarchical pores, especially to achieve high power density supercapacitors.

Here we demonstrate that 3D hierarchical porous graphene films can be readily fabricated by filtration assembly of partially reduced graphene oxide and a subsequent freeze-casting process. The resulting porous graphene films exhibit a combination of useful properties including: good electrical conductivity, high mechanical strength and extreme high performance in supercapacitors. Furthermore, this new 3D porous graphene film is not only useful in supercapacitors, but also has promising potential in broad applications, such as sensors, catalysis, batteries, gas absorption, hydrogen storage, and scaffolds for electronic and medical applications.

Among various methods developed for the fabrication of porous materials, freeze-casting has attracted considerable attention recently, as it is a versatile, readily accessible and inexpensive solution-phase technique that can employ the controlled crystallization of a suspension to induce ordered hierarchical porous architectures.

Generally, the freeze-casting technique is a phase segregation process. As a liquid suspension freezes, spontaneous phase segregation gathers the dispersed particles to the space between the solvent crystals, followed by sublimation of the solidified frozen solvent template from the solid to the gas phase under reduced pressure. This creates a three-dimensional network, where the pores become a replica of the solvent crystals.

To date, freeze-casting has been adopted to introduce high porosity into a variety of compact materials, endowing them several novel properties and opening up the possibility for new applications. For example, cellular ceramics have been formed that are useful as light-weight insulators or filters, which can withstand high temperatures and exhibit high compressive strength. Additionally, polymers with or without inorganic nano-fillers (e.g. carbon nanotubes or clay) have been created as tissue engineering substrates or scaffolds for energy storage electrodes. Due to these previous results, the variety of materials successfully processed by this technique suggests that the underlying principles dictating the porous structure formation mechanisms rely on physical parameters, morphology of the "particles" and the interactions with solutions rather than the chemical properties.

Graphene oxide (GO), can be produced in bulk from graphite at low cost, as a precursor to fabricate porous graphene films. The diameters of the GO sheets are in the range of several micrometers, with a typical thickness of approximately 1.2 nm. According to a literature report, the thickness of a GO monolayer is approximately 1-1.4 nm, which is thicker than an ideal monolayer of graphene (thickness ~0.34 nm), due to the presence of functional groups and adsorbed molecules. Since the functional groups make GO strongly hydrophilic and negatively charged, the single layer GO sheets can be homogeneously dispersed in an aqueous solution. However, if one directly freeze-casts a GO dispersion, it will only result in a randomly oriented porous brittle monolith. A number of parameters, including the size and density of the "particles", their size distribution, and their shape, will affect the interactions between the "particles" and solution, which results in modifying the solidification kinetics of the freezing procedure and the resulting pore structure. Only the fraction of "particles" in suspension achieved up to a specific percolation threshold, known as the entrapped "particles" during the freezing process, can form a continuous 3D porous network. Therefore, we introduce pre-reduction and control the reduction time to adjust the size, shape, and size distribution and carry out filtration assembly to increase the density of the dispersion to achieve the percolation threshold.

The lamellar graphene oxide sheets gradually grow up to partially reduced GO micro-gels when pre-reduction time increase from 5 up to 30 minutes. Then we process all these pre-reduced GO samples with the same procedures show in the FIG. 1 until we got graphene films. After filtering these pre-reduced GO dispersion, we drop the film into liquid Nitrogen to solidify the water molecule inside and between the micro gels. Under ideal conditions, continuous ice crystals are formed and grow into the pre-reduced GO networks. The pre-reduced GO sheets rejected from the advancing solidification front and collected between the gaps of growing ice crystals. The framework should also accommodate the 9% positive solidification volume expansion for liquid water changed to solidified ice crystal. The morphology of the solidified ice crystal will largely dictate the porous characteristics of the final graphene films. Once complete solidification of hydro-film is achieved, the porosity is created where the ice crystals were. Then, the subsequent higher temperature long-term reduction is to strengthen the connection between pre-reduced GO gels and further increase the degree of reduction.

After series of comparable experiments, we found that only the 30 minutes pre-reduced sample can be assembled into the ideal 3D porous graphene film. According to the mechanism of forming porosity by freeze casting, we conclude two main reasons for necessity of the pre-reduction to form the porosity of the graphene films. First, the 3D micro-gel structures effectively resist the aggregation of the graphene oxide sheets during the filtration assembly and leave sufficient space for the solidification of water. In contrast, the compact configuration of filtered 2D GO sheets jam the redistribution during freezing procedure. Second, during the growth of GO sheets to micro-gels, the particle size was increasing and the 2D lamellar sheets were changing to 3D micro networks. In order to assemble to integral porous graphene film, the "particles" in suspension must be rejected from the advancing solidification front in freezing procedure. The thermodynamic condition for a "particle" to be rejected by the solidification front is that the interfacial free energies satisfying this following criterion:

$$\Delta\sigma = \Delta\sigma_{SP} - (\Delta\sigma_{LP} + \Delta\sigma_{SL}) > 0$$

where $\sigma_{SP}$, $\sigma_{LP}$, and $\sigma_{SL}$ are the interfacial free energies associated with the solid (ice)-particle (pre-reduced GO micro-gel or GO sheets), liquid (water)-particle and solid-liquid interface respectively.

The size increase and morphology change decrease the contact interface area between the "particles" and solid phase and provide more contact interface area between liquid and solid phases, which result in the augment of $\sigma_{SP}$ and drop of $\sigma_{SL}$. This makes the pre-reduced GO micro-gel system more tend to satisfy the pre-mentioned criterion. In addition, the filtration assembly process is a useful way to increase the density of the particles in the suspension to approach the percolation threshold, which is another critical condition for forming continuous 3D porous network during the freeze-casting process.

The X-ray diffraction (XRD) pattern of GO is characterized by a strong peak at $2\theta = 11.7°$. Pre-reduced GO exhibits a significant decline in the intensity of the "GO" peak at 10.8° while a broad peak develops at 24°, which indicates the partially reduction of GO, and the creation of extended graphene sheets. After completion of the reduction process, the XRD pattern only shows a broad "graphene" peak, which suggests that a high degree of reduction of the 3D porous RGO films has occurred. The XPS $C_{1s}$ spectrum where changes are observed in the peaks corresponding to oxygen containing groups and 2. The intensity ratio of the D and G peaks in Raman spectroscopy.

A typical cross-section scanning electron microscope (SEM) image of a 3D porous RGO film under low magnification, exhibits a continuous open network with a uniform thickness of 12.6 μm. The honeycomb-like structures indicate that the pores are a replica of the ice crystals. As shown in the high magnification SEM images, the pore sizes are in the range of hundreds nanometers to several micrometers and the pore walls consist of thin layers of graphene sheets, which is consistent with transmission electron microscopy (TEM) results The TEM and high-resolution TEM images also reveal that there are many crumpled 5-10 nm graphene sheets stacked on the surface of graphene walls that are several tens of nanometers thick. This is likely due to rejection from the solidification front that pushes the dispersed pre-reduced GO sheets into the gaps between the ice crystals formed during the freezing process. The clear lattice fringes and typical six-fold symmetry diffraction pattern provide further evidence for the nearly complete reduction of the 3D porous RGO films. The reduction process is associated with significant changes in the electrical properties of the film. For comparison, two electrode I-V conductivity tests were carried out for GO, pre-reduced GO and 3D porous RGO films, as presented in FIGS. 16 and 17A-D. The GO film exhibits nonlinear and asymmetric behavior, with a differential conductivity value ranging from x to y depending on the gate voltage. The pre-reduced GO films shows a more linear and symmetric curve, with a stable conductivity of 10.3 S/m. The 3D porous RGO films give a completely linear I-V curve associated with a high conductivity of 1,905 S/m. Because of its high electrical conductivity and continuous open porous structure, the fabricated graphene films hold promise as high performance supercapacitor electrodes. Furthermore, in spite of their highly porous microstructure, the as-prepared 3D porous RGO films exhibited good tensile strength of 18.7 MPa.

The unique properties of 3D porous RGO films enable their excellent performance as supercapacitor electrodes. A symmetric two-electrode supercapacitor was fabricated by using 3D porous RGO films as the active materials and 1.0 M $H_2SO_4$ as the electrolyte. Cyclic voltammetry (CV) curves taken at scan rates from 0.2-20 V/s. They demonstrate that the 3D porous RGO electrodes retain their rectangular shape and high current densities, even at an extremely high scan rate of 20 V/s. The rectangular nature of the CV curves indicates ideal electrical double-layer capacitor (EDLC) behavior for the 3D porous RGO films. In a control experiment, a stacked RGO film was fabricated via a previous reported method using vacuum filtering of chemically reduced GO sheets. As shown in the cross-section SEM images, the RGO consists of stacked lamellar graphene sheets, which is different from the 3D porous RGO films in this work. The schematic illustrations show the easier ion diffusion and minimized electron transport resistance for a 3D porous RGO film compared with an RGO film. The CV and galvanostatic charge/discharge curves show a significant electrochemical performance enhancement for the 3D porous RGO films when compared with the RGO film electrodes. The more rectangular shape of the CV curves at a high scan rate of 1,000 mV/s and more triangular shape of the galvanostatic charge/discharge curves at a high current density of 100 A/g indicate a better capacitive performance and electrolyte ion transport of the 3D porous RGO electrode. The larger area of the CV curve and longer discharge time also predict a higher capacitance. The high linear dependence ($R2=0.9986$) of the discharge current on the scan rate up to high scan rates indicates an ultra-high power capability for the 3D porous RGO electrode. The specific capacitance based on the active materials of these two supercapacitor electrodes was derived from the galvanostatic charge/discharge data and is summarized in. The 3D porous RGO film exhibited an ultrahigh gravimetric capacitance of 284.2 F/g at a current density of 1 A/g, and retained ~61.2% (173.8 F/g) of its initial capacitance when the current density was increased up to 500 A/g. In contrast, the RGO only had a gravimetric capacitance of 181.3 F/g at 1 A/g and a capacitance retention of only 27.8% (50.4 F/g) at 500 A/g. The cycling stability of the electrodes was examined by performing 10,000 charge/discharge cycles at a current of 25 A/g. The 3D porous RGO films exhibited a capacitive retention of 97.6%, which compares favorably to the 86.2% shown by the RGO films.

Electrochemical impedance spectroscopy (EIS) is a very useful method to analyze electrolyte ion transport and other electrochemical behavior. The Nyquist plot of the 3D porous RGO film features a nearly vertical curve, indicating an ideal capacitive performance. A close-up observation of the high frequency regime reveals a semicircle with a ~45° Warburg region. The Nyquist plot of the 3D porous RGO electrode shows a shorter Warburg region and a smaller semicircle, indicating a lower charge transfer resistance and more efficient electrolyte ion diffusion when compared to the RGO electrode. In order to better understand the interfacial electrochemical behavior of the supercapacitors, we fit the Nyquist plots to an equivalent circuit and summarize the specific values for the different circuit elements. The details of the relationship between the Nyquist plot and the equivalent circuit are illustrated in the Supplementary EIS Analysis section. The internal resistances (Rs) are $0.202\Omega$ and $0.244\Omega$; with charge transport resistances (Rct) of $0.181\Omega$ and $1.04\Omega$ obtained by fitting the 3D porous RGO film and RGO film supercapacitors, respectively. These low resistance values indicate the high electron conductivity along the graphene walls and high-speed ion migration through the 3D open pores. The open surfaces of the 3D porous RGO films can be easily accessed by electrolyte ions without a diffusion limit, which guarantees a large capacitance at high current density/scan rate. In contrast, the condensed layer structure of RGO films only provides a narrow neck-like channel and confined pores for electrolyte ion transport, which results in increased resistance and suppressed capacitances. This was further confirmed by Bode plots (FIG. 4i). The characteristic frequency f0 at the phase angle of −45° marks the transition point from resistive behavior to capacitive behavior. The 3D porous RGO supercapacitor exhibits an f0 of 55.7 Hz, which corresponds to a time constant ($\tau_0=1/f_0$) of 17.8 ms, which is significantly lower than 91.7 ms exhibited by the RGO supercapacitor. This time constant for the 3D porous RGO supercapacitor is even lower than some pure carbon based micro-supercapacitors e.g. 26 ms for onion-like carbon, and 700 ms for activated carbon. This extremely low time constant provides further evidence for the high-speed ion diffusion and transport inside the 3D porous RGO electrodes.

The sum of Rs and Rct are the chief contributors to the equivalent series resistance (ESR), which mainly limits the specific power density of a supercapacitor. Thus, the low ESR, high capacitance and nearly ideal electrolyte ion transport of the 3D porous RGO electrodes provide the extremely high power density of 282 kW/kg and high energy density of 9.9 Wh/kg, even with only a 1.0 V potential window using an aqueous electrolyte. This high power density from the 3D porous RGO supercapacitor is close to that of an aluminum electrolytic capacitor and much higher than most previously reported EDLCs, pseudo-capacitors, and even asymmetric supercapacitors. It is worth noting that our calculations are based on the power density obtained by dividing the energy density by the discharging time. This means the value of the power density is the device has actually been achieved. Some of the extremely high power densities reported previously are calculated from the square of the potential window divided by 4 times the ESR, which is the theoretical ideal maximum power density of a supercapacitor. The actual highest power density achieved by a supercapacitor is generally much lower than this ideal maximum value.

The high loading mass of active materials is a critical factor in the total performance of a supercapacitor, as discussed in an earlier paper. Vacuum filtration, the method used in this research to fabricate electrodes, is a common method for preparing graphene or graphene-based films due to its easy manipulation. One of the advantages of the filtration method is the convenience in controlling the thickness and mass loading of an as-filtered film simply by adjusting the volume of the dispersion used. Thus, in order to increase the electrochemical performance of the total device, we increased the loading mass of the active electrode material by simply increasing the dispersion volume. As can be seen in cross-sectional SEM images the as-prepared films maintain their highly porous microstructure when the thickness is increased to 20.4 µm, i.e. twice the loading (3D porous RGO-2), and to 44.7 µm, a five-fold increase in the loading (3D porous RGO-5). Because of the high electrical conductivity and excellent ion transport inside the porous electrodes, the CV curves maintain their rectangular shapes even when the scan rate is increased up to 1.0 V/s. The current density increases significantly as the loading mass of the 3D porous RGO film is increased. As a result, the gravimetric capacitance only decreased by 6.6% (to 265.5 F/g) and 15% (to 241.5 F/g) at the mass loadings of twice and five-fold, respectively. Meanwhile, the areal capacitance increases from 56.8 $mF/cm^2$ to 109 $mF/cm^2$ and 246 $mF/cm^2$, respectively.

In order to further evaluate the practical potential of the 3D porous RGO supercapacitors, we calculated the energy density and power density based on the total device, which means the values were normalized by the total volume including the two electrodes, current collectors, electrolyte and separator. As summarized in a Ragone plot, our devices exhibit high power densities (7.8-14.3 kW kg-1). Furthermore, by increasing the mass loading of the active materials, the 3D porous RGO supercapacitor can store a high energy density up to 1.11 Wh L-1, which is even comparable to supercapacitors based on organic electrolytes or ionic liquids.

The freezing-casting and filtration techniques used in producing 3D porous graphene films are mainly related to some basic parameters, such as the shape and size of the original materials, and their surface tension and dispersibility. Thus, this method could provide a universal pathway to assemble 2D materials into 3D porous macrostructures. The current method appears more adaptable than previous routes to fabricate 3D graphene films, such as a hydrothermal method, CVD, interfacial gelation, and template-directed ordered assembly. The highly porous microstructure, high conductivity and strong mechanical properties endow the 3D porous RGO film with a potential for many applications.

High power density supercapacitors are an ideal application that makes use of all of the above-mentioned advantages. High power density will continue to attract increasing attention, especially for conditions in which huge amounts of energy need to be input or output in a limited time, such as load-leveling the emerging smart electrical grid, flash charging electronics and quick acceleration for electric vehicles. However, the power densities of most previously reported supercapacitors are generally limited by the narrow or confined electrolyte ion transport channels. Our 3D porous RGO films can satisfy the main requirements for high power density supercapacitor electrodes. The open and connected pores provide high-speed electrolyte ion transport and freely accessible graphene surfaces for forming electrical double layers. The high electrical conductivity and robust mechanical strength ensure high efficiency in exporting electrons to an outside load. Furthermore, these 3D porous RGO networks can be further scaled-up in their loading mass and/or thickness due to the controllable filtration process.

In summary, we have developed a method combining freeze-casting and filtration to effectively synthesize 3D porous graphene films. This facile and scalable fabrication approach could become a general pathway for the synthesis of 3D porous films by assembling 2D materials. A high-performance supercapacitor has been fabricated by using these 3D porous graphene films as the active material. With their highly porous microstructure, superior electrical conductivity and exceptional mechanical strength, the supercapacitor exhibited both very high power densities and energy densities. This research could open up exciting opportunities for 3D porous film fabrication and a wide range of high power density applications.

What is claimed is:

1. A reduced graphene oxide film comprising a continuous three-dimensional network of pores having a size of less than 1,000 nm, wherein the film has a density of at least about 0.1 g/cm$^3$.

2. The reduced graphene oxide film of claim 1, wherein the reduced graphene oxide film has an areal mass loading of at least about 0.1 mg/cm$^2$.

3. The reduced graphene oxide film of claim 1, wherein the reduced graphene oxide film has a tensile strength of at least about 9 MPa.

4. The reduced graphene oxide film of claim 1, wherein the reduced graphene oxide film has a conductivity of at least about 1,000 S/m.

5. The reduced graphene oxide film of claim 1, wherein the reduced graphene oxide film has a gravimetric energy density of at least about 4 Wh/kg.

6. The reduced graphene oxide film of claim 1, wherein the reduced graphene oxide film has a gravimetric power density of at least about 25 kW/kg.

7. The reduced graphene oxide film of claim 1, wherein the reduced graphene oxide film has a gravimetric capacitance, in a current density of 1 A/g, of at least about 90 F/g.

8. The reduced graphene oxide film of claim 1, wherein the reduced graphene oxide film has a capacitive retention, after about 1000 cycles of charging, of at least about 50%.

9. The reduced graphene oxide film of claim 1, wherein the reduced graphene oxide film has an areal capacitance of at least about 25 mF/cm$^2$.

* * * * *